US012741857B2

(12) United States Patent
Kuo et al.

(10) Patent No.: US 12,741,857 B2
(45) Date of Patent: Sep. 22, 2026

(54) SYSTEMS, DEVICES, AND METHODS FOR MULTI-STAGE BEVERAGE PREPARATION

(71) Applicant: BOTRISTA, INC., San Francisco, CA (US)

(72) Inventors: Wu-Chou Kuo, San Francisco, CA (US); Yu-Wei Chen, New Taipei City (TW); Alexander Milton Friedman, San Francisco, CA (US)

(73) Assignee: Botrista, Inc., Dover, DE (US)

( * ) Notice: Subject to any disclaimer, the term of this patent is extended or adjusted under 35 U.S.C. 154(b) by 88 days.

(21) Appl. No.: 18/796,130

(22) Filed: Aug. 6, 2024

(65) Prior Publication Data

US 2026/0042653 A1 Feb. 12, 2026

(51) Int. Cl.

| | |
|---|---|
| ***B67D 1/00*** | (2006.01) |
| ***B67D 1/07*** | (2006.01) |
| ***B67D 1/08*** | (2006.01) |
| ***B67D 1/10*** | (2006.01) |
| ***B67D 1/12*** | (2006.01) |

(52) U.S. Cl.
CPC ......... *B67D 1/0017* (2013.01); *B67D 1/0078* (2013.01); *B67D 1/0081* (2013.01); *B67D 1/07* (2013.01); *B67D 1/0895* (2013.01); *B67D 1/10* (2013.01); *B67D 1/1279* (2013.01)

(58) Field of Classification Search
CPC .. B67D 1/0017; B67D 1/0078; B67D 1/0081; B67D 1/1279
See application file for complete search history.

(56) References Cited

U.S. PATENT DOCUMENTS

| | | | | |
|---|---|---|---|---|
| 5,323,963 A | 6/1994 | Ballu | | |
| 5,757,498 A | 5/1998 | Klein, II et al. | | |
| 10,173,881 B2 * | 1/2019 | Beavis | ................ | B67D 1/0888 |
| 10,433,671 B2 * | 10/2019 | Surface | ............... | A47J 31/0647 |

(Continued)

FOREIGN PATENT DOCUMENTS

| | | | | |
|---|---|---|---|---|
| WO | 2022169569 A1 | 8/2022 | | |
| WO | 2023114042 A1 | 6/2023 | | |
| WO | WO-2024137812 A1 * | 6/2024 | ........... | B67D 1/0048 |

OTHER PUBLICATIONS

International Search Report and Written Opinion issued by European Patent Office for PCT/US2024/041141, dated Feb. 20, 2025, 19 pages.

(Continued)

*Primary Examiner* — Michael A Riegelman
(74) *Attorney, Agent, or Firm* — Birch, Stewart, Kolasch & Birch, LLP

(57) ABSTRACT

Systems, devices, and methods for beverage preparation in portions. Embodiments of the present disclosure include a beverage system including: a fluid feeder configured to discharge a fluid; an ingredient feeder configured to discharge one or more ingredients; a mixing chamber having a dispensing opening, the mixing chamber configured to receive the fluid and the one or more ingredients; a dispenser configured to control dispensing from the mixing chamber via the dispensing opening; and a controller or control circuit programmed to perform operations including: receiving from a user a selection for a beverage; and producing the beverage automatically in portions. Different portions of the beverage may include different target ingredients.

13 Claims, 32 Drawing Sheets

(56) References Cited

U.S. PATENT DOCUMENTS

| | | | | |
|---|---|---|---|---|
| 10,501,304 | B2 | 12/2019 | Jangbarwala et al. | |
| 11,534,730 | B1 * | 12/2022 | Springer | B67D 1/07 |
| 2003/0085237 | A1 * | 5/2003 | Kateman | A23G 9/228 99/450.7 |
| 2007/0251260 | A1 * | 11/2007 | Baxter | G07F 17/0071 62/340 |
| 2009/0120306 | A1 * | 5/2009 | DeCarlo | A23G 9/224 62/340 |
| 2010/0176147 | A1 | 7/2010 | Segers | |
| 2012/0104024 | A1 | 5/2012 | Anselmino et al. | |
| 2012/0228328 | A1 | 9/2012 | Ryan et al. | |
| 2012/0230148 | A1 * | 9/2012 | van Opstal | B67D 1/07 366/177.1 |
| 2012/0304868 | A1 * | 12/2012 | Li | A47J 31/18 99/289 R |
| 2013/0292407 | A1 | 11/2013 | Beavis et al. | |
| 2016/0074901 | A1 | 3/2016 | Younos et al. | |
| 2016/0368013 | A1 | 12/2016 | Okada et al. | |
| 2016/0368752 | A1 * | 12/2016 | Bethuy | B67D 1/0869 |
| 2016/0368753 | A1 * | 12/2016 | Bethuy | A47J 31/4403 |
| 2018/0111173 | A1 | 4/2018 | Bertness et al. | |
| 2019/0125122 | A1 | 5/2019 | Feola | |
| 2019/0210299 | A1 | 7/2019 | Hayama et al. | |
| 2019/0231115 | A1 * | 8/2019 | Kennedy | A47J 31/404 |
| 2019/0276297 | A1 * | 9/2019 | Tewari | B67D 3/0061 |
| 2020/0087132 | A1 * | 3/2020 | Moore | B67D 1/0016 |
| 2022/0144619 | A1 | 5/2022 | Otto et al. | |
| 2022/0183499 | A1 * | 6/2022 | Brothers | B67D 1/0037 |
| 2023/0119340 | A1 * | 4/2023 | Carson | B67D 1/0036 222/1 |
| 2023/0146755 | A1 * | 5/2023 | Pugliese | B67D 1/0895 222/129.1 |
| 2023/0270278 | A1 | 8/2023 | Dupasquier et al. | |
| 2023/0271819 | A1 * | 8/2023 | Lee | B67D 1/0857 222/129.1 |
| 2023/0303383 | A1 | 9/2023 | Callaghan et al. | |
| 2025/0002320 | A1 * | 1/2025 | Kuo | B67D 1/07 |
| 2025/0002321 | A1 * | 1/2025 | Kuo | B67D 1/07 |
| 2025/0387766 | A1 | 12/2025 | Kuo et al. | |
| 2025/0388448 | A1 * | 12/2025 | Kuo | B67D 1/0021 |
| 2026/0021508 | A1 | 1/2026 | Kuo et al. | |
| 2026/0042073 | A1 | 2/2026 | Kuo et al. | |
| 2026/0042655 | A1 | 2/2026 | Kuo et al. | |
| 2026/0042657 | A1 | 2/2026 | Kuo et al. | |

OTHER PUBLICATIONS

International Search Report and Written Opinion of the International Searching Authority for International Application No. PCT/US2024/038891, dated Feb. 3, 2025.
International Search Report and Written Opinion of the International Searching Authority for International Application No. PCT/US2024/041132, dated Mar. 3, 2025.
International Search Report and Written Opinion of the International Searching Authority for International Application No. PCT/US2024/041137, dated Mar. 7, 2025.
International Search Report and Written Opinion of the International Searching Authority for International Application No. PCT/US2024/041139, dated Mar. 3, 2025.
U.S. Appl. No. 18/954,369, filed Nov. 20, 2024.
U.S. Appl. No. 19/000,288, filed Dec. 23, 2024.
U.S. Office Action for U.S. Appl. No. 18/778,838, dated Mar. 10, 2026.
U.S. Office Action for U.S. Appl. No. 18/796,056, dated May 18, 2026.
U.S. Office Action for U.S. Appl. No. 18/796,096, dated Feb. 17, 2026.

* cited by examiner

SYSTEMS, DEVICES, AND METHODS FOR MULTI-STAGE BEVERAGE PREPARATION

TECHNICAL FIELD

The present disclosure relates generally to beverage systems, devices, and methods.

BACKGROUND

For many consumers, freshly made beverages are more attractive than factory-produced canned or bottled beverages for various reasons including freshness, taste, and flexibility of customizing ingredient combinations. Therefore, many restaurants and beverage vendors offer a variety of freshly made beverages to meet the needs of their customers. As a result of rising labor costs and other factors (e.g., increased operating costs due to impacts of the pandemic or inflation), many restaurants and beverage vendors have begun to use a variety of machinery and equipment to provide or assist in the preparation of freshly-made beverages in order to reduce the required labor time and costs.

SUMMARY

In an aspect, the techniques described herein relate to a beverage system. In some embodiments, the beverage system may include: a fluid feeder configured to discharge a fluid; an ingredient feeder configured to discharge one or more ingredients; a mixing chamber having a dispensing opening, the mixing chamber configured to receive the fluid and the one or more ingredients; a mixer configured to mix the fluid and the one or more ingredients in the mixing chamber; a dispenser configured to control dispensing from the mixing chamber via the dispensing opening; and a controller or control circuit programmed to perform operations including: receiving from a user a selection for a beverage; and causing the beverage to be produced automatically in portions. In some embodiments, the operations may include obtaining, based on the selection, information relating to a first portion and a second portion of the beverage; generating, based on the obtained information, a first set of signals relating to the first portion and a second set of signals relating to the second portion. The first portion may include a first amount of the fluid and a first amount of a first target ingredient. The second portion may include a second amount of the fluid and a second amount of a second target ingredient. The first amount of the fluid in the first portion and the second amount of the fluid in the second portion may be the same or different. The second target ingredient may be the same as or different from the first target ingredient. The first set of signals may include: a first fluid signal, the first fluid signal causing the fluid feeder to discharge the first amount of the fluid into the mixing chamber; a first ingredient signal, the first ingredient signal causing the ingredient feeder to discharge the first amount of the at least one target ingredient into the mixing chamber; a first mixing signal, the first mixing signal causing the mixer to mix the fluid and the at least one target ingredient in the mixing chamber; and a first dispensing signal, the first dispensing signal causing the dispenser to allow at least some of a mixture of the fluid and the at least one target ingredient to be dispensed from the mixing chamber. The second set of signals may include: a second fluid signal, the second fluid signal causing the fluid feeder to discharge the second amount of the fluid into the mixing chamber; a second ingredient signal, the second ingredient signal causing the ingredient feeder to discharge the second amount of the at second target ingredient into the mixing chamber; a second mixing signal, the second mixing signal causing the mixer to mix the fluid and the second target ingredient in the mixing chamber; and a second dispensing signal, the second dispensing signal causing the dispenser to allow at least some of the second amount of the fluid to be dispensed from the mixing chamber. A process may be performed including producing, based on the first set of signals, the first portion of the beverage; producing, based on the second set of signals, the second portion of the beverage; and adding the second portion into the first portion to produce the beverage of selection.

In another aspect, the techniques described herein relate to a method for preparing a beverage in portions using the beverage system as disclosed herein. In some embodiments, the method may include receiving from a user a selection for a beverage; obtaining, based on the selection, information relating to respective amounts of a fluid and at least one target ingredient; generating, based on the obtained information, a first set of signals relating to the first portion and a second set of signals relating to the second portion. A process may be performed including producing, based on the first set of signals, the first portion of the beverage; producing, based on the second set of signals, the second portion of the beverage; and adding the second portion into the first portion to produce the beverage of selection.

In yet another exemplary aspect, the above-described methods are embodied in the form of processor-executable code and stored in one or more non-transitory computer-readable storage media. The code included in the computer readable storage media when executed by one or more processors, causes the one or more processors to implement the methods described in this patent document.

The above and other aspects and their implementations are described in greater detail in the drawings, the descriptions, and the claims.

BRIEF DESCRIPTION OF THE DRAWINGS

Features, aspects, and advantages of the presently disclosed technology may be better understood with regard to the following drawings.

DETAILED DESCRIPTION

A. Overview

Figure 1:
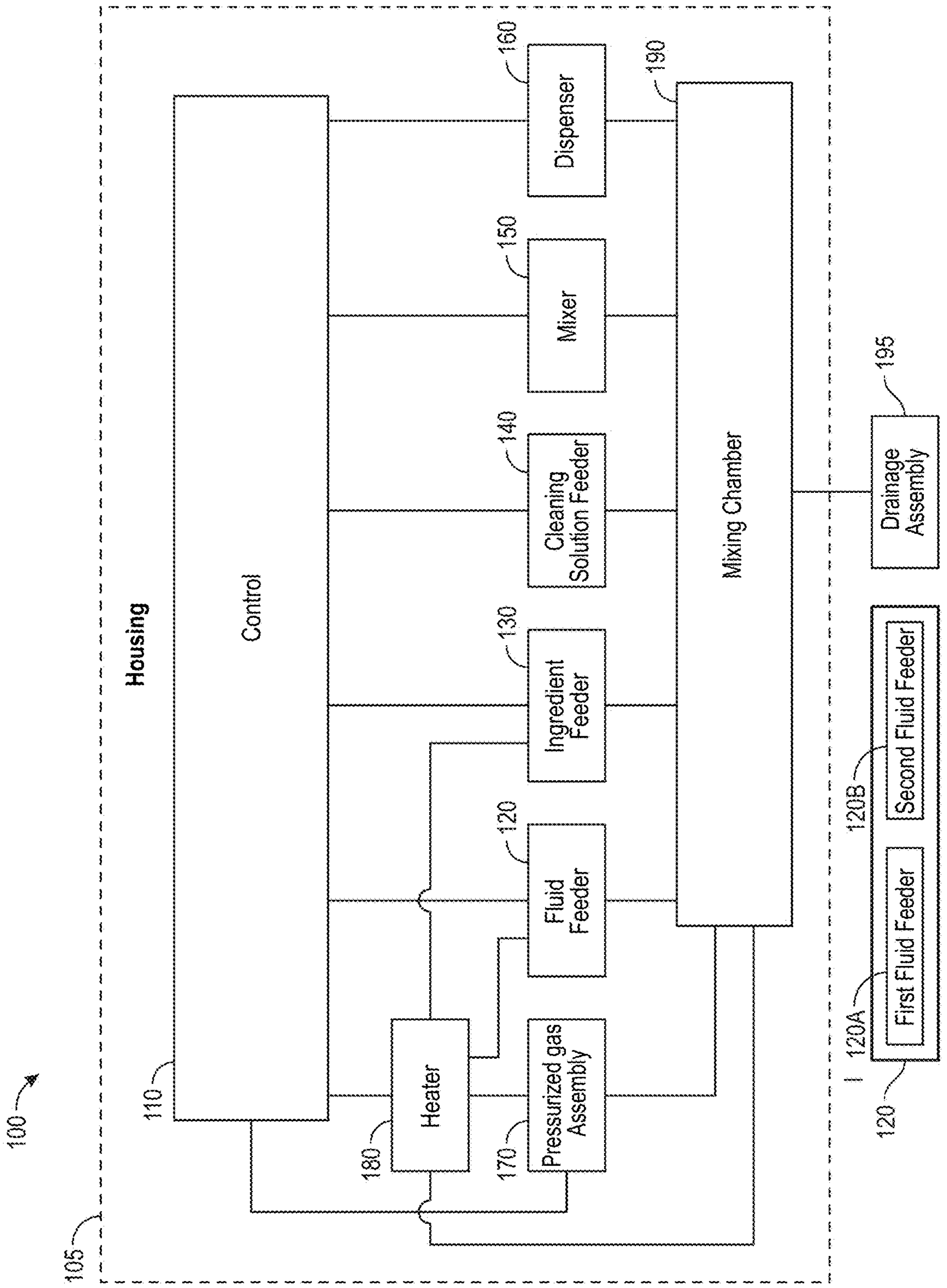
FIG. 1 is a schematic block diagram of a beverage system configured in accordance with embodiments of the present document.

Embodiments of the present document are directed to systems, devices, and methods for portioned beverage preparation. In some embodiments, the beverage system may include a fluid feeder configured to discharge a fluid; an ingredient feeder configured to discharge one or more ingredients; a mixing chamber having a dispensing opening, the mixing chamber configured to receive the fluid and the one or more ingredients; a mixer configured to mix the fluid and the one or more ingredients in the mixing chamber; a dispenser configured to control dispensing from the mixing chamber via the dispensing opening; and a controller or control circuit programmed to perform operations relating to producing a beverage using the system. In some embodiments, the controller or control circuit may be programmed to perform operations including: receiving from a user a selection for a beverage; obtaining, based on the selection, information relating to a first portion and a second portion of the beverage; generating, based on the obtained information, a first set of signals relating to the first portion and a second set of signals relating to the second portion; and producing the beverage in portions.

The system of embodiments of the document may achieve various technical benefits. The beverage system may dispense and mix ingredients of a beverage with minimal or no user intervention, ensuring precise and consistent ingredient applications and/or reducing ingredient waste. The system may accommodate different cup sizes (or beverage volumes) despite its compact mixing area. The system may allow a specialized dispensing algorithm to ensure consistent ingredient ratios and/or mixing throughout a beverage, maintaining high quality and flavor within each beverage and also across beverages made separately.

Additionally or alternatively, portioned preparation as disclosed herein may achieve various technical benefits. Portioned preparation may improve beverage quality and consistency by improved mixing of a portion of, rather than the entire volume of a beverage. Portioned preparation may also reduce or minimize the impact of overpouring because portions produced before the overpouring occurs are not impacted and only part of a beverage is impacted by the overpouring. Portioned preparation may allow flexibility in portion configuration. For example, a beverage may be produced in (substantially) identical portions. As another example, a beverage may be produced in different portions that include different types and/or amounts of fluid or at least one target ingredient. A last portion of a beverage may be configured to include only fluid (e.g., water) and no target ingredient and serve as a cleaning portion to clean at least part of the system, eliminating the need for a separate cleaning cycle (and associated water consumption and time) between consecutive beverage productions. The efficiency of a beverage production may be improved by partially overlapping the production of consecutive portions. As a further example, by configuring the type(s) and/or amounts of fluid and/or at least one target ingredient for each portion and also the production order of the portions of a beverage, the system may prepare various types of beverages, including, e.g., shaken beverages, layered beverages, and smoothies.

Specific details of several embodiments of the present document are described herein with reference to FIGS. 1 through 29. The present document, however, can be practiced without some of these specific details. In some instances, well-known structures and techniques often associated with beverage preparation, and the like, have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The headings provided herein are for convenience only and do not necessarily affect the scope of the embodiments. The accompanying Figures depict embodiments of the present document and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present document.

B. Embodiments of Beverage Systems

FIG. 1 is a schematic block diagram of a beverage system 100 ("the system 100") configured in accordance with embodiments of the present document. The system 100 can include a control 110, a fluid feeder 120, an ingredient feeder 130, a cleaning solution feeder 140, a mixer 150, a dispenser 160, a pressurized gas assembly 170, a heater 180, and a mixing chamber 190. In some embodiments, the system 100 may include a drainage assembly 195. At least some of these components 110-195 may be accommodated within a housing 105. As discussed further herein, the system 100 can be operated to prepare a beverage. In FIG. 1, some of the components are linked together by lines, indicating that those components can be operably coupled to one another. However, in some embodiments, those components may not be operably coupled as such.

The control 110 may be configured to interface with a user and/or coordinate the operation of the system 100. The control 110 may include one or more hardware and software components for controlling operation of the system 100. For example, the control 110 can include one or more processors (e.g., central processing unit(s) (CPU(s)), graphics processing unit(s) (GPU(s)), holographic processing unit(s) (HPU(s)), etc.) and memory (e.g., volatile storage, non-volatile storage) for storing instructions to be executed by the one or more processors. The control 110 may include or be in the form of one or more controllers, one or more controller circuits, or the like, or a combination thereof. Examples of controllers may include a microcontroller, a programmable logic controller (PLC), a digital signal controller (DSC), a motor controller, a temperature controller, a valve controller, or the like, or a combination thereof. In some embodiments, the control 110 may include a control circuit formed by a plurality of controllers.

The control 110 may include or function as a central command unit, interfacing with a user through input signals. The control 110 may interpret user input and translate it into actionable instructions for the system components. For instance, when a user selects a beverage option, the control 110 may process this input and send appropriate signals to the fluid feeder 120, the ingredient feeder 130, the mixer 150, the dispenser 160, causing the fluid feeder 120 and the ingredient feeder 130 to discharge appropriate amounts of fluid and one or more target ingredients, causing the mixer 150 to mix them in the mixing chamber 190, and causing the dispenser 160 to allow the resulting mixture to be dispensed from the mixing chamber 190 to a user's cup, thereby producing the beverage of choice automatically.

The control 110 can operate autonomously by utilizing embedded algorithms. Exemplary algorithms can include predetermined beverage production schedules to warm-up and peak/off-peak time management, beverage recipes (including, e.g., respective amounts of a fluid and one or more target ingredients, dispensing parameters, temperature, or the like, or a combination thereof), predictive algorithms to forecast demand based on historical data, cleaning schedules and/or protocols to maintain hygiene standards, or the like, or a combination thereof.

The signals generated by the controller or control circuit may be tailored for specific actions within the system 100. For instance:

Valve Control: The control 110 can generate signals to open or close a controllable valve (e.g., 226 in FIG. 2A), regulating the flow of water or other fluids through the system 100. This may allow that the right amount of fluid to be dispensed at a right time.

Actuator Control: Signals can be generated to control actuators (e.g., 264 in FIG. 2A) or motors (e.g., 254 in FIG. 2A) responsible for moving components of the system 100. This may involve driving the mixer 150 to perform mixing, moving the dispenser 160 to allow or block dispensing from the mixing chamber 190, etc.

Pump Operation: The control 110 can modulate the operation of pumps (e.g., 224, 244A, 244B, 274 in FIG. 2A) to adjust the flow rate and/or pressure of a fluid, a gas, a mixture, etc., maintaining consistency and quality in beverage production, cleaning, etc.

Temperature Regulation: The control 110 can manage heaters or coolers (e.g., 282 in FIG. 2A) within the system 100, sending signals to adjust the temperature of a fluid to a desired level, achieving that beverages are served at a desired temperature.

The control 110 may incorporate one or more feedback mechanisms, such as a weight sensor, an optical sensor, or the like, or a combination thereof, to monitor the operation of a corresponding component of the system 100, and automatically implement an adjustment as needed. These sensors may provide real-time data to the control 110, allowing it to precisely control the operation of the corresponding component and/or take timely prevention or remedial actions.

To ensure safe operation, the system 100 may include prevention features (e.g., overflow prevention features, emergency stop features, overheat protection features, etc.). For instance, the control 110 may be programmed with a maximum dispensing limit for one or more components, e.g., the fluid feeder 120, the ingredient feeder 130, the cleaning solution feeder 140, or other components of the system 100, to prevent accidental release of an excessive amount of content (e.g., fluid, an ingredient, a cleaning solution).

The control 110 may be designed to accommodate various performances including, e.g., production of various types of beverages, various cleaning cycles, and/or user preferences. Merely by way of example, it can be programmed with multiple preset cleaning routines for different cleaning needs, or it may include a user interface allowing manual input of parameters relating to beverage production, cleaning, etc. This programmability may enable the system 100 to adapt to different beverage production functions, cleaning needs (e.g., from light daily cleaning to more intensive periodic cleaning cycles), or the like, or a combination thereof.

The fluid feeder 120 may be configured to hold and/or discharge a fluid. The fluid may be used to make a beverage or clean at least a portion of the system 100. In some embodiments, the fluid may be water, e.g., tap water, filter water, etc. The fluid feeder 120 may include a fluid channel (e.g., 221 in FIG. 2A) where a fluid is discharged into the mixing chamber 190. The fluid channel may be coupled to a fluid supply source (e.g., 222 in FIG. 2A). The fluid supply source may include a tank, a container, or another storage component for storing the fluid. The fluid supply source may be part of the fluid feeder 120. For example, the fluid supply source may include a fluid tank positioned within or outside the housing 105. The fluid supply source may be an external source (e.g., tap water) connected to the fluid feeder 120 via a tube. The fluid supply source may be connected to the fluid channel via a tube. The fluid feeder 120 may include a pump (e.g., a pump 224 in FIG. 2A) and/or a valve (e.g., a metering valve 226 in FIG. 2A, a solenoid valve, or another type of controllable valve) to facilitate delivering the fluid from the fluid supply source to the fluid channel for discharging into the mixing chamber 190. At least one of the pump or the valve may be controlled, based on signals (e.g., signals from the control 110), to regulate when and/or how much fluid is fed to the fluid channel, or to the mixing chamber 190 via the fluid channel. A fluid may flow in only one direction, from the fluid supply source toward the mixing chamber 190, not in the reverse direction. Additional description may be found elsewhere in the present document. See, e.g., FIGS. 2A-5 and relevant description thereof.

Figure 2A:
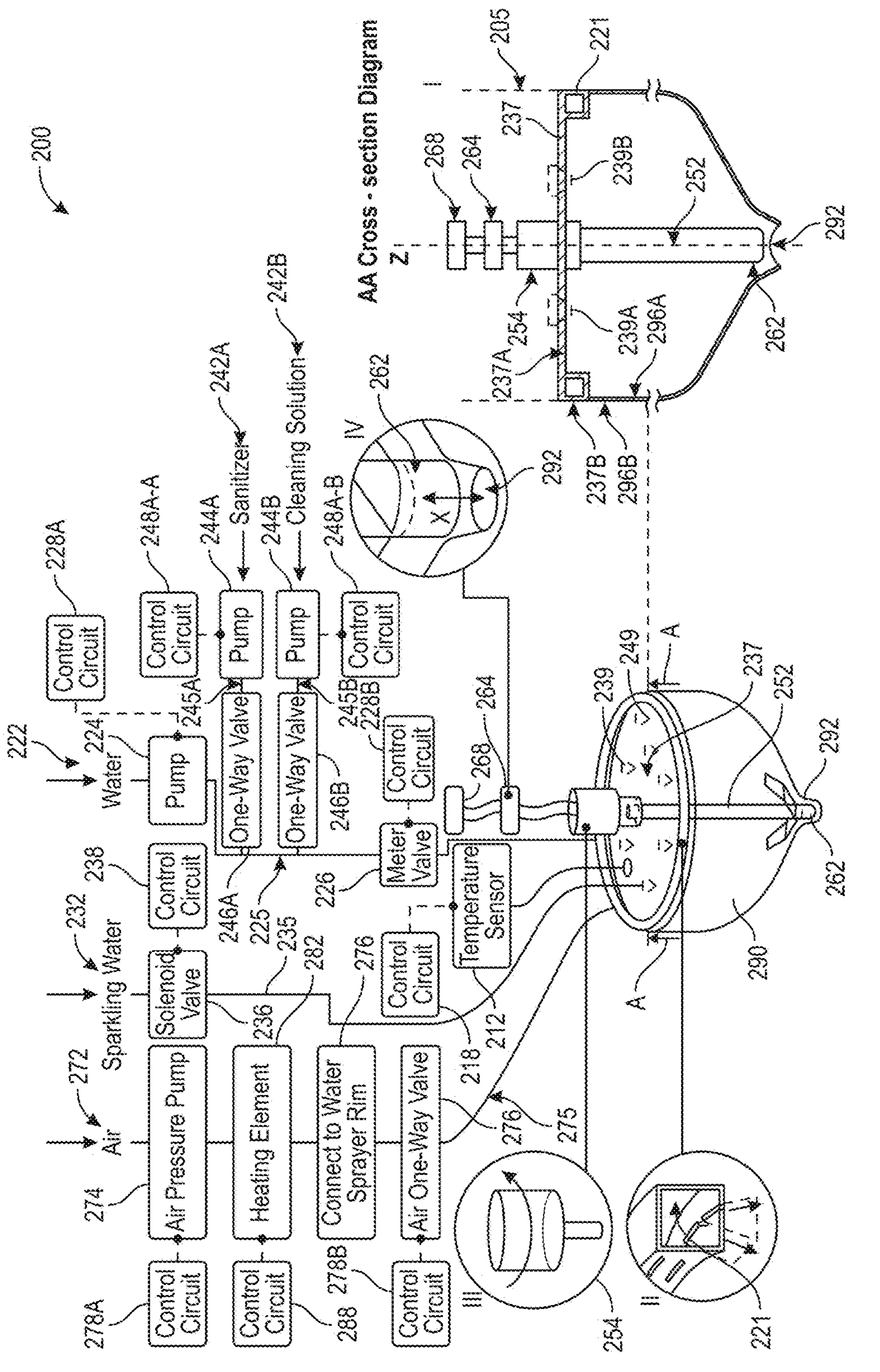
FIGS. 2A-10 are partial schematic illustrations of a beverage system configured in accordance with embodiments of the present document.

In some embodiments, as illustrated in panel I of FIG. 1, the system 100 may include multiple (e.g., two or more) fluid feeders 120 (individually identified as a first fluid feeder 120A and a second fluid feeder 120B) configured to feed same or different fluids to one or more other components of the system 100, e.g., the mixing chamber 190. At least two of the multiple fluid feeders 120 may be configured (substantially) the same. For example, each fluid feeder 120 may include or be connected to a fluid supply source (e.g., (substantially) identical or similar to the water source 222), a pump (e.g., (substantially) identical or similar to the pump 224), and/or a valve (e.g., (substantially) identical or similar to the valve 226). The pump may be controlled by a controller or control circuit. The valve may be controlled by a controller or control circuit. For example, the pump and the valve of a fluid feeder 120 may be controlled by a first controller and a second controller, respectively; the first controller and the second controller may be integrated onto a same control circuit. The pump and/or valve of a fluid feeder 120 may be configured based on one or more properties of the fluid including, e.g., density, viscosity, or the like, or a combination thereof. In some embodiments, at least two of the multiple fluid feeders may be connected to the same fluid channel (e.g., the fluid channel 221) for discharging a respective fluid into the mixing chamber 190. In some embodiments, the first fluid feeder 120A may be connected to the fluid channel for discharging a first fluid into the mixing chamber 190, while the second fluid feeder 120B may be configured to discharge a second fluid directly into the mixing chamber 190 (e.g., via an opening similar to 239 or 249 as illustrated in FIG. 2A).

The ingredient feeder 130 may be configured to hold and/or discharge one or more ingredients. The ingredient(s) may be used to make a beverage using the system 100. The ingredient feeder 130 may include a tank, a container, or one or more other storage components for storing one or more ingredients to be used for producing a beverage. Example ingredients include syrups (e.g., caramel syrup, mocha syrup), whipped cream, dairy and non-dairy milk alternatives (e.g., whole milk, skim milk, half-and-half, heavy cream, soy milk, almond milk, coconut milk, etc.), fruit purees or juices (e.g., mango puree/juice, strawberry puree/juice, peach puree/juice, pineapple puree/juice, apple puree/juice, orange puree/juice, etc.), and/or other fluid-based ingredients. A fruit juice may include pulp or not. In some embodiments, the ingredient feeder 130 may include multiple, isolated compartments for separately storing multiple ingredients. The ingredient feeder 130 may further include one or more ingredient nozzles (e.g., 239 in FIG. 2A; individually identified as a first ingredient nozzle 239A, a second ingredient nozzle 239B, and a third ingredient nozzle 239C in FIG. 2B) for discharging one or more ingredients into the mixing chamber 190. An ingredient nozzle 239 may be coupled to an ingredient container or source via a tube. An ingredient nozzle 239 may have the shape of a funnel (with a larger cross-section on the inlet side configured to receive an ingredient than on the outlet side where the ingredient is discharged into the mixing chamber), a column (with substantially uniform cross-sections along the Z direction extending between the inlet side and the outlet side of the ingredient nozzle), a reversed funnel (with a smaller cross-section on the inlet side than on the outlet side), etc. Multiple ingredient nozzles 239 on the nozzle plate 237 may have the same shape and dimension, or different shapes and/or dimensions. The ingredient feeder 130 may include a pump (e.g., 234, individually illustrated as a first ingredient pump 234A, a second ingredient pump 234B, and a third ingredient pump 234C in FIG. 2B) and/or a valve (e.g., 236 in FIG. 2A; individually illustrated as a first ingredient valve 236A, a second ingredient valve 236B, and a third ingredient valve 236C in FIG. 2B) to facilitate delivering an ingredient from an ingredient container to the ingredient nozzle for discharging into the mixing chamber 190. At least one of the pump and/or the valve may be controlled, based on signals (e.g., signals from the control 110), to regulate when and/or how much an ingredient is fed to the mixing chamber 190 via a corresponding ingredient nozzle. The ingredient feeder 130 may include a nozzle plate (e.g., 237 in FIG. 2A) where one or more ingredient nozzles (e.g., 239 in FIGS. 2A and 2B) are supported. The nozzle plate may be supported on the mixing chamber 190. An ingredient may flow in only one direction, from an ingredient source (e.g., 232; individually identified as a first ingredient source 232A, a second ingredient source 232B, and a third ingredient source 232C in FIG. 2B) toward the mixing chamber 190, not in the reverse direction. For example, an ingredient valve (e.g., 236 in FIGS. 2A and 2B) may be a one-way valve. Additional description may be found elsewhere in the present document. See, e.g., FIGS. 2A and 2B and relevant description thereof.

The cleaning solution feeder 140 may be configured to hold and/or discharge one or more cleaning solutions. The cleaning solution(s) may be used to clean at least a portion of the system 100. The cleaning solution feeder 140 may include a tank, a container, or one or more other storage components for storing one or more cleaning solutions to be used for cleaning at least a portion of the system 100, e.g., the mixer 150, the dispenser 160, the mixing chamber 190, etc. Example cleaning solutions may include a detergent, a degreaser, a sanitizer, or a disinfectant, etc. In some embodiments, the cleaning solution feeder 140 may include or have access to multiple cleaning solutions such that the system 100 may perform a cleaning process using one or more cleaning solutions. For example, a cleaning process may include multiple steps, each using a different cleaning solution. Merely by way of illustration, a cleaning process may include a first step using a detergent (either alone or mixed with a fluid, e.g., water), a second step using a degreaser (either alone or mixed with a fluid, e.g., water), a third step using disinfectant (either alone or mixed with a fluid, e.g., water), and a fourth step of blow drying.

Cleaning solutions may be guided through various portions of the system 100 for cleaning purposes. In some embodiments, a cleaning solution may flow through at least a portion of the fluid feeder 120 and then to the mixing chamber 190. See, e.g., FIG. 2A and relevant description thereof. For example, a cleaning solution may be mixed with the fluid in the fluid feeder 120 before being discharged into the mixing chamber 190. As another example, a cleaning solution may flow through at least a portion of the fluid feeder 120 and into the mixing chamber 190 without being mixed with the fluid. In some embodiments, a cleaning solution may be discharged into the mixing chamber 190 directly without going through the fluid feeder 120. The cleaning solution feeder 140 may include or be connected to one or more cleaning solution nozzles (e.g., 249 in FIG. 2B) for discharging one or more cleaning solutions into the mixing chamber 190. A cleaning solution nozzle may be coupled to a cleaning solution container via a tube (e.g., 245 in FIG. 2B). A cleaning solution nozzle 249 may have the shape of a funnel (with a larger cross-section on the inlet side configured to receive an ingredient than on the outlet side where the ingredient is discharged into the mixing chamber), a column (with substantially uniform cross-sections along the Z direction extending between the inlet side and the outlet side of the ingredient nozzle), a reversed funnel (with a smaller cross-section on the inlet side than on the outlet side), etc. Multiple cleaning solution nozzles 249 on the nozzle plate 237 may have the same shape and dimension, or different shapes and/or dimensions. In some embodiments, a cleaning solution nozzle 249 may have the same shape and/or dimension as an ingredient nozzle 239. In some embodiments, a cleaning solution nozzle 249 may have different shapes and/or dimensions than an ingredient nozzle 239. The cleaning solution feeder 140 may include a pump (e.g., 234A, 234B, and 234C in FIG. 2B) and/or a valve (e.g., 236 in FIG. 2A; 236A, 236B, and 236C in FIG. 2B) to facilitate delivering a cleaning solution from a cleaning solution container to the cleaning solution nozzle for discharging into the mixing chamber 190. At least one of the pump and/or the valve may be controlled, based on signals (e.g., signals from the control 110), to regulate when and/or how much a cleaning solution is fed to the mixing chamber 190. A cleaning solution may flow in only one direction, from a cleaning solution source (e.g., individually identified as a first cleaning solution source 242A and a second cleaning solution source 242B in FIG. 2A; 242 in FIG. 2B) toward the mixing chamber 190, not in the reverse direction. For example, a cleaning solution valve (e.g., a first cleaning solution valve 246A and a second cleaning solution valve 246B in FIG. 2A) may be a one-way valve. Additional description may be found elsewhere in the present document. See, e.g., FIGS. 2A and 2B and relevant description thereof.

The mixing chamber 190 may be configured to receive content from one or multiple sources. The mixing chamber 190 may receive content from one or more sources including the fluid feeder 120, the ingredient feeder 130, and the cleaning solution feeder 140. The mixing chamber 190 may be positioned along a vertical direction (e.g., along a rotation axis Z of the mixing chamber 290 as illustrated in FIG. 2A) below, at substantially the same level as, or above at least a portion of the fluid feeder 120, the ingredient feeder 130, and/or the cleaning solution feeder 140. For example, the fluid feeder 120 may include or be coupled to a fluid source (e.g., water source 222 as illustrated in FIGS. 2A-4, which may include or be connected to a water container or a municipal water supply line (e.g., a tap water supply line commonly found in residential or commercial buildings)) to receive a fluid; the mixing chamber 190 may be positioned below at least a portion of the fluid source (along the vertical direction), allowing fluid to flow from the fluid source into the mixing chamber 190 driven at least in part by gravity. As another example, the mixing chamber 190 may be positioned substantially at the same level as or above at least a portion of the fluid source along the vertical direction, allowing fluid to flow from the fluid source into the mixing chamber 190 driven at least in part by a pump.

The mixing chamber 190 may include a dispensing opening (e.g., 292 in FIG. 2A) through which the content may be dispensed, e.g., to a user's cup, a drainage assembly, a drainage container, etc. The mixing chamber 190 may provide a space where the content can be mixed before being dispensed. For example, the mixing chamber 190 may receive content including the fluid from the fluid feeder 120 and one or more ingredients from the ingredient feeder 130, the content may be mixed in the mixing chamber 190 using the mixer 150 to form a mixture, and the mixture may be dispensed from the mixing chamber 190 via the dispensing opening. As another example, the mixing chamber 190 may receive content (e.g., the fluid) and allow the content to be dispensed from the mixing chamber 190 without being mixed with another substance (e.g., a different fluid, a cleaning solution, or an ingredient). The mixing chamber 190 may include one or more food-grade materials. Suitable materials for the mixing chamber 190 may include stainless steel, silicone, plastic, or rubber, depending on the durability and compatibility with the content of the mixing chamber 190. Additional description may be found elsewhere in the present document. See, e.g., FIGS. 2A-4 and relevant description thereof.

The mixer 150 may be configured to mix content in the mixing chamber 190. The content may include, e.g., a fluid (e.g., the fluid from the fluid feeder 120), one or more other ingredients (e.g., one or more ingredients from the ingredient feeder 130), one or more cleaning solutions (e.g., one or more ingredients from the cleaning solution feeder 140). In use, the mixer 150 may be at least partially immersed in the content (including a liquid medium). For example, the mixer 150 may mix a fluid (e.g., from the fluid feeder 120) with one or more ingredients in the mixing chamber 190 as part of the process of producing a beverage of choice. As another example, the mixer 150 may mix a fluid (e.g., from the fluid feeder 120) with one or more cleaning solutions in the mixing chamber 190 as part of a cleaning process. The mixer 150 may include a mechanical stirrer, a vibration stirrer, an ultrasonic transducer, or a combination thereof. For example, the mixer 150 may include a mechanical stirrer coupled to a rotating motor (e.g., 252 in FIG. 2A), thereby performing mixing by rotating. As another example, the mixer 150 may include a transducer coupled to a pulse generator, thereby performing mixing by ultrasonic vibration. The rotating motor or the pulse generator may be controlled based on signals from, e.g., the control 110. In some embodiments, the mixer 150 may be detachable from its actuator or transducer for cleaning or replacement. In some embodiments, the coupling between the mixer 150 and the actuator may be not detachable. For example, the system 100 is configured with automated cleaning features and it is unnecessary to remove the mixer 150 for cleaning. The mixer 150 may include one or more food-grade materials. Suitable materials for the mixer 150 may include including stainless steel, aluminum, food-grade plastic, silicone, fiberglass, rubber, or the like, or an alloy, or a combination thereof, depending on one or more factors including safety, durability, weight, compatibility with the content of the mixing chamber 190, etc. Additional description may be found elsewhere in the present document. See, e.g., FIGS. 2A and 6-10 and relevant description thereof.

The dispenser 160 may be configured to control dispensing from the mixing chamber 190 via, the dispensing opening (e.g., 292 in FIG. 2A). In some embodiments, the dispenser 160 may be moveable to adjust the extent to which the dispensing opening is available for dispensing. The dispenser 160 may be coupled to an actuator controlled based on signals from, e.g., the control 110. Merely by way of example, the dispenser 160 may partially block or completely block the dispensing opening, thereby reducing or eliminating the flow exiting the mixing chamber 190 through the dispensing opening. The dispenser 160 may include a plug (e.g., 262, 862 (e.g., a second end portion 863B of the rod 862), 962 in FIGS. 2A and 6-10) having a shape and size complementary to the dispensing opening of the mixing chamber 190. The dispenser 160 may include one or more food-grade materials. Suitable materials for the dispenser 160 may include a material including stainless steel, aluminum, food-grade plastic, silicone, fiberglass, rubber, or the like, or an alloy, or a combination thereof, depending on one or more factors including safety, durability, weight, compatibility with the content of the mixing chamber 190, etc. Additional description may be found elsewhere in the present document. See, e.g., FIGS. 2A and 6-10 and relevant description thereof.

The pressurized gas assembly 170 may be configured to provide pressurized gas. In some embodiments, the gas may include air. The pressurized gas assembly 170 may include a gas pump. The pressurized gas assembly 170 may provide pressurized gas into one or more portions of the system 100. For example, the pressurized gas assembly 170 may provide pressurized gas into the mixing chamber 190 to facilitate mixing of ingredients by performing aeration mixing. See, e.g., FIGS. 9 and 10 and relevant description thereof. As another example, the pressurized gas assembly 170 may provide pressurized gas into the mixing chamber 190 to facilitate dispensing of content (e.g., a mixture) from the mixing chamber 190 into, e.g., a user's cup. As a further example, the pressurized gas assembly 170 may supply pressurized gas to the fluid channel 221 or spray rim 429.

This pressurized gas can either pressurize a fluid to enhance cleaning performance or, without mixing with water, blow dry at least a portion of the system 100 for cleaning and/or storage purposes. The operation of the pressurized gas assembly 170 (e.g., a gas pump of the pressurized gas assembly 170) may be controlled based on signals from, e.g., the control 110.

In some embodiments, the pressurized gas assembly 170 may serve as a vacuum assembly configured to remove air from the mixing chamber 190. For example, through an opening on the nozzle plate 237, a gas pump in the pressurized gas assembly 170 may extract air from the mixing chamber 190 before ingredient(s) and/or fluid are added or mixed in the mixing chamber 190. This air extraction process may continue for a certain period (e.g., 10, 20, or 30 seconds) and/or until the air pressure in the mixing chamber 190 reaches a specified level. Reducing or minimizing air in the mixing chamber 190 during the mixing operation may slow down ingredient oxidation and/or reduce foam generation (e.g., when mixing a dairy product), thereby improving the quality of the produced beverage and/or simplifying the cleaning process. For instance, reducing foam during the blending process helps prevent dairy products from adhering to hard-to-clean corners, making the system 100 easier to clean.

The heater 180 may be configured to heat content and/or components of the system 100. In some embodiments, the heater 180 may be configured to heat a fluid, an ingredient, and/or a gas to facilitate the production of a warm or hot beverage of choice, and/or to aid in the cleaning of the system. The operation of the heater 180 may be controlled based on signals from, e.g., the control 110.

The drainage assembly 195 may be configured to facilitate drainage within the system 100 including, e.g., drainage of waste liquid generated in a cleaning process, overflow of a portion of a beverage produced, etc. In some embodiments, one or more of other components of the system 100 may drain directly to the drainage assembly 195. Merely by way of example, the fluid feeder 120 may be connected to the drainage assembly 195 via a tube to drain the fluid for one or more purposes including, e.g., cleaning, overflow protection, etc.

In some embodiments, the drainage assembly 195 may be connected to a drainage system, providing several technical benefits that enhance its functionality and operational efficiency. The inclusion of a drainage assembly 195 may allow liquid waste, such as overflow from beverages or used cleaning liquid, to be drained away automatically or with minimal user intervention. This automated drainage capability may ensure that the system 100 remains clean and free of excess liquid, reducing the risk of spillage and maintaining a hygienic environment. The integration of the drainage assembly 195 may simplify the maintenance process by reducing or eliminating the need for manual emptying of waste containers, thereby saving time and labor. Additionally, the continuous drainage of liquid waste may help prevent potential damage or wear to the system components caused by liquid buildup, thus extending the overall lifespan of the system. This feature may be beneficial in high-use settings, where efficient waste management is needed for uninterrupted operation. Moreover, by ensuring that waste liquids are promptly and efficiently removed, the system 100 may maintain optimal performance and reliability, as well as the quality of the beverages produced.

In some embodiments, the system 100 may omit a drainage assembly connected to a drainage system (e.g., a sewage line). Traditional drainage solutions typically need connection to sewage lines, sump pumps, or specialized drainage tanks, which can limit the flexibility of system installation and/or use. By eliminating the need for these drainage infrastructures, the system 100 can be set up in locations without access to such drainage systems, providing greater flexibility in its deployment. This design feature may allow the system 100 to be installed in a wider variety of environments, including remote locations (e.g., at an outdoor event or outdoor seating area of a facility) or temporary sites (e.g., temporarily in different conference rooms or party rooms when needed) where traditional drainage solutions are not feasible. This flexibility may enhance the system's versatility, making it suitable for diverse applications and reducing the constraints associated with conventional drainage solutions. Additionally or alternatively, omitting the drainage assembly may simplify the system's design and may reduce installation and maintenance costs, thereby improving overall operational efficiency and cost-effectiveness. For example, the drainage assembly 195 may include a waste bin to collect small amounts of overflow. The waste bin may be positioned underneath the space where dispensing from the mixing chamber 190 occurs and/or where a user cup is placed. As an illustration, the waste bin may include a container and a cover with features (e.g., slots, perforations) that allow the passage of liquid waste (e.g., beverage overflow). The waste bin may be emptied manually. For example, the waste bin may include a sensor or sensing circuit configured to monitor the level of liquid waste and provide a notification if the level exceeds a threshold. The system 100 may be configured to notify a user that a cleaning process is to be performed and/or requests that the user place a container underneath the mixing chamber 190 or elsewhere to collect used cleaning liquid. A notification may be a visual indicator (e.g., a floating tag that becomes visible to a user when the level exceeds a threshold or when a cleaning process is to be performed). The notification may be an electronic alert sent to the system 100 and/or a user in one or more of various forms including, e.g., text, audio, image, a flashing light, or the like, or a combination of thereof.

In some embodiments, the housing 105 may prevent public access to the components of the system 100 positioned within the housing 105. For example, the ingredient feeder 130 may be located inside the housing 105 and inaccessible to the general public for safety, hygiene, and/or other considerations. As another example, the control 110 may be located inside the housing 105, making it inaccessible to the general public to prevent damage from environmental disturbances (e.g., spills, physical impacts) and to ensure reliable operation. The control 110 may interface with a user via a user interface (e.g., a touch screen) installed on the housing 105. There may be multiple compartments within the housing 105, each with different access-control mechanisms. For example, the housing 105 may include compartment 1 and compartment 2; access to compartment 1 may be lock or password protected, while access to compartment 2 may be granted upon request or combined with one or more other criteria. The ingredient feeder 130 is located within compartment 1 and is accessible only to authorized users (e.g., authorized staff of a restaurant or office). In contrast, the mixer 150 is accessible upon request, such as when a user requests to replace a stirrer suitable for preparing a selected beverage. In some embodiments, there may be multiple compartments within the housing 105 to achieve the desired separation between different components of the system 100. Examples of separation types include fluid separation, thermal separation, and physical separation for various considerations such as convenient cleaning, preventing cross-contamination, enhancing safety, ensuring proper insulation, and optimizing component performance. These separations may help maintain the integrity and efficiency of the system 100. In some embodiments, the housing 105 of the system 100 may be made from suitable materials such as stainless steel, aluminum, high-density polyethylene (HDPE), polycarbonate, etc. These materials are chosen for their durability, ease of cleaning, and resistance to corrosion. The system 100 may be placed in various locations, including a restaurant, a break room in an office, or a shopping mall, allowing it to meet the demands of different environments. Components of the system 100 may be arranged within or in a vicinity of the housing 105 based on one or more considerations including the vertical positioning for optimal fluid flow, the proximity for efficient operation and maintenance, potential system expansion, ease of access for cleaning and maintenance (e.g., refilling ingredients, cleaning solutions, etc.), or the like, or a combination thereof.

In some embodiments, at least some components of the system 100 may include a material that is dishwasher safe. For example, at least one of the mixer 150, the dispenser 160, or the mixing chamber 190 may include a material that is dishwasher safe, and can be removed from the system 100 to be cleaned in a dishwasher or manually.

In some embodiments, at least a portion of a component of the system 100 may include a coating. For example, at least a portion of the mixing chamber 190 may include one or more coatings, e.g., a first coating on an inner wall (e.g., 296A of the mixing chamber 290) and/or a second coating on an outer wall (e.g., 296B) of the mixing chamber 190, where the first coating and the second coating may be the same or different. As another example, at least a portion of the fluid feeder 120, the ingredient feeder 130, the cleaning solution feeder 140, the mixer 150, the dispenser 160, the pressurized gas assembly 170, or the heater 180, may include a coating. A coating may be configured to exhibit one or more properties including, e.g., hydrophobic or hydrophilic property, a thermal barrier, a corrosion resistance, wear and abrasion resistance, non-stick property, or the like, or a combination thereof. A coating may include one or more materials. Examples of applicable coating materials may include Polytetrafluoroethylene (PTFE, also known as Teflon), Perfluoroalkoxy Alkane (PFA), Fluorinated Ethylene Propylene (FEP), food-grade epoxy, silicone, ceramics, polyurethane, Polyether Ether Ketone (PEEK), or the like, or a combination thereof. A coating material may be applied by, e.g., spray coating, sol-gel process, chemical vapor deposition, physical vapor deposition, or the like, or a combination thereof.

FIGS. 2A-6 provide partially schematic illustrations of a beverage system 200 ("the system 200") configured in accordance with embodiments of the present document. The system 200 illustrates an exemplary implementation of the system 100, including the housing 105, the control 110, the fluid feeder 120, the ingredient feeder 130, the cleaning solution feeder 140, the mixer 150, the dispenser 160, the pressurized gas assembly 170, the heater 180, and the mixing chamber 190. For illustration purposes only and not intended to be limiting, the system 200 may receive and distribute water using the fluid feeder 120 and air using the pressurized gas assembly 170. It is understood that the system 200 may receive and distribute one or more fluids other than water using the fluid feeder 120 and/or one or more gases other than air using the pressurized gas assembly 170. The system 200 may include a housing 205. The housing 205 may be (substantially) the same as or similar to the housing 105 of the system 100, the description of which is applicable and not repeated here.

The fluid feeder 120 of the system 200 may include or be coupled to a water source (or referred to as water supply) 222 to receive water for distribution within the system 200 for producing a beverage and/or cleaning at least part of the system 200. The water source 222 may include a water container or an external water supply source (e.g., tap water, filtered or unfiltered). In some embodiments, the fluid feeder 120 may include or be coupled to multiple liquid sources to receive liquids of different types for distribution within the system 200. Such multiple liquid sources may share at least a portion of the fluid feeder 120. For example, the multiple liquid sources may be connected to a tube (e.g., tube 225 as illustrated in FIGS. 2A-5) via a multi-way valve. Two or more liquid sources may share the same pump or be coupled to different pumps.

The fluid feeder 120 may include or be in fluid communication with a fluid channel (also referred to as a fluid conduit) 221 coupled to the water source 222. The fluid channel 221 may include one or more openings through which the fluid channel 221 receives water from, e.g., the water supply 222, and/or discharges water to another component of the system 200, e.g., the mixing chamber 290. Panel I in FIG. 2A illustrates a cross-sectional view of a portion of the system 200 from A-A. Panel II in FIG. 2A is an enlarged view of the fluid channel 221. Additional description of the fluid channel 221 may be found elsewhere in the present document. See, e.g., FIGS. 3 through 5 and relevant description thereof.

Water may be guided from the water source 222 to the fluid channel 221 in a controllable manner via a fluid pathway including a tube 225, such that one or more parameters of the flow of water may be regulated. Examples of these parameters may include the amount, pressure, timing of the water flow, or a combination thereof. The control may be achieved using at least one of a pump 224, a controllable valve 226, or the like, or a combination thereof. The pump 224 and the valve 226 may be arranged at different locations on the tube 225 of the fluid pathway. The operation of the pump 224 may be controlled by a pump controller or control circuit 228A. The controllable valve 226 may include a metering value, a solenoid valve, or the like. The operation of the controllable valve 226 may be controlled by a valve controller or control circuit 228B. In some embodiments, water may flow in only one direction, from the water source 222 toward the mixing chamber 290, not in the reverse direction. For example, the controllable valve 226 may be a one-way valve.

The fluid channel 221 may be positioned around the circumference, or a portion thereof, of the mixing chamber 290 (or the mixing chamber 190 as illustrated in FIG. 1). For example, the mixing chamber 290 may have a rim 294 defining an opening through which it receives content from sources such as the fluid feeder 120, the ingredient feeder 130, and the cleaning solution feeder 140. The fluid channel 221 may have an annular shape and be positioned at or near the rim 294 and extend along the rim 294, or a portion thereof.

Figure 2B:
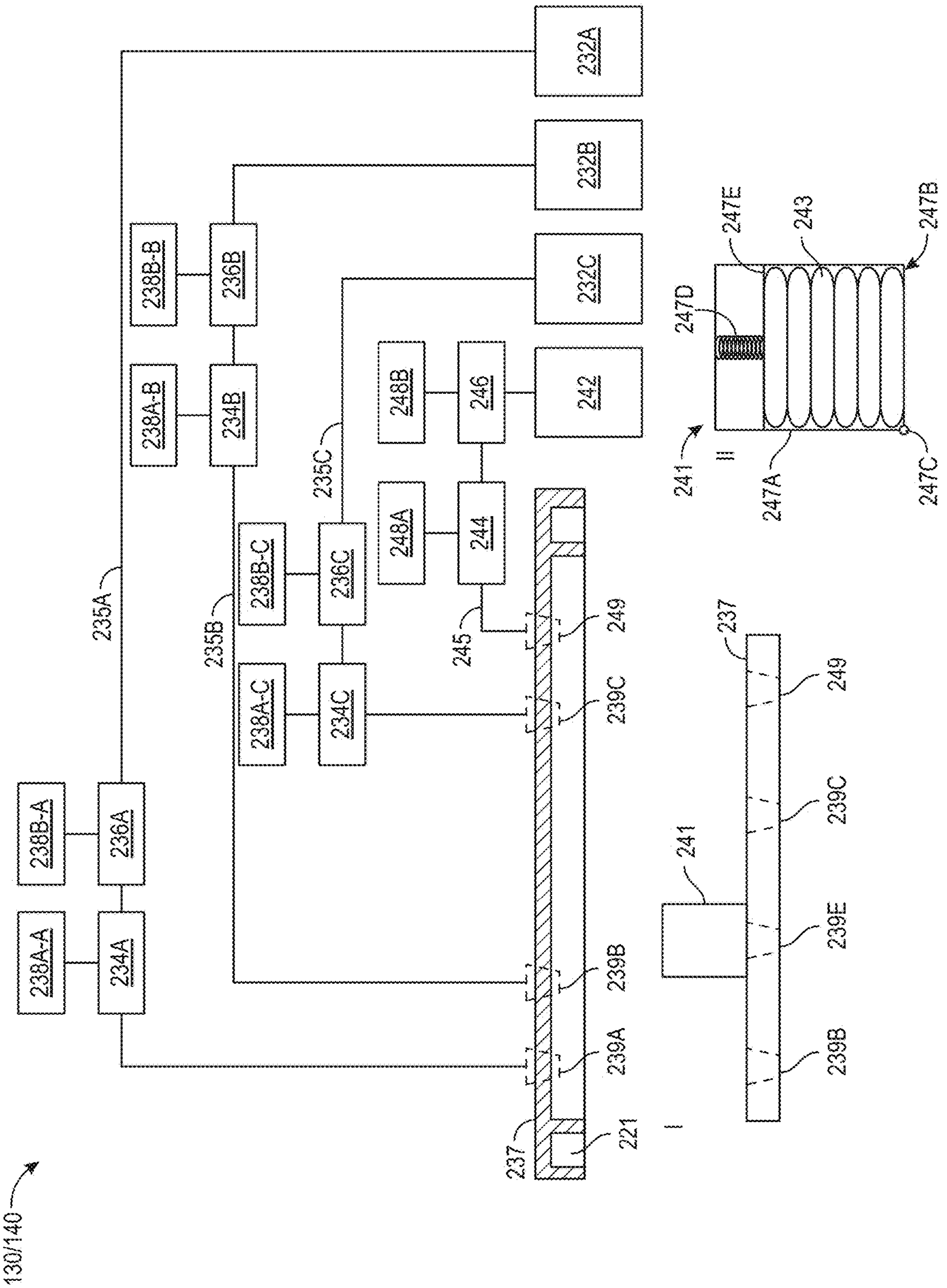
Figure 2C:
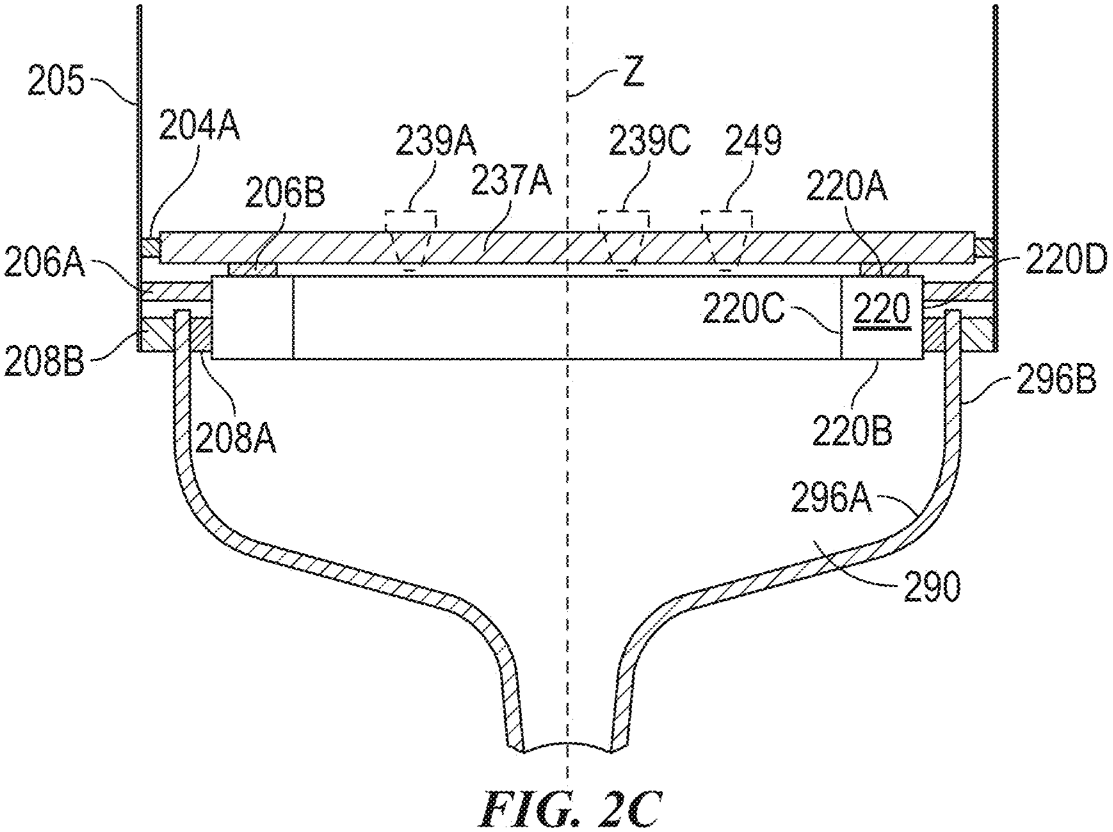
Figure 2D:
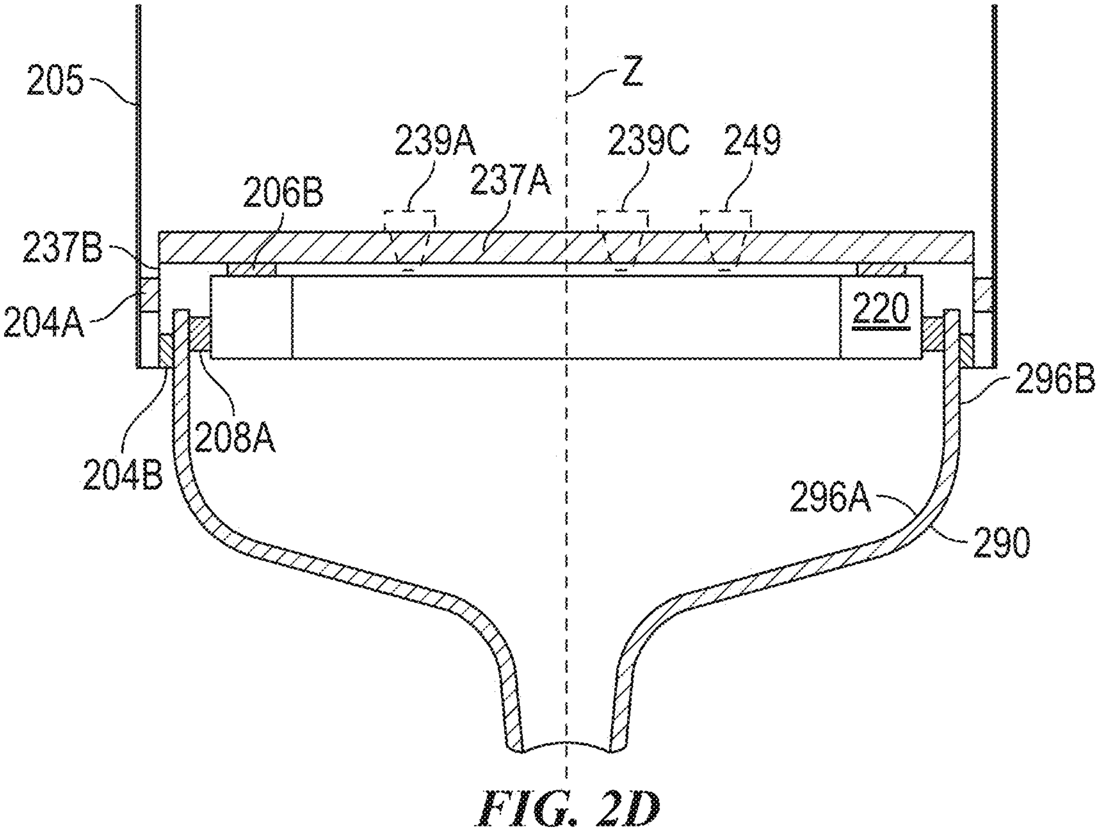
Figure 2E:
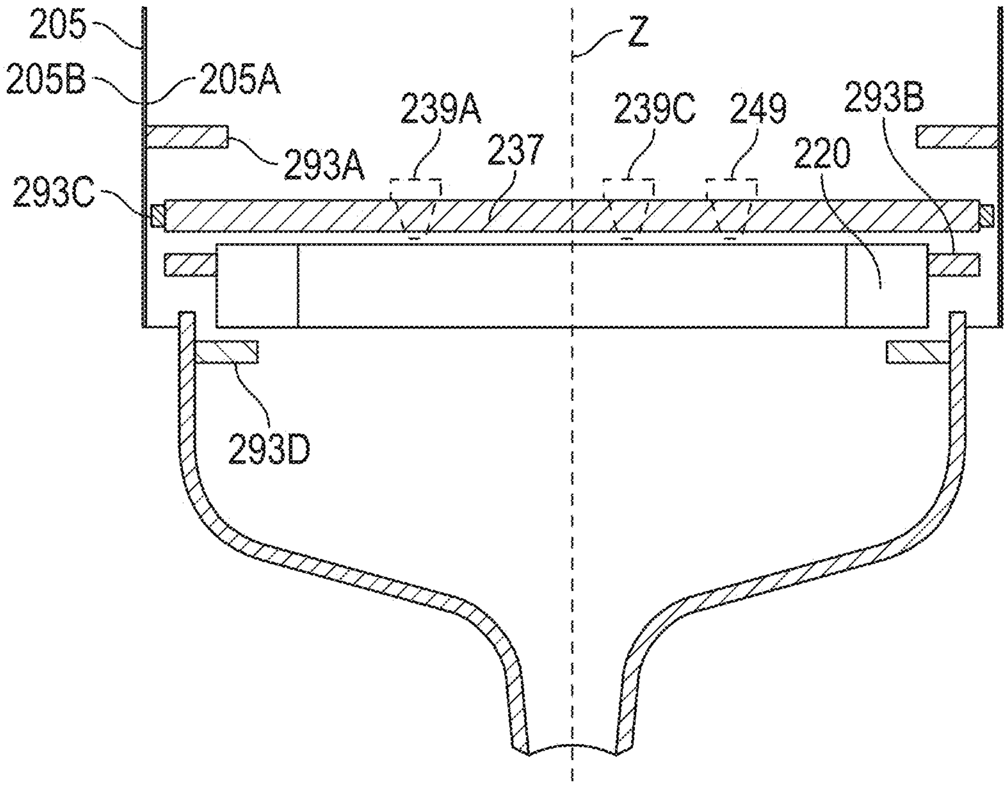
Figure 3:
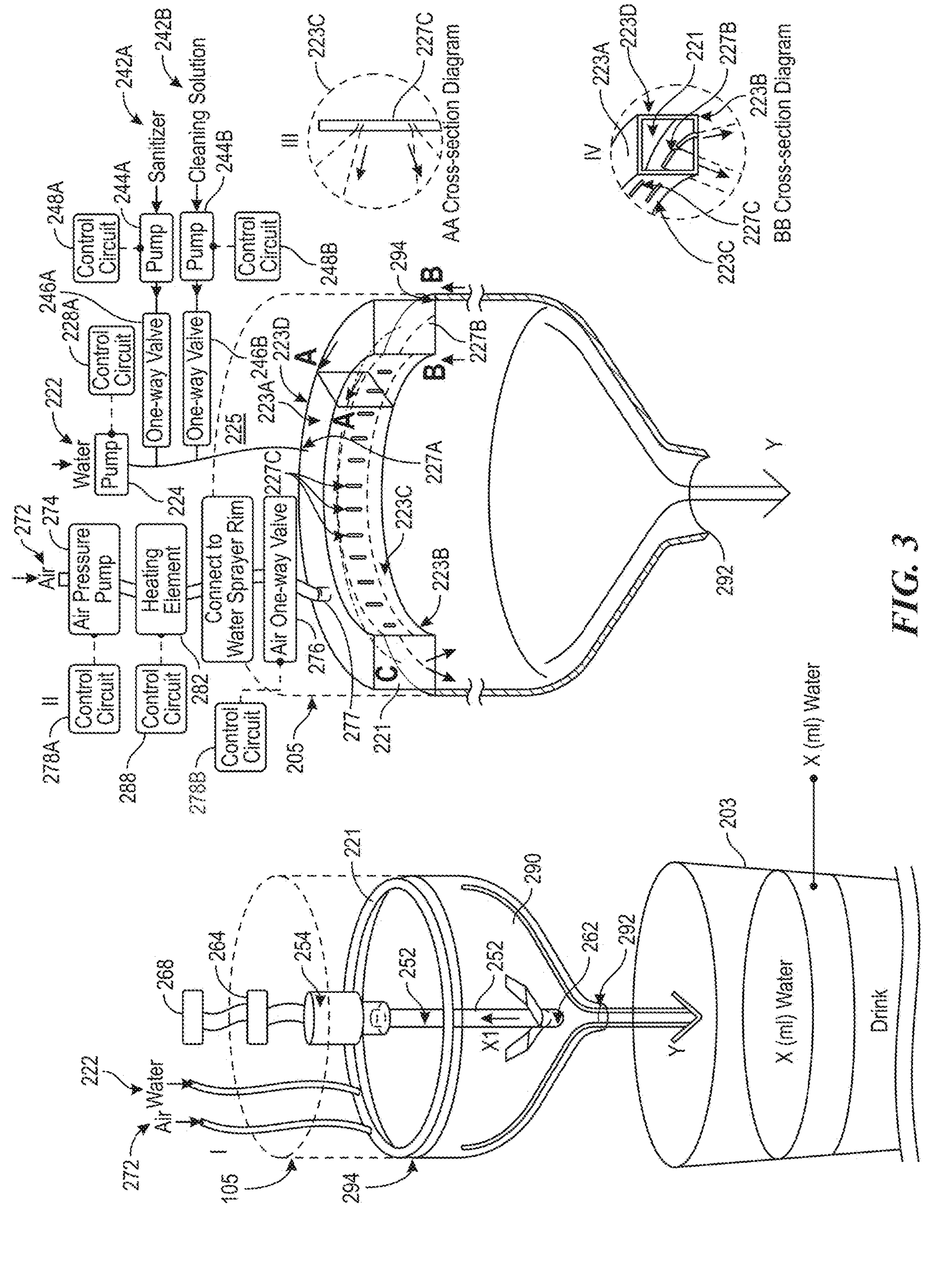
Figure 4:
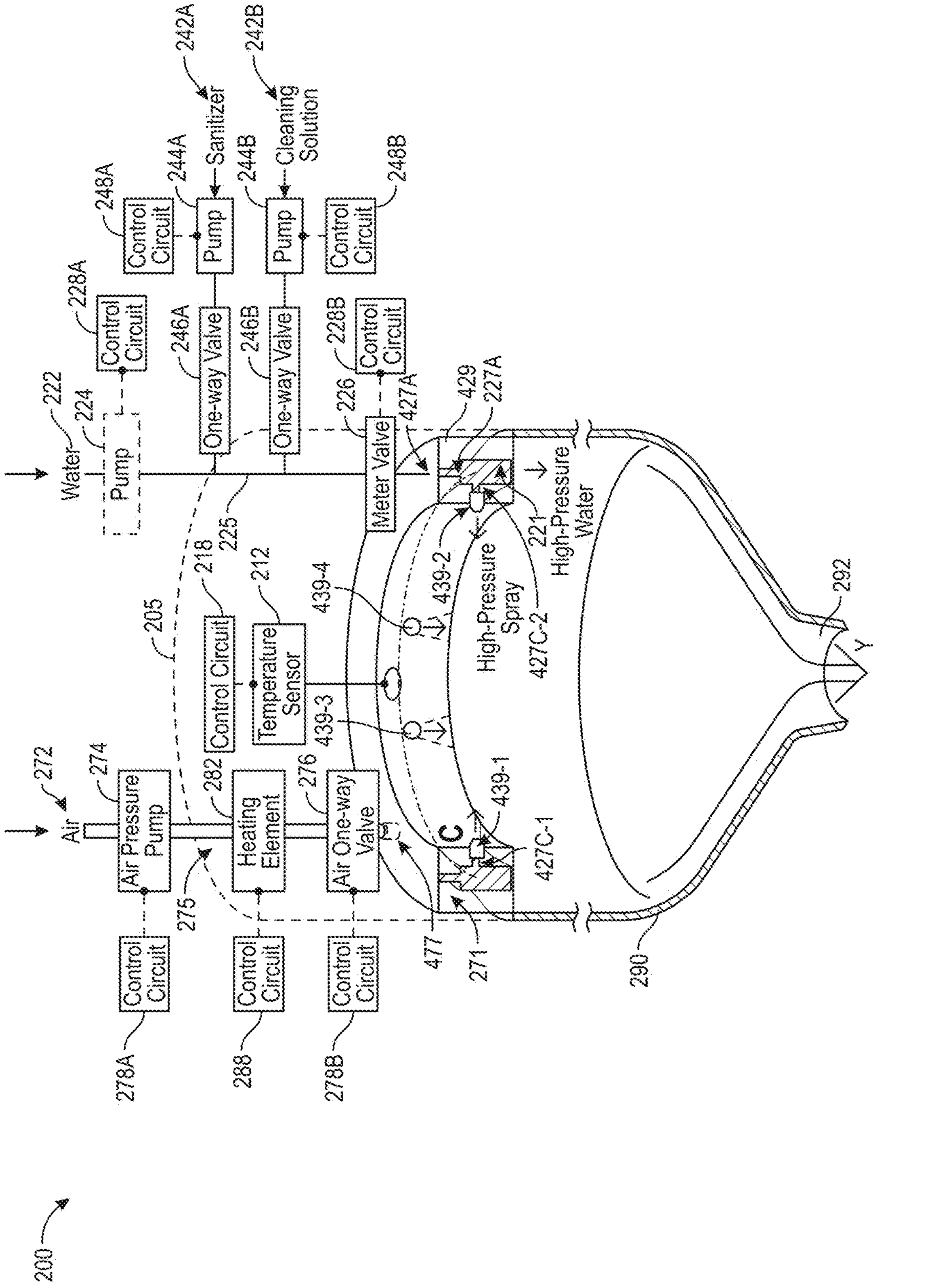
Figure 5:
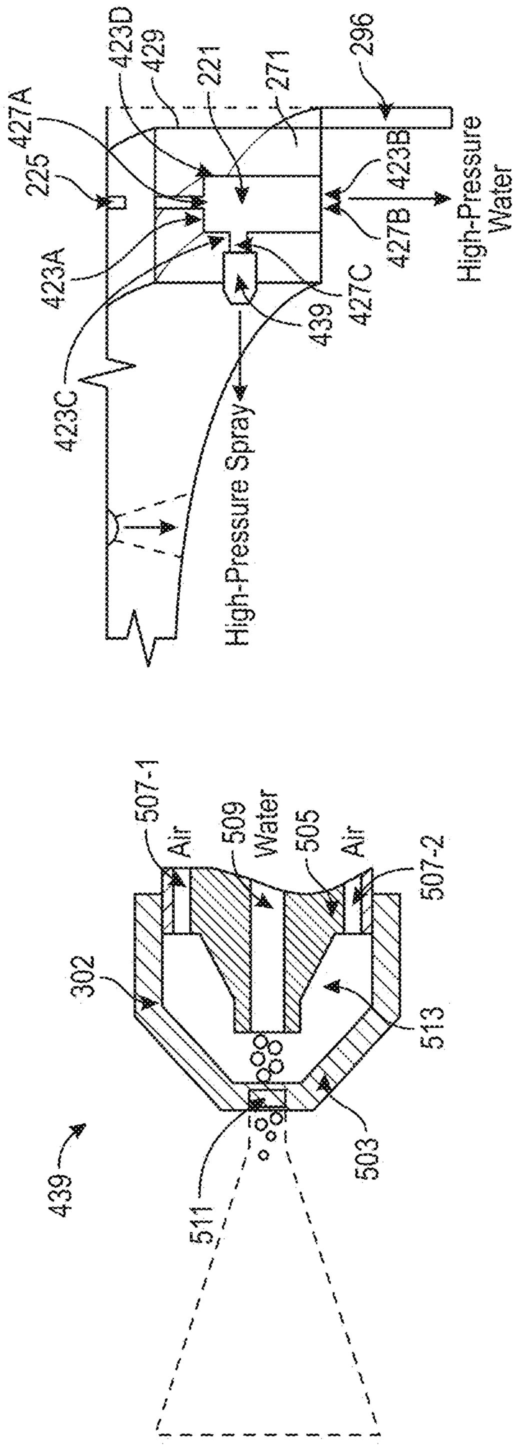

The fluid channel 221 may constitute a spray rim 220 (as illustrated in FIG. 3), or be incorporated into a portion thereof (e.g., 429 in FIGS. 4 and 5). As shown in FIGS. 2C-2E, this spray rim 220 has an interior formed by one or more walls, individually identified as a first wall 220A, a second wall 220B, a third wall 220C, and a fourth wall 220D. The first wall 220A and the second wall 220B may oppose each other, with the second wall (or referred to as bottom wall) 220B facing toward the mixing chamber 290. The third wall 220C and the fourth wall 220D (or referred to as sidewalls 220C and 220D) may oppose each other, connecting the first wall 220A and the second wall 220B. The third wall 220C may face the rotation axis Z (as illustrated in FIG. 2C) of the mixing chamber 290. In some embodiments, at least two of the walls 220A, 220B, 220C, and 220D may be a single integral piece. For example, the first wall 220A and the third wall 220C may be an integral piece. Alternatively, the first wall 220A and the fourth wall 220D, or all walls defining the interior of the spray rim 220 (including, e.g., 220A, 220B, 220C, and 220D), may be an integral piece. In some embodiments, at least two adjacent walls among 220A, 220B, 220C, and 220D may be connected by a fluid-tight joint (e.g., using glue, welding, soldering, or a combination thereof).

Depending on the configuration, the interior of the spray rim 220 may either constitute the fluid channel 221 itself (FIG. 3) or accommodate both the fluid channel 221 and a gas conduit 271 (FIGS. 4 and 5). In some embodiments, a wall of the spray rim 220 may be configured to contact different substances on different sides, e.g., a first side facing or in direct contact with the fluid, and a second side facing or in direct contact with gas, etc. In some embodiments, at least a portion of the wall(s) of the interior of the spray rim 220 may have a coating. For example, at least a portion of the wall(s) of the spray rim 220 may have one or more coatings. Different sides of a wall of the spray rim 220 may include the same or different coatings. A coating may be configured to exhibit one or more properties including, e.g., hydrophobic or hydrophilic property, a thermal barrier, a corrosion resistance, wear and abrasion resistance, non-stick property, or the like, or a combination thereof. A coating may include one or more materials. Examples of applicable coating materials may include Polytetrafluoroethylene (PTFE, also known as Teflon), Perfluoroalkoxy Alkane (PFA), Fluorinated Ethylene Propylene (FEP), food-grade epoxy, silicone, ceramics, polyurethane, Polyether Ether Ketone (PEEK), or the like, or a combination thereof. A coating material may be applied by, e.g., spray coating, sol-gel process, chemical vapor deposition, physical vapor deposition, or the like, or a combination thereof.

The spray rim 220 may have an annular shape with the interior distributed (substantially) along the circumference, or a portion thereof, of the rim 294. The spray rim 220 may have an axis C (as illustrated in FIGS. 3 and 4) that extends along its length. The axis C may be substantially parallel to, or extend along, the circumference of the rim 294. The interior may have a cross-section ((substantially) perpendicular to the axis C) in the shape of a rectangle, a square, an oval, a circle, a polygon, etc. The interior may have (substantially) uniform cross-sections along the axis C or the circumference of the rim 294. Alternatively, the interior may have varying cross-sections along the axis C or the circumference of the rim 294.

The spray rim 220 may be removably attached to or supported by the housing 205 or other component(s) other components of the system 200 (e.g., the ingredient feeder 130, or a portion thereof) by one or more mounting mechanisms 206, as illustrated in FIGS. 2A, 2C, 2D, and 2E. The spray rim 220, or a portion thereof (e.g., the fluid channel 221) may be removed from the housing 205 when needed, for example, for cleaning the fluid channel 221, etc. For example, the mounting mechanism 206 may include friction. As an illustration, the spray rim 220 may be sized so that an outer wall (e.g., 220D as illustrated in FIG. 2C, 223D as illustrated in FIG. 3) may snugly contact an inner wall 205A of the housing 205, staying in place at least in part by friction. As another example, the spray rim 220 may be removably attached to the housing 205 and/or the ingredient feeder 130 (e.g., a nozzle plate 237) by one or more other mounting mechanisms 206 (individually identified as a first mounting mechanism 206A between the spray rim 220 and the housing 205, and a second mounting mechanism 206B between the spray rim 220 and the nozzle plate 237). Other examples of the mounting mechanisms 206 may include a threaded connection, magnetic force, a gasket (e.g., configured to enhance friction between the interfaces of the spray rim 220 and the housing 205 and/or provide fluid sealing), an interlocking tab system, an interlocking hanging system, a bayonet coupling system, or a combination thereof. An interlocking tab system may include one or more interlocking tabs and one or more complementary mounting features such as slot(s), groove(s), or other receiving feature(s) that the interlocking tab fit(s) into. An interlocking hanging system may include one or more hooks and one or more complementary mounting features such as ring(s) or loop(s), or other receiving feature(s) that the hook(s) fit(s) into. A bayonet coupling system may include one or more bayonet mounts and one or more complementary mounting features such as slot(s) or channel(s) designed to receive and/or secure pin(s) or lug(s) of the bayonet mount(s). The mounting mechanism 206 may include complementary mounting features located on the spray rim 220 (e.g., the sidewall 220D of the spray rim 220) and the other component involved in the mounting (e.g., the housing 205, the nozzle plate 237), respectively. For instance, the spray rim 220 may have a strip of magnet with a first polarity on the sidewall 220D, while the housing 205 may have a strip of magnet with a second, opposite polarity on the inner wall 205A. This arrangement may establish or reinforce the coupling between the spray rim 220 and the housing 205 through the magnetic attraction between the two strips. As another example, the spray rim 220 and the housing 205 may include one or more complementary hanging components (e.g., hooks and rings) and/or complementary threads to establish a threaded connection to facilitate the removable attachment of the spray rim 220 to the housing 205.

As illustrated in FIGS. 2A, 20-2E, and 3, the mixing chamber 290 may be removably attached to the spray rim 220 (e.g., the fluid channel 221 as illustrated in FIG. 2, the spray rim 429 as illustrated in FIGS. 4 and 5), the nozzle plate 237 of the ingredient feeder 130, and/or the housing 205 by one or more mounting mechanisms 208 (individually identified as a first mounting mechanism 208A between the mixing chamber 290 and the spray rim 220, and a second mounting mechanism 208B between the mixing chamber 290 and the housing 205). The mixing chamber 290 may be removed when needed, for example, for cleaning the fluid channel 221, the nozzle plate 237, the mixing chamber 290, or the like, or a combination thereof. In some embodiments, the mounting mechanism 208 may include friction. For example, the spray rim 220 may be sized so that an outer wall (e.g., 220D as illustrated in FIG. 2C, 223D as illustrated in FIG. 3) may snugly contact an inner wall 296A of the mixing chamber 290 at or around its rim 294, staying in place at least in part by friction. As another example, the mixing chamber 290 may be sized so that the outer wall 296B may snugly contact a wall (e.g., an inner wall 205A, an outer wall 205B) of the housing 205 at or around its rim 294, staying in place at least in part by friction. Other examples of the mounting mechanisms 208 may include a threaded connection, magnetic force, a gasket (e.g., configured to enhance friction between the interfaces of the spray rim 220 and the mixing chamber 290 and/or provide fluid sealing), an interlocking tab system, an interlocking hanging system, a bayonet coupling system, or a combination thereof. The mounting mechanism 208 may include complementary mounting features located on the mixing chamber 290 (e.g., the inner wall 296A, the outer wall 296B of the mixing chamber 290, and/or the rim 294 of the mixing chamber 290) and the structure where the mixing chamber 290 is attached (e.g., the spray rim 220, the housing 205, the nozzle plate 237), respectively. For instance, the spray rim 220 may have a strip of magnet with a first polarity on the sidewall 220D or the bottom wall 220B, while the mixing chamber 290 may have a strip of magnet with a second, opposite polarity on the inner wall 296A or the rim 294. This arrangement may establish or reinforce the coupling between the spray rim 220 and the mixing chamber 290 through the magnetic attraction between the two strips. As another example, the spray rim 220 and the mixing chamber 290 may include one or more complementary hanging components (e.g., hooks and rings) and/or complementary threads to establish a threaded connection to facilitate the removable attachment of the mixing chamber 290 to the spray rim 220.

As illustrated in FIG. 2E, at least one of the housing 205, the spray rim 220, the nozzle plate 237, or the mixing chamber 290 may include a position limiting component 293 (e.g., a step or a protrusion 293A on the housing 205, 293B on the spray rim 220, 293C on the nozzle plate 237, 293D on an inner wall 296A of the mixing chamber 290). The position limiting component 293 may be configured to limit the relative movement or define the relative position between the housing 205, the spray rim 220, the nozzle plate 237, and/or the mixing chamber 290 along the vertical direction (e.g., along the rotation axis Z of the mixing chamber 290 as illustrated in FIG. 2A. The position limiting component 293 may be sized to avoid partially or completely blocking the discharge of water (and/or other substance) from the spray rim 220 (e.g., the fluid channel 221 or the spray rim 429) and/or an ingredient from the ingredient feeder 130. The position limiting component 293 may be continuous along the entire circumference of the structure (e.g., the housing 205, the spray rim 220, the nozzle plate 237, the mixing chamber 290) where it is located, or along a portion thereof. Alternatively, the position limiting component 293 may include multiple discrete components distributed around the circumference of the structure where it is located, or along a portion thereof.

For illustration purposes and convenience, multiple position limiting components 293 are shown in FIG. 2E. This is not intended to be limiting. In a specific use case, one or more of the position limiting components 293 illustrated in FIG. 2E may be omitted. For example, the housing 205 may include the position limiting component 293A configured to limit the relative movement or define the relative position between the housing 205 and the spray rim 220, while the spray rim 220, the nozzle plate 237, and/or the mixing chamber 290 include no position limiting component. As another example, the spray rim 220 may include the position limiting component 293B configured to limit the relative movement or define the relative position between the spray rim 220 and the mixing chamber 290, and the housing 205 may include the position limiting component 293A configured to limit or define the relative position between the housing 205 and the nozzle plate 237, while the nozzle plate 237 and/or the mixing chamber 290 includes no position limiting component.

The ingredient feeder 130 of the system 200 may include or be connected to one or more ingredient sources 232 (illustrated as sparkling water in FIG. 2A; individually identified as a first ingredient source 232A, a second ingredient source 232B, and a third ingredient source 232C) to receive one or more ingredients for producing a beverage. The ingredient source 232 may include or be connected to one or more containers holding ingredient(s) or external ingredient supply sources. Example ingredients include syrups (e.g., caramel syrup, mocha syrup), whipped cream, dairy and non-dairy milk alternatives (e.g., whole milk, skim milk, half-and-half, heavy cream, soy milk, almond milk, coconut milk, etc.), fruit purees or juices (e.g., mango puree/juice, strawberry puree/juice, peach puree/juice, pineapple puree/juice, apple puree/juice, orange puree/juice, etc.), sparkling water, and/or other fluid-based ingredients. A fruit juice may include pulp or not. In some embodiments, the ingredient sources 232 may include multiple, isolated compartments for separately storing multiple ingredients.

The ingredient feeder 130 may include one or more ingredient pathways to guide ingredients from the ingredient sources 232 to the mixing chamber 290. An ingredient pathway may include an ingredient tube 235 (e.g., individually identified as a first ingredient tube 235A, a second ingredient tube 235B, and a third ingredient tube 235C in FIG. 2B). The ingredient pathway may facilitate a controllable delivery of an ingredient from an ingredient source 232 to the mixing chamber 290, such that one or more parameters of the flow of an ingredient may be regulated as to which, when, and/or how much an ingredient is fed to the mixing chamber 290. Examples of these parameters may include the amount, pressure, timing of the ingredient flow, or a combination thereof. The control may be achieved using at least one of a pump 234 (individually illustrated as a first ingredient pump 234A, a second ingredient pump 234B, and a third ingredient pump 234C in FIG. 2B), a controllable valve 236 (e.g., individually illustrated as a first ingredient valve 236A, a second ingredient valve 236B, and a third ingredient valve 236C in FIG. 2B), or the like, or a combination thereof. The operation of the pump 234 may be controlled by a controller or control circuit 238A (individually illustrated as a first pump controller or control circuit 238A-A, a second pump controller or control circuit 238A-B, and a third pump controller or control circuit 238A-C in FIG. 2B). The controllable valve 236 may include a metering value, a solenoid valve, or the like. The operation of the controllable valve 236 may be controlled by a controller or control circuit 238B (individually illustrated as a first valve controller or control circuit 238B-A, a second valve controller or control circuit 238B-B, and a third valve controller or control circuit 238B-C in FIG. 2B). The valve 236 may be located downstream of (closer to the nozzle 239 than) the pump 234 along the ingredient pathway as illustrated in FIG. 2A, or vice versa as illustrated in FIG. 2B. In some embodiments, ingredient pathways connected to different ingredient sources 232 may have different configurations, depending on one or more parameters of the ingredients to be delivered through the respective ingredient pathways. Examples of such ingredient parameters may include viscosity, temperature stability, particulate content, or the like, or a combination thereof. Merely by way of example, a first ingredient pathway coupled to the first ingredient source 232A includes the first ingredient pump 234A and omits the first ingredient valve 236A (and the corresponding controller or control circuit 238B-A); while the second ingredient pathway coupled to the second ingredient source 232B includes the second ingredient pump 234B and also the second ingredient valve 236B (and the corresponding controller or control circuit 238B-B); the first ingredient pump 234A and the second ingredient pump 234B may have the same or different configurations, such as different power levels, dimensions, or a combination thereof.

An ingredient pathway may guide one or more ingredients from the ingredient sources 232 for discharging into the mixing chamber 290. For example, one ingredient pathway (including an ingredient tube 235, a pump 234, and/or a valve 236) may be coupled to a single ingredient source 232. This configuration may avoid contamination of the ingredient pathway, or a portion thereof, and/or prevent interference between different ingredients in beverage preparation. As another example, one ingredient pathway can be coupled to multiple ingredient sources 232. This can be achieved by using a multi-way valve to connect multiple ingredient sources 232 to a single ingredient pathway. To reduce or minimize interference between ingredients sharing the same ingredient pathway (e.g., when different ingredients are used in making various beverages at different times or the same beverage) and/or achieve effective ingredient delivery, the ingredients may have one or more similar characteristics, such as tastes, colors, flow properties (e.g., viscosity), allergy risks, or the like, or a combination thereof.

The ingredient feeder 130 may include one or more ingredient nozzles 239 (individually identified as a first ingredient nozzle 239A, a second ingredient nozzle 239B, and a third ingredient nozzle 239C in FIG. 2B) for discharging one or more ingredients into the mixing chamber 290. An ingredient nozzle 239 may be coupled to an ingredient source 232 via an ingredient pathway. An ingredient nozzle 239 may be positioned substantially above the opening of the mixing chamber 290 defined by its rim 294.

The ingredient feeder 130 may include a nozzle plate 237, which supports one or more ingredient nozzles 239. The nozzle plate 237 may be removably attached to at least one of the mixing chamber 290, the spray rim 220, or the housing 205. The nozzle plate 237 may be removed from the mixing chamber 290, the spray rim 220, or the housing 205 when needed, for example, for cleaning the nozzle plate 237 or an ingredient nozzle 239, cleaning the mixing chamber 290, replacing the nozzle plate 237 or the mixing chamber 290, replacing an ingredient tube 235 coupled to an ingredient nozzle 239, or the like, or a combination thereof.

In some embodiments, the nozzle plate 237 may include a plate portion 237A positioned substantially above the opening of the mixing chamber 290, defined by its rim 294. In some embodiments, the nozzle plate 237 may include a hanging component 237B to facilitate the removable attachment of the nozzle plate 237 to the mixing chamber 290 or other component of the system 200.

In some embodiments, the nozzle plate 237 may be sized or otherwise configured to be attached to or supported by the housing 205 or other components of the system 200 (e.g., the spray rim 220, the mixing chamber 290) by one or more mounting mechanisms 204. In some embodiments, the mounting mechanism 204 may include friction. For example, the nozzle plate 237 may be sized so that a wall (e.g., 237B) may snugly contact the inner wall 205A of the housing 205, staying in place at least in part by friction.

In some embodiments, the nozzle plate 237 may be removably attached to the housing 205, the spray rim 220, or the mixing chamber 290 by or one or more other mounting mechanisms 204 (individually identified as a first mounting mechanism 204A between the nozzle plate 237 and the housing 205, a second mounting mechanism 204B between the nozzle plate 237 and the mixing chamber 290). Other examples of the mounting mechanisms 204 may include a threaded connection, magnetic force, a gasket (e.g., configured to enhance friction between the interfaces of the nozzle plate 237 and the housing 205 and/or provide fluid sealing), an interlocking tab system, an interlocking hanging system, a bayonet coupling system, or a combination thereof.

In some embodiments, the nozzle plate 237 may be removably coupled to the housing 205 and/or the spray rim 220, but not directly coupled to the mixing chamber 290. For example, the nozzle plate 237 is attached to the housing 205 by the mounting mechanism 204A, the spray rim 220 is attached to the housing 205 by the mounting mechanism 206A, and the nozzle plate 237 and the spray rim 220 are positioned in proximity or contact but not coupled to each other by a mounting mechanism; the mixing chamber 290 is coupled to the spray rim 220 and/or to the housing 205 by the mounting mechanism 208A and/or 208B. As another example, the nozzle plate 237 is coupled (via the mounting mechanism 206B) to or sits on the spray rim 220 without being coupled to the housing 205, the spray rim 220 is attached to the housing 205 by the mounting mechanism 206A, and the mixing chamber 290 is coupled to the spray rim 220 and/or to the housing 205 by the mounting mechanism 208A and/or 208B. As a further example, the nozzle plate 237 is coupled to the housing 205 by the mounting mechanism 204A, the spray rim 220 is attached to the nozzle plate 237 by the mounting mechanism 206B, and the mixing chamber 290 is coupled to the spray rim 220 and/or to the housing 205 by the mounting mechanism 208A and/or 208B. For illustration purposes and convenience, multiple mounting mechanisms 204, 206, and 208 are illustrated in each of FIGS. 2C-2E. This is not intended to be limiting. As described herein, one or more mounting mechanisms illustrated in each of FIGS. 2C-2E may be omitted in respective use cases, and mounting mechanisms illustrated in different figures of FIGS. 2C-2E may be combined in a use case.

To avoid interference between the discharge of the fluid from the spray rim 220 (e.g., the fluid channel 221 or the spray rim 429) and the discharge of one or more ingredients (and/or cleaning solution as described elsewhere in the present document) from the ingredient nozzles 239, the spray rim 220 may be positioned closer to a dispensing opening (e.g., the dispensing opening 292) of the mixing chamber 290 than the nozzle plate 237. The ingredient nozzles 239 may be positioned over an open area of the spray rim 220 so that the discharge of an ingredient from an ingredient nozzle is not partially or completely blocked by the spray rim 220. The open area of the spray rim 220 may refer to a central area defined by the spray rim 220 with the spray rim 220 constituting the perimeter of the open area. It is understood that the term "perimeter" and the term "circumference" are used interchangeably in the present document, both indicating a length or distance around the edge or outside of a closed shape (for example, a circle, an oval, a rectangle, a polygon, an irregular closed shape, etc.).

In some embodiments, the spray rim 220 may be positioned around the rim 294 of the mixing chamber 290 by being removably attached to the nozzle plate 237 which in turn is removably attached to the mixing chamber 290 as described above (e.g., via 237B, the mounting mechanism 204, etc.). For example, the spray rim 220 may hang from the nozzle plate 237 using an interlocking hanging system including one or more hooks coupled to corresponding loops on the nozzle plate 237. As another example, the spray rim 220 may be removably attached to the nozzle plate 237 using magnetic force. In this example, the nozzle plate 237 may have a strip of magnet with a first polarity around its edge, while the spray rim 220 may have a strip of magnet with a second, opposite polarity.

In some embodiments, the spray rim 220 and the nozzle plate 237 may separately be removably attached to the mixing chamber 290. For example, the spray rim 220 may be attached to the inner wall 296A of the mixing chamber 290 (e.g., by friction, the mounting mechanism 208, or the like, or a combination thereof), while the nozzle plate 237 may be attached to the outer wall 296B of the mixing chamber 290 (e.g., by friction, the mounting mechanism 204, or the like, or a combination thereof).

The cleaning solution feeder 140 of the system 200 may include or be connected to one or more cleaning solution sources 242 (individually identified as sanitizer source 242A and a cleaning solution source 242B in FIG. 2A) to receive one or more cleaning solutions for cleaning at least a portion of the system 200. The cleaning solution source 242 may include or be connected to one or more containers or external cleaning solution supply sources. Examples of applicable cleaning solutions include a detergent, a degreaser, a sanitizer, or a disinfectant, and/or other cleaning solutions. In some embodiments, the cleaning solution sources 242 may include multiple, isolated compartments for separately storing multiple cleaning solutions.

The cleaning solution feeder 140 may include one or more cleaning solution pathways to guide cleaning solutions from the cleaning solution sources 242 (individually identified as a first cleaning solution (e.g., sanitizer) source 242A and a second cleaning solution (e.g., cleaning solution) source 242B in FIG. 2A) to the mixing chamber 290. A cleaning solution pathway may include a cleaning solution tube 245 (individually identified as a first cleaning solution tube 245A and a second cleaning solution tube 245B in FIG. 2A). The cleaning solution pathway may facilitate a controllable delivery of a cleaning solution from a cleaning solution source 242 to the mixing chamber 290, such that one or more parameters of the flow of a cleaning solution may be regulated as to which, when, and/or how much a cleaning solution is fed to the mixing chamber 290. Examples of these parameters may include the amount, pressure, timing of the cleaning solution flow, or a combination thereof. The control may be achieved using at least one of a pump 244 (individually illustrated as a first cleaning solution pump 244A and a second cleaning pump 244B in FIG. 2A), a valve 246 (individually illustrated as a first cleaning solution valve 246A and a second cleaning solution valve 246B in FIG. 2A), or the like, or a combination thereof. The operation of the pump 244 may be controlled by a controller or control circuit 248A as illustrated in FIG. 2B (individually identified as a first pump controller or control circuit 248A-A and a second pump controller or control circuit 248A-B as illustrated in FIG. 2A). The controllable valve 246 may include a metering value, a solenoid valve, or the like. The operation of the valve 246 may be controlled by a controller or control circuit 248B as illustrated in FIG. 2B (not shown in FIG. 2A). The valve 246 may be located downstream of (closer to the nozzle 249 than) the pump 244 along the cleaning solution pathway as illustrated in FIG. 2A, or vice versa as illustrated in FIG. 2B. In some embodiments, cleaning solution pathways connected to different cleaning solution sources 242 may have different configurations, depending on one or more parameters of the cleaning solutions to be delivered through the respective cleaning solution pathways. Examples of such cleaning solution parameters may include viscosity, temperature stability, particulate content, or the like, or a combination thereof. Merely by way of example, a first cleaning solution pathway coupled to the first cleaning solution source 242A includes the first cleaning solution pump 244A (and the corresponding first controller or control circuit 248A-A) and the first cleaning solution valve 246A; while the second cleaning solution pathway coupled to the second cleaning solution source 242B includes the second cleaning solution pump 244B (and the corresponding second controller or control circuit 248A-B) and the second cleaning solution valve 246B; the first cleaning solution pump 244A and the second cleaning solution pump 244B may have the same or different configurations, such as different power levels, dimensions, or a combination thereof. The first cleaning solution valve 246A and the second cleaning solution valve 246B may have the same or different configurations, such as different dimensions, etc. In some embodiments, a cleaning solution may flow in only one direction, from a cleaning solution source 242 toward the mixing chamber 290, not in the reverse direction. For example, the cleaning solution valve 246 may be a one-way valve.

A cleaning solution pathway may guide one or more cleaning solutions from the cleaning solution sources 242 to one or more portions of the system 200. For example, one cleaning solution pathway (including a cleaning solution tube 245, a pump 244, and/or a valve 246) may be coupled to a single cleaning solution source 242. This configuration may avoid contamination of the cleaning solution pathway, or a portion thereof, and/or prevent interference between different cleaning solutions in a cleaning process. As another example, one cleaning solution pathway can be coupled to multiple cleaning solution sources 242. This can be achieved by using a multi-way valve to connect multiple cleaning solution sources 242 to the single cleaning solution pathway. To reduce or minimize interference between cleaning solutions sharing the same cleaning solution pathway and/or achieve efficient cleaning solution delivery, the cleaning solutions may have one or more similar characteristics, such as flow properties (e.g., viscosity), allergy risks, or the like, or a combination thereof.

In some embodiments, a cleaning solution pathway may guide one or more cleaning solutions from the cleaning solution sources 242 to the fluid feeder 120 for discharging into the mixing chamber 290. In some embodiments, a cleaning solution pathway may be connected to the fluid feeder 120, e.g., via the tube 225 (or another tube). As illustrated in FIG. 2A, a cleaning solution pathway may intersect with the tube 225 after (e.g., downstream of) the cleaning solution valve 246 such that a cleaning solution may flow from the cleaning solution source 242 to the tube 225 when the valve 246 is open. As illustrated, the intersection may be between the pump 224 and the valve 226 along the fluid pathway in the fluid feeder 120. The cleaning solution may flow toward the mixing chamber 290 via the tube 225 and downstream components of the fluid feeder 120 (e.g., the fluid channel 221).

In some embodiments, a cleaning solution pathway may be coupled to a cleaning solution nozzle 249 so that a cleaning solution may be delivered to the mixing chamber 290 without passing through the fluid feeder 120. A cleaning solution nozzle 249 may be similar to an ingredient nozzle 239 supported on the nozzle plate 237. Merely by way of example, one of the ingredient nozzles 239 illustrated in FIG. 2A may be used as a cleaning solution nozzle for discharging a cleaning solution into the mixing chamber 290.

In some embodiments, a cleaning solution may be mixed with water (or another fluid from, e.g., the fluid feeder 120) before being discharged in the mixing chamber 290. This may be achieved by guiding the cleaning solution to the tube 225, allowing the cleaning solution to mix with water (or another fluid) concurrently present in the tube 225 before the cleaning solution is discharged into the mixing chamber 290. In some embodiments, a cleaning solution may be discharged into the mixing chamber 290 without being mixed with water (or another fluid from, e.g., the fluid feeder 120). For example, before being discharged into the mixing chamber 290, a cleaning solution may be guided to the tube 225 when there is no water flowing in the tube 225. As another example, a cleaning solution may be discharged into the mixing chamber 290 via a cleaning solution nozzle 249, thereby bypassing the fluid feeder 120.

It is understood that the term "cleaning solution" as used herein is for illustration purposes and convenience, and is not intended to be limiting. In some embodiments, the cleaning solution feeder 140 may be configured to hold and/or discharge a cleaning agent in a form other than a solution. For brevity, the term cleaning solution referred to elsewhere in the present document may include such a cleaning agent.

Panels I and II of FIG. 2B illustrate an exemplary holding component 241 of the cleaning solution feeder 140. The holding component 241 may be configured to hold a cleaning agent 243. This cleaning agent 243 may be in the form of cleaning tablets, cleaning pods, cleaning powder, etc. The holding component 241 may be configured to discharge a specific amount of the cleaning agent 243 (e.g., one, two, or more cleaning tablets, a cleaning pod, or a measured amount of cleaning powder) directly into the mixing chamber 190 or 290 as needed. As illustrated in panel II of FIG. 2B, the holding component 241 may include an enclosure 247A configured to house the cleaning agent 243 and an openable outlet 247B configured to selectively dispense a desired amount of the cleaning agent 243 into the mixing chamber 190 or 290. The openable outlet 247B, or a portion thereof, may be moveable with respect to the enclosure 247A. For example, the openable outlet 247B, or a portion thereof, may rotate or slide between a first position and a second position, in which at its first position the outlet 247B is at least partially open to allow dispensing of the cleaning agent 243 into the mixing chamber 190 or 290, while at its second position the outlet 247B is at least partially closed to prevent dispensing of the cleaning agent 243 into the mixing chamber 190 or 290. The openable outlet 247B may be operably connected to or include a connector 247C configured to facilitate and/or control the opening and/or closing of the outlet 247B. In some embodiments, the connector 247C may be supported on the enclosure 247A or on the outlet 247B. Examples of the connector 247C may include a hinge pin, a spring-loaded hinge, a ball joint, a pivot arm, an articulated joint, or the like, or a combination thereof. The movement of the outlet 247B, or a portion thereof, may be effectuated by moving (e.g., rotating) the connector 247C. Additionally or alternatively, the movement of the outlet 247B may be effectuated by applying or removing a force. For example, at least a portion of the outlet 247B may include at least one magnetic material and may be caused to move (e.g., between the first position and the second position) by applying or removing a magnetic force via, e.g., an electromagnet. The electromagnet may be positioned on, e.g., the enclosure 247A, the outlet 247B, or another suitable location within the holding component 241 or somewhere else within the system 100 or 200. The holding component 241 may further include a biasing element 247D (e.g., a spring, a biasing tab) pressing against the cleaning agent 243 (e.g., cleaning tablets) to facilitate the dispensing when the openable outlet 247B is open. The holding component 241 may include a moveable cover 247E configured to hold the cleaning agent 243 within the enclosure 247A, reduce or prevent ingress of a foreign matter (e.g., moisture), and/or allow refill of the cleaning agent 243 into the enclosure 247A.

The dispensing of the cleaning agent 243 may be implemented by actuating the connector 247C to open the outlet 247B, actuating the biasing element 247D to exert force onto the moveable cover 247E and correspondingly upon the cleaning agent 243 and the outlet 247B, or a combination thereof. The dispensing may be controlled by a controller or control circuit 248 coupled to the connector 247C, the biasing element 247D, or the like, or a combination thereof. The amount of the cleaning agent 243 to be dispensed may be controlled by controlling the time the outlet 247B remains open, the extent the outlet 247B is open (or the area made available by the partial or complete opening of the outlet 247B for the cleaning agent to be discharged from the enclosure 247A), the amount and/or duration of force exerted by the biasing element 247D, or the like, or a combination thereof. In some embodiments, the holding component 241 may include a secondary containment area positioned beneath or above the outlet 247B to catch any excess cleaning agent 243.

The controller or control circuit 248 may incorporate one or more feedback mechanisms, such as a weight sensor, an optical sensor, or the like, or a combination thereof, to monitor the amount of cleaning agent 243 dispensed and automatically adjust the dispensing process. These sensors may provide real-time data to the control circuit 248, allowing it to precisely control the dispensing and prevent overdosing.

The controller or control circuit 248 may be designed to accommodate various cleaning cycles and user preferences. It can be programmed with multiple pre-set cleaning routines for different cleaning needs, or it may include a user interface allowing manual input of dispensing parameters. This programmability may enable the system 200 to adapt to different cleaning needs, from light daily cleaning to more intensive periodic cleaning cycles.

In some embodiments, the ingredient feeder 130 and/or the cleaning solution feeder 140 may be reconfigured to perform one or more additional or different functions. For example, a cleaning solution pouch may be placed in an ingredient source 232 such that the cleaning solution may be delivered to the mixing chamber 190 or 290 through an ingredient pathway (including an ingredient tube 235, a pump 234, and/or a valve 236) and/or an ingredient nozzle 239 operably connected the ingredient source 232. This temporary reconfiguration may be performed to clean the ingredient feeder 130, or a portion thereof (e.g., the ingredient pathway and/or the nozzle 239 involved in the reconfiguration), the nozzle plate 237, the mixing chamber 190 or 290, the mixer 150, the dispenser 160, or the like, or a combination thereof. For example, the reconfiguration may be performed to allow the cleaning of the coupled ingredient pathway and/or ingredient nozzle 239, as part of a periodic or scheduled maintenance routine, or before switching the ingredient to be placed in the ingredient source 232 and/or to be delivered via the coupled ingredient pathway and/or ingredient nozzle 239.

As another example, the system 200 may include a modular content delivery assembly include a source (e.g., (substantially) the same as or similar to an ingredient source 232 or cleaning solution source 242), a pathway ((e.g., (substantially) the same as or similar to an ingredient pathway or cleaning solution pathway as described elsewhere in the present document), and outlet (e.g., (substantially) the same as or similar to an ingredient nozzle 239 or cleaning solution nozzle 249). The content delivery assembly may be configured as needed. For instance, a cleaning solution used less frequently (e.g., a decalcification agent used only in a monthly deep cleaning cycle) may be placed in the content delivery assembly when the relevant cleaning cycle is to be performed and then removed after the cleaning cycle is completed. A different content (e.g., an ingredient or a different cleaning solution) can then be placed in the same content delivery assembly until the next relevant cleaning cycle is needed, or as the user sees fit.

The ability to reconfigure the ingredient feeder 130, the cleaning solution feeder 1409, and/or the modular content delivery assembly for additional or different functions may increase the system 200's versatility, redundancy, and/or reliability. This adaptability may allow the system 200 to handle various tasks without requiring multiple separate units. Additionally or alternatively, if the delivery assembly of one content (e.g., an ingredient, a cleaning solution) or one content delivery assembly is down, another can be used to deliver the desired content, reducing downtime and mitigating the impact of localized device problems. This redundancy may ensure continuous operation and reliability in various scenarios. By enabling the cleaning solution to pass through the same pathways as the ingredients, the system 200 may ensure thorough cleaning of multiple components involved in ingredient delivery, including the ingredient tube 235, pump 234, valve 236, nozzle 239, mixing chamber 190 or 290, mixer 150, and/or the dispenser 160, maintaining system hygiene and performance. The temporary reconfiguration for cleaning may simplify maintenance. A user can easily switch to cleaning mode without disassembling other components of the system 200 (e.g., the components of the ingredient pathway, the ingredient nozzle 239, the nozzle plate 237, etc.), saving time and reducing the risk of damage or improper reassembly. The ability to clean the system 200 without disassembly may reduce or minimize downtime, allowing for continuous operation and increasing overall efficiency. This is beneficial in high-demand environments where uninterrupted operation is desired.

The mixer 150 of the system 200 may be configured to mix content in the mixing chamber 290. The mixer 150 may include a stirrer 252. The stirrer 252 may be coupled to a motor 254 configured to drive the stirrer 252 for mixing. Panel III in FIG. 2A illustrates a rotation motor as an example of the motor 254. The mixer 150 may be positioned substantially along a rotation axis Z of the mixing chamber 290 and extend into the interior of the mixing chamber 290 so that the mixer 150 may mix content in the mixing chamber 290. The content in the mixing chamber 290 may include water (or one or more other fluids from the fluid feeder 120), an ingredient, a cleaning solution, etc. The motor 254 may be coupled to a controller or control circuit (not shown in FIG. 2A) that is configured to control its operation, thereby controlling the mixing of content in the mixing chamber 290. Additional description of the mixer 150 may be found elsewhere in the present document. See, e.g., FIGS. 6 through 10 and relevant description thereof.

The dispenser 160 of the system 200 may be configured to move along a direction X to adjust how much of a dispensing opening (e.g., dispensing opening 292) of the mixing chamber 290 is available for dispensing content from the mixing chamber 290. The direction X may substantially coincide with or be parallel to the rotation axis Z of the mixing chamber 290. The content to be dispensed from the mixing chamber 290 may include water (or one or more other fluids from the fluid feeder 120), an ingredient, a cleaning solution, either alone or a mixture thereof. The dispenser 160 may include a plug 262. The plug 262 may be coupled to an actuator 264 configured to cause the plug 262 to move along the direction X between a first position and a second position. The plug 262 may be sized to block the dispensing opening 292 of the mixing chamber 290 when in the first position so that (substantially) no content exits the mixing chamber 290 via the dispensing opening, as illustrated in panel IV in FIG. 2A. The dispensing opening 292 of the mixing chamber 290 may be (substantially) fully open when the plug 262 moves away from the first position (or the dispensing opening of the mixing chamber 290) along direction X1 and arrives at the second position as illustrated in panel I in FIG. 3, allowing dispensing of content from the mixing chamber 290 via the dispensing opening 292 into, e.g., a user cup 203, as indicated by an arrow Y. The operation of the actuator 264 may be controlled by a controller or control circuit 268.

Figure 6:
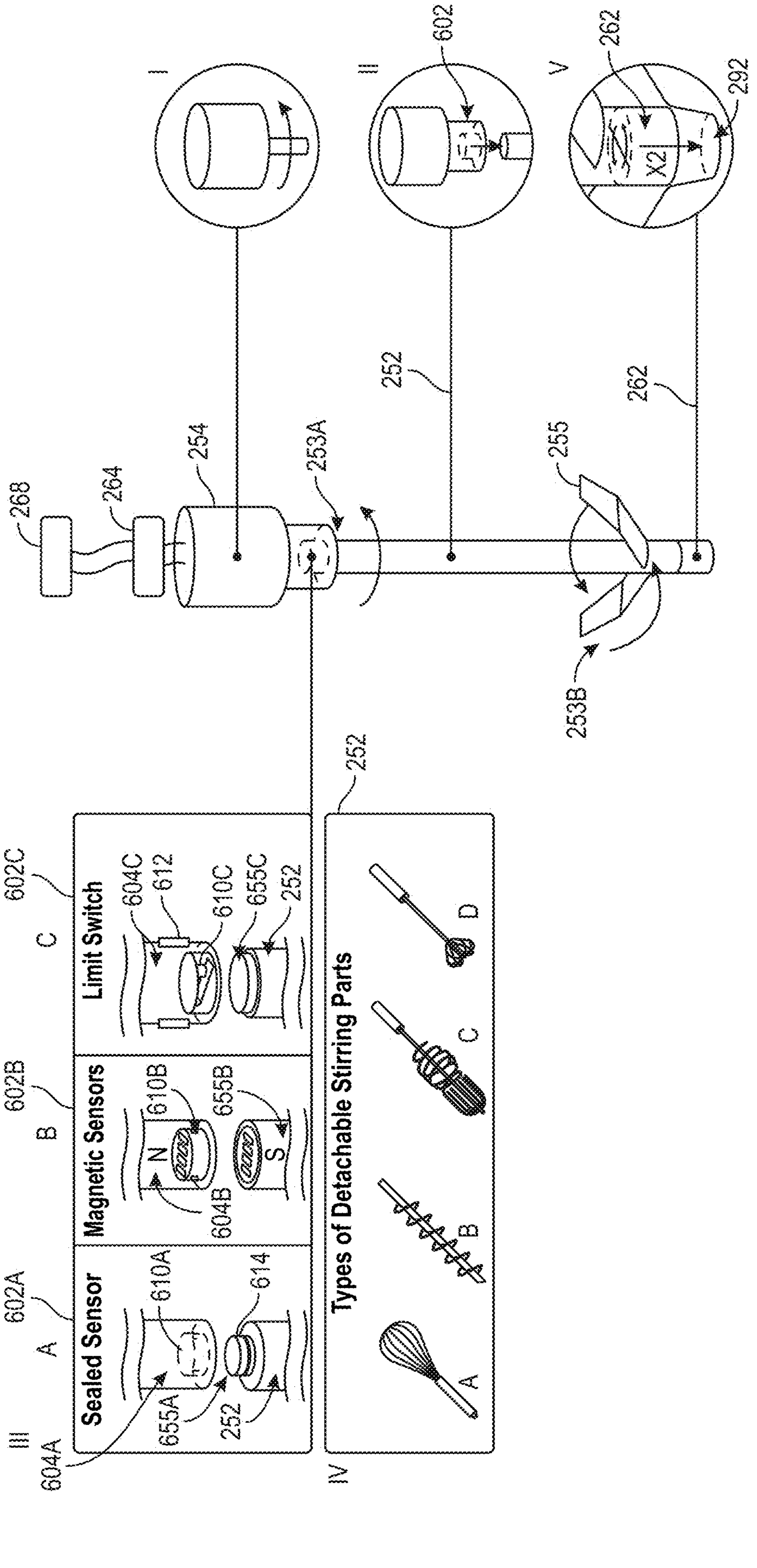

In some embodiments, the dispenser 160 may be coupled with the mixer 150, as illustrated in FIGS. 2A, 3, and 6. The dispenser 160 (e.g., the plug 262) may be coupled to the mixer 150 (e.g., the stirrer 252) such that the dispenser 160 may move with the mixer 150 when the mixer 150 undergoes linear motion and remain fixed in place when the mixer 150 undergoes rotational motion. For example, an end portion of the dispenser 160 may be connected to an opposing end portion of the mixer 150 via a ball and socket joint, a linear bearing, a prismatic joint, etc. In some embodiments, the coupling between the dispenser 160 and the mixer 150 may be detachable. In some embodiments, the coupling between the dispenser 160 and the mixer 150 may be fixed.

Both the motor 254 and the actuator 264 may be coupled to the mixer 150 such that the mixer 150 can undergo rotation alone (while the dispenser 160 remains fixed in place) for mixing driven by the motor 254 and linear motion driven by the actuator 264 with the dispenser 160. In some embodiments, the motor 254 may also be controlled by the controller or control circuit 268 or by a separate controller or control circuit. Using separate actuators (the motor 254 and the actuator 264) may provide the benefits of simplified control, increased reliability, enhanced performance, greater design flexibility, simplified mechanical setup, improved safety and maintenance, better energy efficiency, etc. In some embodiments, one actuator may be used to cause the rotation and linear motion of the mixer 150. For example, a motor configured to output rotation motion may be coupled to a motion conversion mechanism so that the mixer 150 can undergo both rotation and linear motion driven by the motor. Examples of suitable motion conversion mechanisms may include a lead screw with rotational lock, a clutch-based system, a cam and follower mechanism, a gear shifting mechanism, a flexible linkage with pivot, etc. As an illustration, with respect to the lead screw with rotational lock, the motor may drive the lead screw, to which the mixer 150 is attached. The rotational lock may be controlled to either engage with the lead screw (directly or via a component coupled to the lead screw) to prevent rotational motion and allow the motor to drive linear motion, or disengage from the lead screw (directly or via a component coupled to the lead screw) to allow rotational motion. The motor and/or the motion conversion mechanism may be controlled by the controller or control circuit 268. The single actuator configuration may offer benefits including simplicity, compactness, reliability, cost-effectiveness, and ease of maintenance.

The pressurized gas assembly 170 of the system 200 may include an air source 272. Air from the air source 272 (e.g., the ambient air) may be guided within the system 200 via a gas pathway including an air tube 275. The pressurized gas assembly 170 may include an air pressure pump 274 to increase the pressure of the air from the air source 272 (e.g., to a pressure higher than that in the air source 272 or higher than atmospheric pressure) before delivery to other portions of the system 200 including, e.g., the fluid feeder 120, the mixing chamber 290, etc. The air pressure pump 274 may include a gas compressor. The operation of the air pressure pump 274 may be controlled by a controller or control circuit 278. Air may be guided from the air source 272 to one or more other components of the system 200 in a controllable manner via the gas pathway including a tube 275, such that one or more parameters of the air flow may be regulated. Examples of these parameters may include the amount, pressure, timing of the air flow, or a combination thereof. The control may be achieved using at least one of an air pressure pump 274, a valve 276, or the like, or a combination thereof. The air pressure pump 274 and the valve 226 may be arranged at different locations on the tube 275 of the gas pathway. The operation of the pump 274 may be controlled by a pump controller or control circuit 278A. The valve 276 may be a controllable valve. The operation of the valve 276 may be controlled by a valve controller or control circuit 278B. In some embodiments, air may flow in only one direction, from the air source 272 toward other components of the system 200, not in the reverse direction. For example, the valve 276 may be a one-way valve. The valve 276 may also prevent content from the mixing chamber 290 (e.g., water, or a mixture) from entering the air pathway.

Air, pressurized or not, may be delivered to various components of the system 200. For example, pressurized air may be delivered to the fluid feeder 120 (e.g., the fluid channel 221 as illustrated in FIGS. 2A and 3, the spray rim 429 as illustrated in FIG. 4) to pressurize water to create a high-pressure spray for a cleaning process (e.g., to nebulize water, thereby increasing the cleaning area and reducing water consumption). As another example, air (e.g., heated air) may be used to blow dry and/or sanitize various components of the system 200 for cleaning and/or storage purposes. As a further example, pressurized air may be delivered to the mixing chamber 290 to facilitate or accelerate the dispensing of high-viscosity contents through the dispensing opening of the mixing chamber 290. As a still further example, heated air may be used to heat water for a cleaning process or to prepare a beverage at a specific temperature (e.g., higher than the temperature of the water from the water source 222 or higher than room temperature). For instance, heated air may be delivered to the gas conduit 271, which wraps around at least a portion of the fluid channel 221, as illustrated in FIG. 4. Alternatively, the gas conduit 271 may be positioned adjacent to (e.g., in thermal contact with) the fluid channel 221, allowing the water in the fluid channel 221 to be heated by the heated air.

In some embodiments, air may be removed from one or more components of the system 200. For example, air may be removed from the mixing chamber 190. As an illustration, when the dispenser 160 (e.g., the plug 262 as illustrated in FIG. 2A) seals or blocks the dispensing opening 292 of the mixing chamber 290, the mixing chamber 290 between the nozzle plate 237 and the (now sealed or blocked) dispensing opening 292 may become (sufficiently) air-tight; through an opening on the nozzle plate 237, a vacuum system or assembly including a gas pump (e.g., the air pressure pump 274 or a different pump) may extract air from the mixing chamber 190 before ingredient(s) and/or fluid are added and/or mixed. As used herein, the mixing chamber 290 being sufficient air-tight may indicate that during the time period of producing a beverage (e.g., in the order of 1 minute, 5 minutes, 10 minutes) the amount of air leaked into the mixing chamber 290 from an imperfect seal at the dispensing opening 292 or the connection between the wall 296 of the mixing chamber 290 and the nozzle plate 237, may be negligible. This air extraction process may continue for a certain period (e.g., 10, 20, or 30 seconds) and/or until the air pressure in the mixing chamber 190 reaches a specified level. Reducing or minimizing air in the mixing chamber 190 during the mixing operation may slow down ingredient oxidation and/or reduce foam generation (e.g., when mixing a dairy product), thereby improving the quality of the produced beverage and/or simplifying the cleaning process. For instance, reducing foam during the blending process helps prevent dairy products from adhering to hard-to-clean corners, making the system 200 easier to clean.

The heater 180 of the system 200 may include a heating element (or referred to as heater) 282. The heater 180 may include a heating wire, a heating sheet, a heating block, etc. For example, the heater 180 may be positioned in thermal communication with a conduit or a container through which the content to be heated passes. For example, the heater 180 may include a heating wire or heating sheet wrapping around the tube 225 (through which the fluid traverses), the air tube 275 (through which the air or another gas traverses), an ingredient tube 235 (through which an ingredient traverses), the mixing chamber 190 or 290, etc. As another example, the heater 180 may include a heating block in direct thermal communication with the content to be heated. For instance, the heating block may be positioned in the passage of the content. This direct thermal communication may allow the heating block to efficiently transfer heat to the content as it passes through the conduit. The heating block may be made from a thermally conductive material such as aluminum or copper and may include internal heating elements, such as electrical resistance wires, to generate heat. Additional examples of the heater 180 may include an induction coil positioned around a metallic container or conduit to heat the contents through electromagnetic induction, an infrared heating element positioned above or below the container or conduit to provide non-contact heating through radiant energy, or the like, or a combination thereof.

In some embodiments, the heater 282 may be configured to heat air from the air source 272 before being delivered to other components of the system 200. The heated air may be used for cleaning purposes or heating other content (e.g., the fluid, a target ingredient to produce a beverage), as described elsewhere in the present document. In some embodiments, the heater 282 may heat water for making a beverage of a certain temperature (e.g., higher than the room temperature), heat an ingredient that is stored at a low temperature for better shelf life, or the like, or a combination thereof. The operation of the heater 282 may be controlled by a heater controller or control circuit 288.

The mixing chamber 290 may provide a space where content may be mixed before being dispensed, e.g., to a user cup, to a drainage assembly, etc. The mixing chamber 290 may have an inner wall 296A facing the rotation axis Z and an outer wall 296B. There may be a substantial vacuum or an air gap in the space between the inner wall 296A and the outer wall 296B, facilitating thermal insulation between the interior of the mixing chamber 290 and its external surroundings. This configuration may reduce or eliminate the risk of burns from a hot beverage, hot air used during a cleaning process, or the heating of a cold beverage being prepared by the ambient environment, etc. In some embodiments, the mixing chamber 290 may include a single-layer wall, where the inner wall 296A refers to the inner side of the wall and the outer wall 296B refers to the outer side of the wall. The wall may include a thermal insulation material such as, e.g., fiberglass. Other examples of suitable materials of the mixing chamber 290 may include stainless steel, aluminum, titanium, food-grade plastic, silicone, fiberglass, or the like, or an alloy, or a combination thereof. In some embodiments, the mixing chamber 290 may include more than one material. For example, the inner wall 296A and the outer wall 296B may include different materials. As another example, the inner wall 296A and the outer wall 296B may include a coating over another material. The wall 296 of the mixing chamber 290 may include one or more coatings as described elsewhere in the present document.

The mixing chamber 290 may include an opening for receiving content, e.g., from the fluid feeder 120, the ingredient feeder 130, the cleaning solution feeder 140, the pressurized gas assembly 170, etc. For example, the mixing chamber 290 may receive content via an opening defined by the rim 294. The mixing chamber 290 may include a dispensing opening 292 for dispensing content to, e.g., a user cup, a drainage assembly 195, etc. The dispensing opening 292 may be positioned on an opposite side of the opening for receiving content.

The mixing chamber 290 may be detachably attached to other components of the system 200. For example, the mixing chamber 290 may be detached from the fluid channel 221 (or the spray rim 429), the nozzle plate 237, etc. The mixing chamber 290 may be removed for cleaning purposes, to replace it with a different mixing chamber for making a certain beverage, for storage purposes, etc.

The system 200 may include one or more sensors or sensing circuits. For example, the system 200 may include at least one of a temperature sensor or sensing circuit 212, a pressure sensor or sensing circuit, or the like, or a combination thereof. The temperature sensor or sensing circuit 212 may be positioned or otherwise configured to monitor the temperature in one or more components of the system 200 including, e.g., the fluid feeder 120, the ingredient feeder 130, the pressurized gas assembly 170, the mixing chamber 290, etc. The temperature sensor or sensing circuit 212 may be coupled to a controller or control circuit 218 configured to monitor the temperature information acquired by the temperature sensor or sensing circuit 212 and/or adjust operation of the system 200 accordingly. In some embodiments, a notification (e.g., normal temperature, overheating at a component of the system 200) to a user, a user device, a server, etc., may be generated based on the temperature information acquired by the temperature sensor or sensing circuit 212. Merely by way of example, when overheat is detected, the controller or control circuit 218 may force the system 200 to shun down automatically, and send notifications to a user (e.g., a customer, authorized personnel, or the like, or a combination thereof). A pressure sensor or sensing circuit may be positioned or otherwise configured to monitor pressure in one or more components of the system 200 (e.g., in the fluid feeder 120, the pressurized gas assembly 170, the mixing chamber 290, etc.). The pressure sensor or sensing circuit may be coupled to a controller or control circuit (e.g., 218 in FIG. 2A) configured to monitor the pressure information acquired by the pressure sensor or sensing circuit and/or adjust operation of the system 200 accordingly. In some embodiments, a notification (e.g., normal pressure, high pressure, or low pressure at a component of the system 200) to a user, a user device, a server, etc., may be generated based on the pressure information. In some embodiments, a recommendation may be provided relating to the acquired temperature and/or pressure information.

To ensure safe operation, the system 200 may include overflow prevention features for one or more of the fluid feeder 120, the ingredient feeder 130, and the cleaning solution feeder 140. For example, one or more of the controllers or control circuits 228A and 228B of the fluid feeder 120, the controllers or control circuits 238A and 238B of the ingredient feeder 130, and the controller or control circuit 248 of the cleaning solution feeder 140 may be programmed with maximum dispensing limits to prevent accidental release of an excessive amount of corresponding content, including, e.g., fluid from the water source 222, an ingredient from an ingredient source 232, a cleaning agent 243 from the holding component 241, or a cleaning solution from the cleaning solution source 242.

In some embodiments, the system 200 may include a drainage assembly 195 connected to a drainage system or not, to allow liquid waste, such as overflow from beverages or used cleaning liquid, to be collected and/or drained away automatically or with some or minimal user intervention.

One or more controller or control circuits (including, e.g., 218, 228A, 228B, 238A, 238B, 248A, 248B, 268, 278A, 278B, 288) of the system 200 may belong to the control 110. Multiple controllers or control circuits of the system 200 may be integrated into a single control circuit.

FIG. 3 illustrates a partial schematic of the system 100 or 200 configured in accordance with embodiments of the present document. The fluid channel 221 may extend along the rim 294 of the mixing chamber 290, or a portion thereof. The fluid channel 221 may have (substantially) uniform cross sections along the rim 294. In some embodiments, the fluid channel 221 may have varying cross sections along the rim 294. The cross sections may vary in terms of shapes, cross-sectional areas, or a combination thereof. A cross section along the rim 294 may have the shape of a rectangle, a square, an oval, a polygon, etc.

The fluid channel 221 may have an interior formed by one or more walls 223 (individually identified as a first wall 223A, a second wall 223B, a third wall 223C, and a fourth wall 223D, as illustrated in FIG. 3). The fluid channel 221 may have a consistent cross-section along the rim 294 of the mixing chamber 290. The first wall 223A and the second wall 223B may oppose each other, with the second wall 223B facing toward the mixing chamber 290. The third wall 223C and the fourth wall 223D may oppose each other, connecting the first wall 223A and the second wall 223B. The third wall 223C may face the rotation axis Z (as illustrated in FIG. 2A) of the mixing chamber 290. In some embodiments, at least two of the walls 223A, 223B, 223C, and 223D may be a single integral piece. For example, the first wall 223A and the third wall 223C may be an integral piece. Alternatively, the first wall 223A and the fourth wall 223D, or all walls defining the interior of the fluid channel 221 (including, e.g., 223A, 223B, 223C, and 223D), may be an integral piece. In some embodiments, at least two adjacent walls among 223A, 223B, 223C, and 223D may be connected by a fluid-tight joint (e.g., using glue, welding, soldering, or a combination thereof).

The interior of the fluid channel 221 formed by the walls 223 may accommodate water. The fluid channel 221 may include multiple openings to receive and discharge water, respectively. For example, the fluid channel 221 may include one or more openings (individually identified as one or more first openings 227A, one or more second openings 227B, and one or more third openings 227C as illustrated in FIG. 3). At least a portion of these openings may be located on one or more of the walls 223 of the fluid channel 221. The fluid channel 221 may receive water from the water source (or referred to as water supply) 222 via the one or more first openings 227A coupled to the tube 225. The fluid channel 221 may discharge water via the second opening(s) 227B and/or the third opening(s) 227C. The second opening(s) 227B and the third opening(s) 227C may face different directions. Merely by way of example, the second opening(s) 227B may be located at the bottom of the fluid channel 221 facing toward the mixing chamber 290 (e.g., the wall 296 of the mixing chamber 290), while the third opening(s) 227C may face the rotation axis Z of the mixing chamber 290. The openings 227B may be distributed (e.g., substantially uniformly) along a perimeter of the wall 223B. The openings 227C may be distributed (e.g., substantially uniformly) along a perimeter of the wall 223C, constituting a 360-degree sprinkler system. For example, the fluid channel 221 may include only the second openings 227B or only the third openings 227C for discharging water or another substance (e.g., air, a cleaning solution, etc.). As another example, the fluid channel 221 may include both the second openings 227B and the third openings 227C. At least two of the second openings 227B may be (substantially) identical or different with respect to the size, shape, etc. At least two of the third openings 227C may be (substantially) identical or different with respect to the size, shape, etc. A second opening 227B and a third opening 227C may be (substantially) identical or different with respect to the size, shape, etc. Air may be fed to the fluid channel 221 via an opening 277 located on, e.g., the first wall 223A (or another wall of the fluid channel 221, e.g., the fourth wall 223D).

As illustrated in FIG. 3, the second opening(s) 227B may include one or more apertures distributed on the second wall 223B. For example, the opening(s) 227B may include a continuous slit located on the second wall 223B. As another example, the opening(s) 227B may include discrete slits or holes distributed on the second wall 223B. In some embodiments, the opening(s) 227B may be positioned above the opening of the mixing chamber 290 along a vertical direction (e.g., along the rotation axis Z of the mixing chamber 290). When viewed substantially along the vertical direction, the opening(s) 227B may fall within a range of the opening of the mixing chamber 290 defined by the rim 294, allowing water exiting the second opening(s) 227B to move toward the mixing chamber 290 at least by gravity, as illustrated in panel IV of FIG. 3.

As illustrated in FIG. 3, the third opening(s) 227C may include one or more apertures distributed on the third wall 223C. For example, the opening(s) 227C may include a continuous slit located on the third wall 223C. As another example, the opening(s) 227C may include discrete slits or holes distributed on the second wall 223C. In some embodiments, water may exit the opening(s) 227C (substantially or generally) along a horizontal direction toward the rotation axis Z of the mixing chamber 290, as illustrated in panel III of FIG. 3. In some embodiments, one or more of the opening(s) 227B and the opening(s) 227C may be sized to increase pressure of water as it passes through. In some embodiments, an opening 227B or an opening 227C may be coupled to a nozzle configured to pressurize water being discharged through it. Examples of suitable nozzles may include a spray nozzle, a jet nozzle, a venturi nozzle, or the like, or a combination thereof.

FIGS. 4 and 5 illustrate a partial schematic of the system 100 or 200 configured in accordance with embodiments of the present document. As illustrated, the fluid channel 221 (as otherwise described elsewhere in the present document) may be positioned within a spray rim 429. The space between the spray rim 429 and the fluid channel 221 may serve as a gas conduit 271. In this configuration, the gas conduit 271 may wrap around at least part of the fluid channel 221. The gas conduit 271 may be part of the pressurized gas assembly 170. The gas conduit 271 may be coupled to a gas source (e.g., the air source 272 as illustrated in FIG. 2A) to receive gas (e.g., air, etc.). The spray rim 429 may be removably attached to the mixing chamber 290 at or around the rim 294 as discussed elsewhere in the present document. See, e.g., relevant description of FIG. 2A.

The spray rim 429 may extend along the rim 294 of the mixing chamber 290, or a portion thereof. The spray rim 429 may have (substantially) uniform cross sections along the rim 294. In some embodiments, the spray rim 429 may have varying cross sections along the rim 294. The cross sections may vary in terms of shapes, cross-sectional areas, or a combination thereof. A cross section along the rim 294 may have the shape of a rectangle, a square, an oval, a polygon, etc. A cross section of the spray rim 429 may be larger than a corresponding cross section of the fluid channel 221. As used herein, a cross section of the spray rim 429 and a cross section of the fluid channel 221 may be considered corresponding if they are taken at the same location on the rim 294. A cross section of the spray rim 429 and a corresponding cross section of the fluid channel 221 may have the same shape or different shapes.

The spray rim 429 may have an interior formed by one or more walls 423 (individually identified as a first wall 423A, a second wall 423B, a third wall 423C, and a fourth wall 423D, as illustrated in FIG. 5). The spray rim 429 may have a consistent cross-section along the rim 294 of the mixing chamber 290. The first wall 423A and the second wall 423B may oppose each other, with the second wall 423B facing toward the mixing chamber 290. The third wall 423C and the fourth wall 423D may oppose each other, connecting the first wall 423A and the second wall 423B. The third wall 423C may face the rotation axis Z (as illustrated in FIG. 2A) of the mixing chamber 290. In some embodiments, at least two of the walls 423A, 423B, 423C, and 423D may be a single integral piece. For example, the first wall 423A and the third wall 423C may be an integral piece. Alternatively, the first wall 423A and the fourth wall 423D, or all walls defining the interior of the spray rim 429 (including, e.g., 423A, 423B, 423C, and 423D), may be an integral piece. In some embodiments, at least two adjacent walls among 423A, 423B, 423C, and 423D may be connected by a fluid-tight joint (e.g., using glue, welding, soldering, or a combination thereof).

The interior of the spray rim 429, formed by the walls 423, may accommodate both the fluid channel 221 and the gas conduit 271. The spray rim 429 may include multiple openings 427 (individually identified as one or more first openings 427A, one or more second openings 427B, and one or more third openings 427C as illustrated in FIG. 4) to allow water from the water source 222 reach or exit the fluid channel 221. As illustrated in FIG. 4, the third wall 423C may have multiple openings 427C (individually identified as 427C-1, 427C-2, 427C-3, and 427C-4). For example, the fluid channel 221 may include one or more first openings 227A, one or more second openings 227B, and one or more third openings 227C, as illustrated in FIG. 3. The spray rim 429 may include corresponding openings, allowing water from the fluid feeder 120 to reach or exit the fluid channel 221 through its openings 227. As used herein, an opening 427 on the spray rim 429 corresponding to an opening 227 on the fluid channel 221 may indicate that the opening 427 is positioned and/or sized such that the opening 427 (substantially) coincides with or does not block water from entering or exiting the fluid channel 221. An opening 427 may be larger than or (substantially) the same size as a corresponding opening 227. In some embodiments, an opening 427 may correspond to one or more openings 227. For example, a single opening 427 may correspond to one, two, three, or more openings 227.

The spray rim 429 may include one or more openings 477 to allow gas (e.g., air, etc.) from the pressurized gas assembly 170 to enter the gas conduit 271. For example, the tube 275 may be coupled to an opening 477 to allow air from the air source 272 to enter the gas conduit 271. The opening(s) 477 may be located on a wall 423 of the spray rim 429. Merely by way of example, the opening(s) 477 may be located on the first wall 423A or the fourth wall 423D.

The air entering the gas conduit 271 may be pressurized, e.g., by the air pressure pump 274. The pressurized air may be mixed with the water in the spray rim 429 to pressurize the water and then exit as a mixture. The pressurized air may exit, without being mixed with water, through one or more openings accessible by the air (e.g., openings 507-1 and 507-2 as illustrated in FIG. 5).

As illustrated in FIG. 5, an opening 427C on the wall 423C of the spray rim 429 may be coupled to a nozzle 439. The opening 427C may be larger than a corresponding opening 227C of the fluid channel 221, allowing air to exit the gas conduit 271 through the portion of the opening 427C that is not occupied by the opening 227C, while water exits the fluid channel 221 through the opening 227C. Water and/or air exiting the spray rim 429 may enter the mixing chamber 290 via the nozzle 439. The nozzles 439 may be distributed along a perimeter of the wall 223C, corresponding to the openings 227C and constituting a 360-degree sprinkler system.

The nozzle 439 may include a cover 503 and an end cap 505. The cover 503 and the end cap 505 may form a space 513 that is (substantially) air-tight and/or fluid-tight except through openings on the cover 503 or the end cap 505. The end cap 505 may include one or more openings 509 connected to the space 513 and also coupled to an opening 227C of the fluid channel 221 so that water may exit the fluid channel 221 via the opening 227C and enter the space 513 via the opening 509. An opening 509 may be sized such that the pressure of water may remain substantially the same or increase when passing through. The end cap 505 may include one or more openings 507 (individually identified as openings 507-1 and 507-2 as illustrated in FIG. 5) coupled to the opening 427C of the fluid channel 221 so that air may exit the gas conduit 271 via the opening 427C and enter the space 513 via the openings 507. The cover 503 may include an opening 511 connected to the space 513. The air and water may mix in the space 513, allowing the water to be pressurized, and the mixture may exit the nozzle 439 via the opening 511. The opening 511 may be sized such that the pressure of water may remain substantially the same or increase when passing through. In some cases, air (e.g., pressurized or not, heated or not) may be discharged into the mixing chamber 290 via the nozzles 439 alone, without being mixed with water. For example, heated and/or pressurized air may be discharged into the mixing chamber 290 via the nozzles 439 for blow-drying and/or sanitizing the mixing chamber 290, the mixer 150, the dispenser 160, or the like, or a combination thereof. In some cases, water (e.g., pressurized (by the pump 224) or not, heated or not) may be discharged into the mixing chamber 290 via the nozzles 439 alone, without being mixed with air from the air source 272. For example, water from the water source 222 may be discharged into the mixing chamber 290 via the nozzles 439 for producing a beverage, without being mixed with air from the air source 272.

FIG. 5 also illustrates that water may exit the fluid channel 221 through opening(s) 427B located at the wall 423B of the fluid channel 221. The spray rim 429 may have corresponding opening(s), allowing water to exit the fluid channel 221 through its openings 227. In some embodiments, the water in the fluid channel 221 may be pressurized by, e.g., the pump 224. The opening(s) 227B may be sized such that the pressure of water may remain substantially the same or increase when passing through.

FIG. 6 illustrates a partial schematic of the system 100 or 200 configured in accordance with embodiments of the present document. As illustrated, the mixer 150 of the system 100 or 200 may include the stirrer 252 coupled to the plug 262. For example, the stirrer 252 may be coupled to the plug 262 such that the plug 262 may move with the stirrer 252 when the stirrer 252 undergoes linear motion and remains fixed in place when the stirrer 252 undergoes rotational motion. For example, an end portion of the plug 262 may be connected to an opposing end portion of the stirrer 252 via a ball and socket joint, a linear bearing, a prismatic joint, etc. This configuration may allow the plug 262 to adjust the extent to which the dispensing opening 292 of the mixing chamber 290 is available for dispensing by moving between different positions through linear motion. As illustrated in panel V, the plug 262 may move along the direction X2 (opposite to the direction X1 in FIG. 3) toward the dispensing opening 292 of the mixing chamber 290 to (substantially) block dispensing.

The stirrer 252 may include a stirring section 253B and a coupling section 253A at or near opposite end portions. The stirring section 253B may be configured to facilitate mixing. In some embodiments, the dispenser 160 (e.g., the plug 262) may be coupled to the stirrer 252 at the end portion closer to the stirring section 253B than to the coupling section 253A. The coupling section 253A may be configured to facilitate detachably coupling of the stirrer 252 to at least one actuator (e.g., the motor 254, the actuator 264, etc.). The coupling between the stirrer 252 and the actuator may be facilitated via a coupling assembly 602 as illustrated in panels II and III of FIG. 6. The detachable nature of the coupling between the stirrer 252 and the actuator may allow a user to remove the stirrer 252 conveniently for cleaning or replacement. The coupling assembly 602 may include at least one of a magnetic coupling, a quick-release mechanism, a detachable mechanical linkage, or the like, or a combination thereof, to allow the detachable coupling.

The coupling assembly 602 may be configured to transfer motion from the actuator to the stirrer 252. For example, the coupling assembly 602 may be configured to transfer rotational motion from the motor 254 to the stirrer 252. Additionally or alternatively, the coupling assembly 602 may be configured to transfer linear motion from the actuator 264 to the stirrer 252. In some embodiments, the coupling assembly 602 may include a motion conversion mechanism configured to convert motion of a first type to motion of a second type so that a single actuator may be sufficient to drive linear motion and rotational motion of the stirrer 252. Examples of suitable motion conversion mechanisms may include a lead screw with rotational lock, a clutch-based system, a cam and follower mechanism, a gear shifting mechanism, a flexible linkage with pivot, etc.

The coupling assembly 602 (individually identified as sensor coupling assembly 602A, 602B, and 602C as illustrated in panel III of FIG. 6) may include a cavity 604 (individually identified as cavity 604A, 604B, and 604C as illustrated in panel III of FIG. 6). In some embodiments, the coupling section 253A of the stirrer 252 may be inserted into the cavity 604 to be coupled to the actuator (e.g., the motor 254). In some embodiments, the cavity 604 may be located in the stirrer 252, e.g., at the coupling section 253A. The coupling assembly 602 may include a protrusion coupled to the actuator (e.g., the motor 254, the actuator 264) and received by the cavity in the stirrer 252. The coupling assembly 602 may include a sensor or sensing circuit 610 (individually identified as sensor or sensing circuit 610A, 610B, and 610C as illustrated in panel III of FIG. 6) positioned within or received by the cavity 604. The sensor or sensing circuit 610 may be configured to detect a position and/or movement of the stirrer 252, thereby allowing an assessment of whether the stirrer 252 is securely coupled to the actuator. For example, the sensor or sensing circuit 610 may be configured to detect the position of the stirrer 252, or a portion thereof. When the stirrer 252, or a portion thereof, reaches an intended position, the stirrer 252 is deemed securely coupled to the coupling assembly 602 and/or the actuator. As another example, the sensor or sensing circuit 610 may be configured to detect motion of the stirrer 252 relative to the ambient environment (e.g., relative to the housing 105, the floor where the system 100 or 200 is supported), or relative to the actuator (e.g., the motor 254, the actuator 264, etc.). When the movement satisfies a condition (e.g., detected motion of the stirrer 252 relative to the motion output by the actuator below a threshold), the stirrer 252 is deemed securely coupled to the coupling assembly 602 and/or the actuator. In some embodiments, the actuator may be turned on when the stirrer 252 is determined to be securely coupled.

The example illustrated in part A of panel III involves a coupling assembly 602A including a sealed sensor or sensing circuit 610A. The coupling section 253A of the stirrer 252 may have a protrusion 655A sized to fit into the cavity 604A of the coupling assembly 602A. The sensor or sensing circuit 610A (e.g., a contact or proximity sensor or sensing circuit) may be positioned in the cavity 604A (e.g., on a wall of the cavity 604A) to detect contact or proximity with the protrusion 655A, on the basis of which the position of the stirrer 252 may be assessed. The protrusion 655A may have a gasket 614 including, e.g., an O-ring, to form a fluid-tight seal within the cavity 604A, thereby protecting the cavity 604A and/or the sensor or sensing circuit 610A from exposure to content from the mixing chamber 290. Examples of the sensor or sensing circuit 610A may include a pressure sensor or sensing circuit, a capacitive touch sensor or sensing circuit, a piezoelectric sensor or sensing circuit, or the like, or a combination thereof. The stirrer 252 may be detached from the coupling assembly 602A by applying a force, e.g., one that exceeds the friction between the internal wall of the cavity 604A and the gasket 614.

The example illustrated in part B of panel III involves a coupling assembly 602B including magnetic sensors or sensing circuits. The coupling section 253A of the stirrer 252 may have a protrusion 655B that includes a magnetic element of a first polarity. A magnetic sensor or sensing circuit 610B of an opposite polarity may be positioned in the cavity 604B. The magnetic sensor or sensing circuit 610B may facilitate, through magnetic attraction, the coupling of the stirrer 252 with the coupling assembly 602B and/or the actuator. The stirrer 252 may be detached from the coupling assembly 602B by applying a force that exceeds the magnetic attraction between the magnetic sensor or sensing circuit 610B and the magnetic element of the protrusion 655B.

The example illustrated in part C of panel III involves a coupling assembly 602C including a limit switch. The coupling section 253A of the stirrer 252 may have a protrusion 655C sized to fit into the cavity 604C of the coupling assembly 602C. A microswitch 610C may be positioned in the cavity 604C. The protrusion 655C may be inserted into the cavity 604C. When the protrusion 655C reaches an intended position, the microswitch 610C may be actuated so that the actuator may be actuated. The coupling assembly 602C may include one or more buttons 612 (e.g., one or more push-release bottoms) on an outer wall accessible to a user or an automated mechanism. In some embodiments, by pushing the button(s) 612, the microswitch 610C may be reset, and/or the stirrer 252 may be detached from the coupling assembly 602C.

The stirring section 253B of the stirrer 252 may include a stirring part including one or more blades 255. Additionally or alternatively, the stirring part of the stirring section 253B may include a whisk, a coiled whisk, a wired whip, a double whisk as illustrated in parts A, B, C, and D in panel IV. The stirrer 252 may include one of these or other example stirring parts combined with one of the example coupling sections discussed elsewhere in this document, or other suitable coupling sections. The stirring part of the stirring section 253B may be replaceable. For example, a first stirring part may be suitable for producing a first type of beverage, while a second stirring part may be suitable for producing a second type of beverage. When a user orders a beverage, a suitable stirring part may be installed; when another user orders a different beverage, a different stirring part may be installed.

Figure 7:
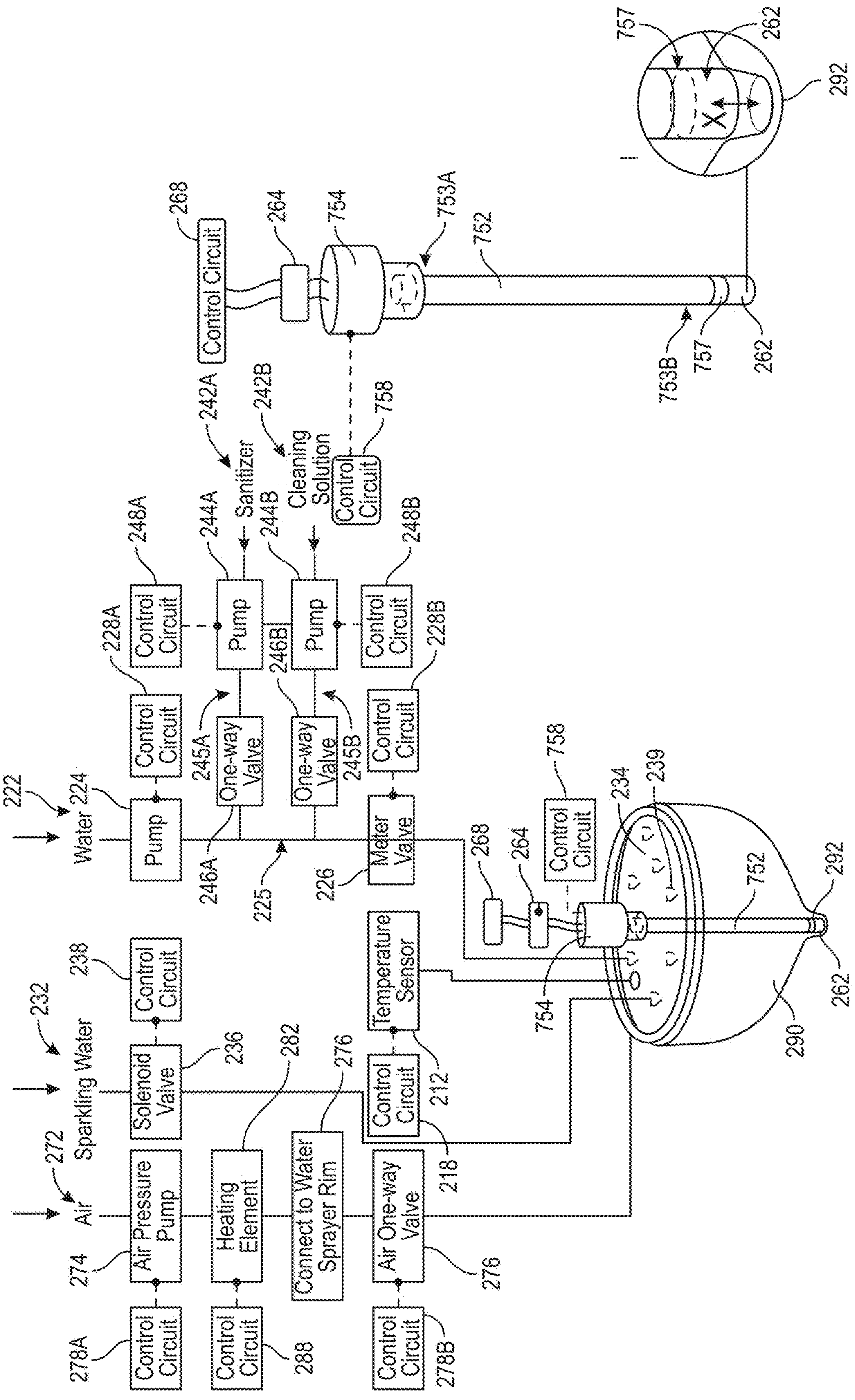
Figure 8:
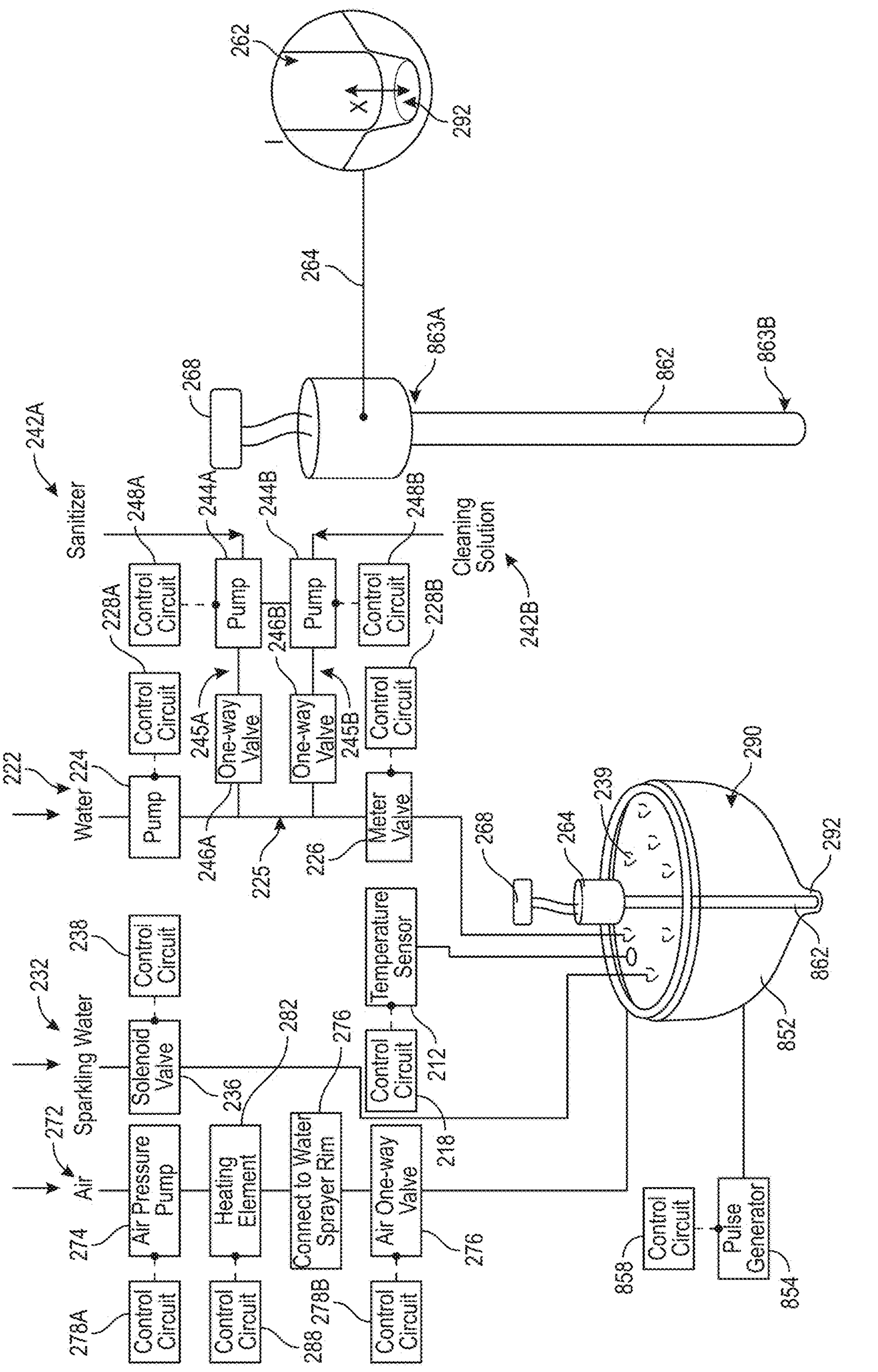

FIGS. 7 and 8 illustrate partial schematics of the system 100 or 200 configured in accordance with embodiments of the present document. The mixer 150 may be configured to perform ultrasonic mixing. The mixer 150 may include a transducer coupled to a pulse generator and configured to convert electrical energy into mechanical vibrations or waves. By tuning the vibration frequency, we can agitate the liquid and achieve a mixing effect. This frequency can be adjusted to break down high viscosity ingredient molecules, making them easier to mix with low viscosity ingredients. In some embodiments, the ultrasonic mixing may be involved in a cleaning process to improve or optimize cleaning results by effectuating a more thorough cleaning and/or covering more areas to be cleaned.

As illustrated in FIG. 7, the mixer 150 of the system 100 or 200 may include a transducer 752. The transducer 752 may include a piezoelectric element or one or more other vibrating components. The transducer 752 may be coupled to a pulse generator 754 configured to supply electrical pulses, allowing the transducer 752 to convert electrical energy into mechanical vibrations or waves. The operation of the pulse generator 754 may be controlled by a controller or control circuit 758. The transducer 752 may include an ultrasonic transducer. The transducer 752 may facilitate mixing by generating waves (e.g., high-frequency sound waves). In use, the transducer 752 may be at least partially immersed in the content (a liquid medium) in the mixing chamber 290.

The transducer 752 may have a first coupling section 753A and a second coupling section 753B at or near opposite end portions. The transducer 752 may be detachably coupled to the pulse generator 754 at the first coupling section 753A. In some embodiments, the transducer 752 may be further configured to undergo linear motion. For example, the transducer 752 may be further coupled to the actuator 264 at the first coupling section 753A so that the transducer 752 may undergo linear motion driven by the actuator 264. The transducer 752 may be (e.g., detachably) coupled to the dispenser 160 (e.g., the plug 262) at the second coupling section 753B. The coupling between the dispenser 160 and the transducer 752 may (substantially) isolate the dispenser 160 from the vibrations generated by the transducer 752, while allowing the dispenser 160 to move along the X direction with the transducer 752. This movement along the X direction may allow the dispenser 160 to adjust the extent to which the dispensing opening 292 is available for dispensing. In some embodiments, the dispenser 160 may be coupled to the transducer 752 using a coupling element 757 that includes a seismic material, silicone, rubber, etc. For example, the coupling element 757 may include a damping pad including one or more of such materials.

As illustrated in FIG. 8, the mixer 150 of the system 100 or 200 may include a transducer 852. The transducer 852 may include a piezoelectric element or one or more other vibrating components. The transducer 852 may be coupled to a pulse generator 854. The operation of the pulse generator 854 may be controlled by a controller or control circuit 858. The transducer 852 may include an ultrasonic transducer. The transducer 852 may facilitate mixing by generating waves (e.g., high-frequency sound waves). In use, the transducer 852 may be at least partially immersed in or otherwise in contact with the content (a liquid medium) in the mixing chamber 290.

The transducer 852 may be coupled to the mixing chamber 290 to transfer waves or vibrations generated by the transducer 852 to the mixing chamber 290, causing the mixing chamber 290 to vibrate and facilitate mixing. The coupling between the transducer 852 and the mixing chamber 290 may include directly mechanical coupling (e.g., a bolted or screwed connection, a welded or soldered joint), adhesive bonding (e.g., epoxy or silicone adhesive), magnetic coupling, clamping coupling, acoustic coupling gel or grease, a threaded coupling (e.g., threaded insert or bushing), or the like, or a combination thereof. For example, the transducer 852 may include one or more piezoelectric elements or other vibrating components, positioned as one or more clusters or separately over the wall 296 (e.g., the outer wall 296B) of the mixing chamber 290. The configuration may allow for flexible arrangement and convenient adjustment of the transducer 852 to achieve a desired efficiency of vibration transmission.

In some embodiments, the mixing chamber 290 can serve as the transducer 852. In this configuration, one or more piezoelectric elements or other vibrating components can be integrated into the walls 296 of the mixing chamber 290. When activated (e.g., by the pulse generator 854), these components may generate mechanical vibrations, causing the mixing chamber 290 to vibrate and facilitating mixing. This integrated approach may eliminate the need for a separate transducer, simplifying the design, and/or enhancing the efficiency of vibration transmission. The mixing chamber 290 can be designed with appropriate materials and structural features to ensure effective vibration generation and durability under operational conditions.

The dispenser 160 may include a rod 862. The rod 862 may have a first end portion 863A and a second end portion 863B opposite to the first end portion 863A. The rod 862 may be coupled to the actuator 264 at the first end portion 863A. The actuator 264 may be configured to cause the rod 862 to move along the direction X between a first position and a second position. The second end portion 863B may be sized to block the dispensing opening 292 of the mixing chamber 290 when in the first position so that (substantially) no content exits the mixing chamber 290 via the dispensing opening 292. The dispensing opening 292 of the mixing chamber 290 may be (substantially) fully open when the rod 862 moves away from the first position (or the dispensing opening 292 of the mixing chamber 290) and arrives at the second position (e.g., as illustrated in panel I in FIG. 3), allowing dispensing of content from the mixing chamber 290 via the dispensing opening 292 into, e.g., a user cup, the drainage assembly 195, etc. The operation of the actuator 264 may be controlled by a controller or control circuit 268.

Figure 9:
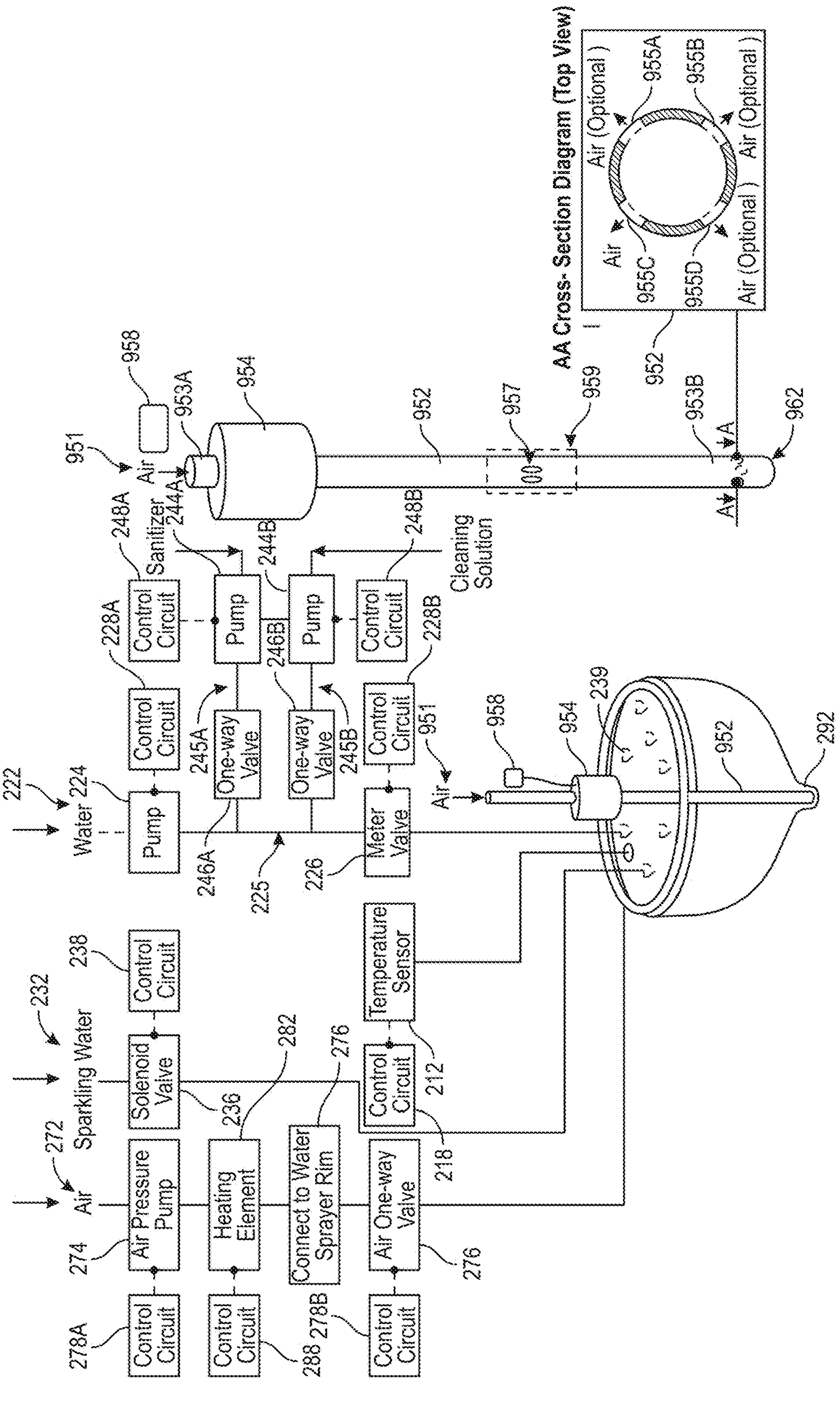
Figure 10:
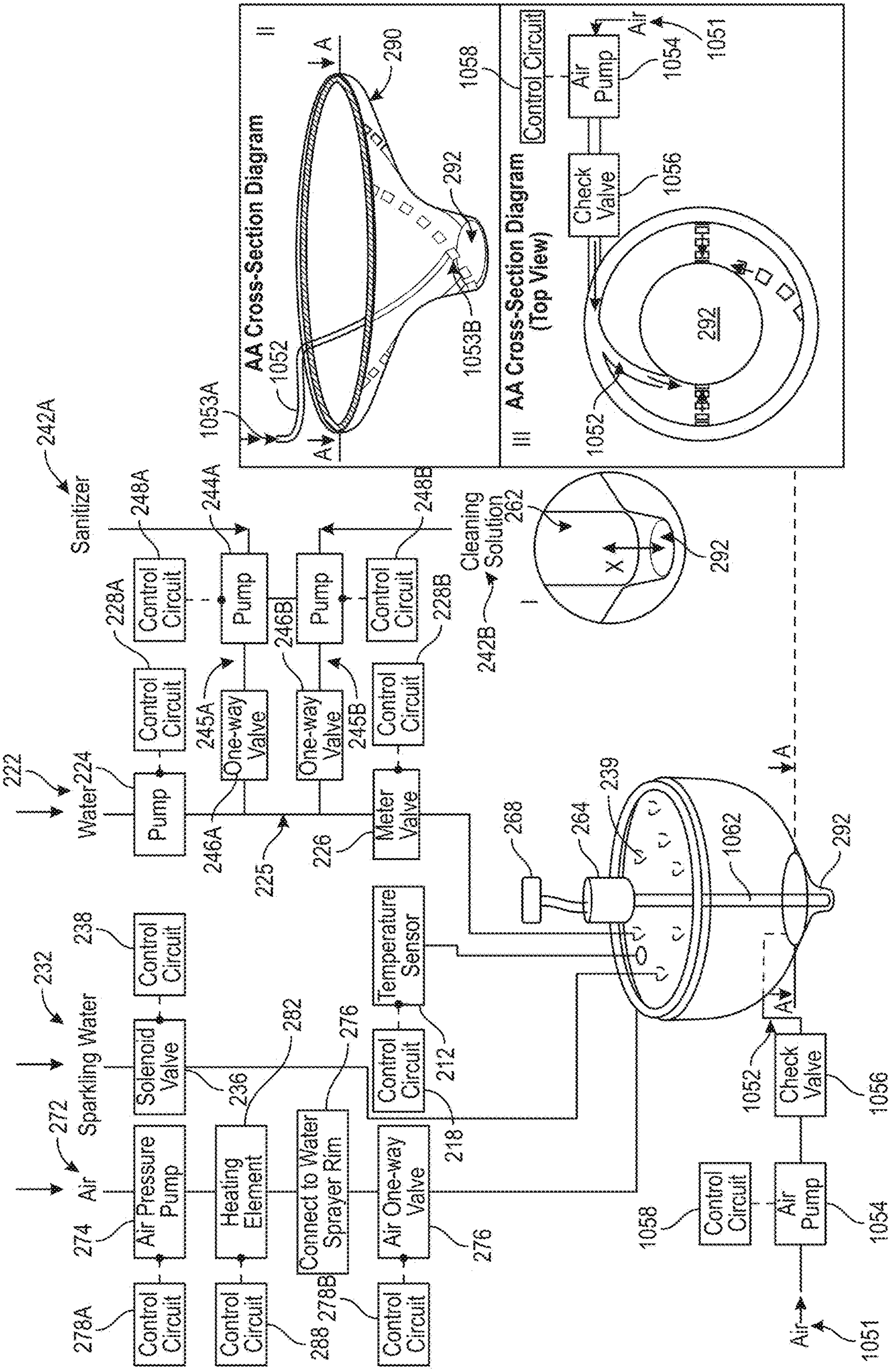

FIGS. 9 and 10 illustrate partial schematics of the system 100 or 200 configured in accordance with embodiments of the present document. As illustrated, the mixer 150 of the system 100 or 200 may be configured to perform aeration blending or mixing. The mixer 150 may include an airway to guide pressurized air to a specific level in the mixing chamber 290 and release the pressurized air into the mixing chamber 290. The pressurized air may agitate the content to facilitate mixing. For example, the pressurized air may be released at a level closer to the bottom (e.g., the dispensing opening 292) of the mixing chamber 290 rather than near the top layer of the content so that the pressurized air may push the content near the bottom upward toward the top layer to facilitate mixing. In some embodiments, the aeration mixing may be involved in a cleaning process to improve or optimize cleaning results by effectuating a more thorough cleaning and/or covering more areas to be cleaned.

As illustrated in FIG. 9, the mixer 150 may include a tube 952. The tube 952 may include a first end portion 953A and a second end portion 953B opposite to the first end portion 953A. The tube 952 may be open to air via an opening at the first end portion 953A. At least a portion of the tube 952 between the first end portion 953A and the second end portion 953B may serve as an airway. Air from air source 951 (e.g., the ambient air) may enter the tube 952 through the opening at the first end portion 953A, be pressurized (e.g., compressed) by an air pump 954 (e.g., an air compressor) coupled to the tube 952, and flow in the tube 952 toward the second end portion 953B. The operation of the air pump 954 may be controlled by a controller or control circuit 958. The air pump 954 may be part of the pressurized air assembly 170.

The tube 952 may include one or more openings (or referred to as air holes) 955 (individually identified as a first opening 955A, a second opening 955B, a third opening 955C, and a fourth opening 955D, as illustrated in panel I, a top view from A-A). The tube 952 may include more or fewer opening(s) 955 than illustrated. In some embodiments, multiple openings 955 may be distributed around a circumference of the tube 952. Pressurized air in the tube 952 may be released into the mixing chamber 290 via the opening(s) 955 to agitate the content in the mixing chamber 290 (e.g., in a spiral direction) and facilitate mixing. The opening(s) 955 may be located at a level closer to the bottom (e.g., the dispensing opening 292) of the mixing chamber 290 rather than near the top layer of the content so that the pressurized air may push the content near the bottom upward toward the top layer to facilitate mixing.

In some embodiments, the tube 952 may include multiple openings (e.g., opening(s) 957 and opening(s) 955) located at different levels. For example, the opening(s) 957 may be located at a level closer to the first end portion 953A than the opening(s) 955; in other words, the opening(s) 957 may be located at a level farther away from the bottom (e.g., the dispensing opening 292) of the mixing chamber 290 than the opening(s) 955 when in use as intended. One or more of these openings may be selectively openable or sealable. For example, the plug 962 may include a cover 959 (e.g., a sleeve or sheath) moveable to cover or expose the openings 957. When the cover 959 is positioned to cover the opening(s) 957, pressurized air may exit the tube 952 through the opening(s) 955 to facilitate mixing. When the cover 959 is positioned to expose the opening(s) 957, a substantial portion of the pressurized air in the tube 952 may exit through the opening(s) 957 to facilitate dispensing. The cover 959 may be moveable by a manual mechanism (e.g., a thumb slide, a rotary knob), or a motorized mechanism (e.g., an actuator), a spring, a magnetic element (e.g., an electromagnet), or the like, or a combination thereof.

The dispenser 160 may include a plug 962 coupled to the tube 952 at its second end portion 953B. The plug 962 may be substantially the same as or similar to the plug 262, the description of which is applicable and not repeated here. In some embodiments, the plug 962 may be an integral piece of the tube 952. That is, the dispenser 160 is an end portion of the tube 952. The tube 952 may be coupled to an actuator (e.g., the actuator 264, not shown in FIG. 9) configured to cause the tube 952 to undergo linear motion. The tube 952 may be rigid enough to cause the plug 962 to move along the direction X between a first position and a second position to adjust the extent to which the dispensing opening 292 of the mixing chamber 290 is available for dispensing. For example, the tube 952 may include a material including stainless steel, aluminum, food-grade plastic, silicone, fiberglass, rubber, or the like, or an alloy, or a combination thereof. In some embodiments, the tube 952 may be coupled to a check valve (not shown in FIG. 9) to prevent content in the mixing chamber 290 to flow into the tube 952 toward the air pump 954.

As illustrated in FIG. 10, the mixer 150 may include a tube 1052. The tube 1052 may include a first end portion 1053A and a second end portion 1053B opposite to the first end portion 1053A. The tube 1052 may be open to air via an opening at the first end portion 1053A. At least a portion of the tube 1052 between the first end portion 1053A and the second end portion 1053B may serve as an airway. Air from air source 1051 (e.g., the ambient air) may enter the tube 1052 through the opening at the first end portion 1053A, be pressurized (e.g., compressed) by an air pump 1054 (e.g., an air compressor) coupled to the tube 1052, and flow in the tube 1052 toward the second end portion 1053B, and exit at an opening at the second end portion 1053B. In some embodiments, the tube 1052 may be coupled to a check valve 1056 to prevent content in the mixing chamber 290 to flow into the tube 1052 toward the air pump 1054. The operation of the air pump 954 may be controlled by a controller or control circuit 1058. The air pump 1054 and/or the check valve 1056 may be part of the pressurized air assembly 170.

The tube 1052 may extend (e.g., along the inner wall 296A) to a level closer to the bottom (e.g., the dispensing opening 292) of the mixing chamber 290 rather than near the top layer of the content so that the pressurized air exiting the tube 1052 may push the content near the bottom upward toward the top layer to facilitate mixing. In some embodiments, the mixer 150 may include multiple tubes 1052 with openings at the second end portions of respective tubes 1052 positioned at different locations in the mixing chamber 290.

In some embodiments, the tube 1052 may be sufficiently flexible or specifically shaped so that it may extend along the inner wall 296A of the mixing chamber 290, thereby reducing or minimizing the interference with the mixing and/or dispensing in the mixing chamber 290. For example, the tube 1052 may include a material including stainless steel, aluminum, food-grade plastic, silicone, fiberglass, rubber, or the like, or an alloy, or a combination thereof.

The dispenser 160 may include a rod 1062. The rod 1062 may be coupled to the actuator 264 to move between a first position and a second position to adjust the extent to which the dispensing opening 292 is available for dispensing. The operation of the actuator 264 may be controlled by the controller or control circuit 268. The rod 1062 may be substantially the same as or similar to the rod 862, the description of which is applicable and not repeated here.

FIGS. 11-15 are partial schematic illustrations of embodiments of a drainage assembly 195 of a beverage system 100 or 200 configured in accordance with embodiments of the present document. The drainage assembly 195 may be configured to receive and/or temporarily store liquid waste. Liquid waste may include overflow from a beverage preparation operation (e.g., the volume of a produced beverage exceeding the capacity of a user cup), used cleaning water, and/or other liquids. In some embodiments, liquid waste may be emptied manually by a user. For example, the drainage assembly 195 may include a sensor or sensing circuit to detect the amount of the liquid waste (e.g., stored in a waste bin of the drainage assembly 195) and provide a notification to a user when the amount reaches or exceeds a threshold. In some embodiments, the drainage assembly 195 may include a drainage tube (e.g., 1125 in FIG. 11, 1225 in FIG. 12, 1325 in FIG. 13, 1425 in FIG. 14, 1525 in FIG. 15) to automatically direct liquid waste away from the drainage assembly 195 to, e.g., an external drainage system (e.g., a sink, a drain line, a sewer connection, a wastewater collection tank, etc.).

Figure 11:
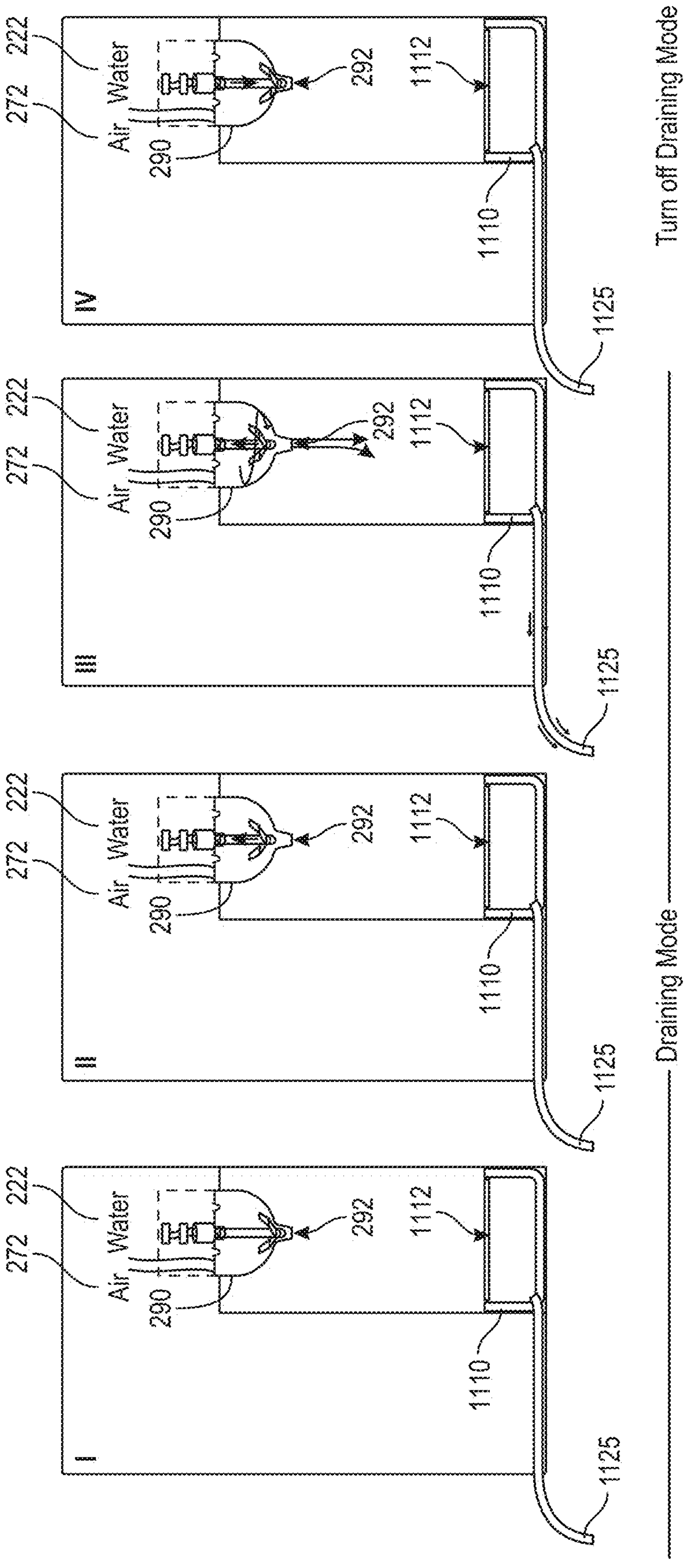
FIGS. 11-15 are partial schematic illustrations of embodiments of a drainage assembly of a beverage system configured in accordance with embodiments of the present document.

As illustrated in FIG. 11, the drainage assembly 195 of the system 100 or 200 may include a waste bin 1110 coupled to a drainage tube 1125. The waste bin 1110 may be positioned underneath the mixing chamber 290 to collect liquid waste from the mixing chamber 290 or other components of the system 100 or 200. If no container (e.g., a user cup) is placed between the dispensing opening 292 and the waste bin 1110, content dispensed from the mixing chamber 290 via the dispensing opening 292 may be received by the waste bin 1110. The waste bin 1110 may remain in place during draining mode (as illustrated in panels I, II, and III) and non-draining mode (as illustrated as "turning off draining mode" in panel IV). Suitable materials for the waste bin 1110 may include stainless steel, high-density polyethylene (HDPE), polypropylene, or other corrosion-resistant plastics, which may provide durability, chemical resistance, and ease of maintenance. The waste bin 1110 may include a cover 1112. The cover 1112 may include a plate configured with various features such as perforations, slots, a mesh screen, or the like, or a combination thereof. These features may allow liquid waste to pass through into the waste bin 1110 while preventing larger debris (e.g., debris whose dimensions exceed a threshold) from entering, thus ensuring efficient separation and collection of waste materials. In use, the cover 1112 may serve as a support for, e.g., a user cup or other container when needed. Suitable materials for the cover 1112 may include stainless steel, plastic (e.g., polypropylene or polyethylene), aluminum, or the like, or an alloy thereof, or a combination thereof. Such materials may offer durability, resistance to corrosion, and ease of cleaning. The drainage tube 1125 may direct liquid waste away from the waste bin 1110 to, e.g., an external drainage system (e.g., a sink, a drain line, a sewer connection, a wastewater collection tank, etc.).

Panel I illustrates the scenario in which the dispensing opening 292 of the mixing chamber 290 is blocked, preventing content from being dispensed. Panel II illustrates the scenario in which the dispensing opening 292 of the mixing chamber 290 is unblocked, allowing content to be dispensed from the dispensing opening 292. Panel III illustrates the scenario in which content is being dispensed from the mixing chamber 290 via the dispensing opening 292. The dispensed content may be collected in the waste bin 1110 after passing through the cover 1112 and directed away from the waste bin 1110 via the drainage tube 1125. Panel IV illustrates the scenario in which the dispensing opening 292 of the mixing chamber 290 is blocked again, preventing further dispensing of content. The waste bin 1110 may remain in place across these scenarios. This configuration may obviate the need for an actuator or a controller or control circuit and therefore offering the benefit including simplicity, cost efficiencies, and low maintenance.

Figure 12:
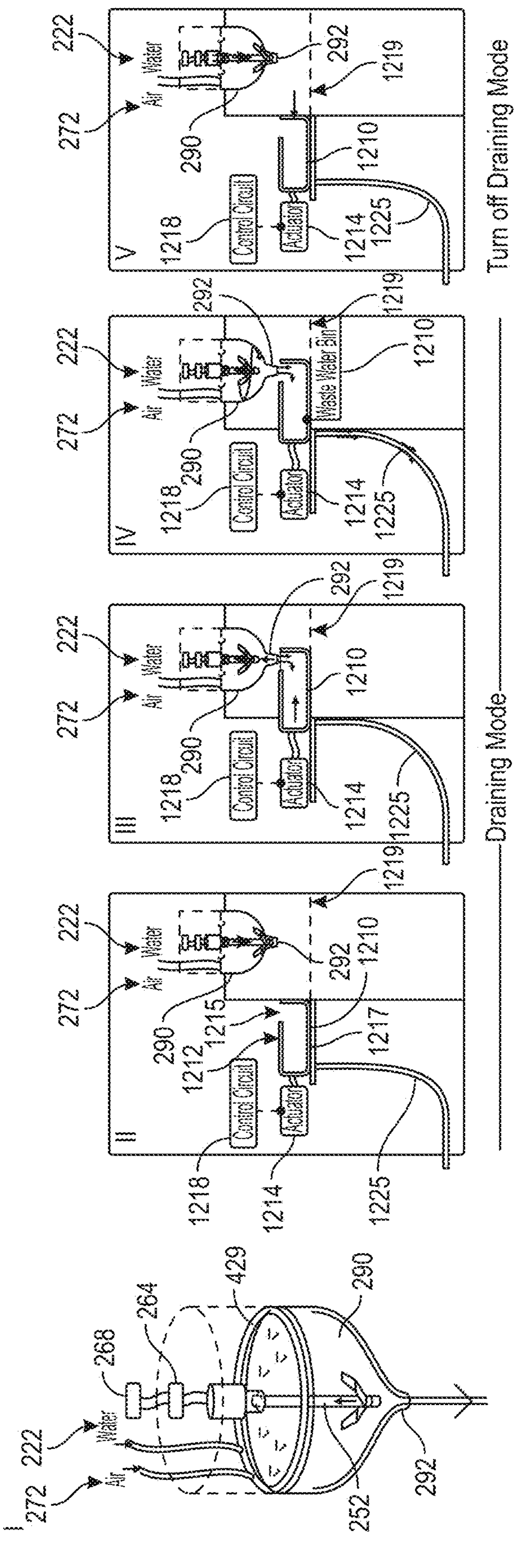

As illustrated in FIG. 12, the drainage assembly 195 of the system 100 or 200 may include a waste bin 1210 coupled to a drainage tube 1225. The waste bin 1210 may be positioned underneath the mixing chamber 290 to collect liquid waste from the mixing chamber 290 or other components of the system 100 or 200. Suitable materials for the waste bin 1210 may include stainless steel, high-density polyethylene (HDPE), polypropylene, or other corrosion-resistant plastics, which may provide durability, chemical resistance, and ease of maintenance. The waste bin 1210 may include a cover 1212 with an opening 1215. The opening 1215 may be configured one or more of various features such as perforations, slots, a mesh screen, or the like, or a combination thereof. These features may allow liquid waste to pass through into the waste bin 1210 while preventing larger debris (e.g., debris whose dimensions exceed a threshold) from entering, thus ensuring efficient separation and collection of waste materials. Suitable materials for the cover 1212 may include stainless steel, plastic (e.g., polypropylene or polyethylene), aluminum, or the like, or an alloy thereof, or a combination thereof. Such materials may offer durability, resistance to corrosion, and ease of cleaning. The drainage tube 1225 may direct liquid waste away from the waste bin 1210 to, e.g., an external drainage system (e.g., a sink, a drain line, a sewer connection, a wastewater collection tank, etc.).

The waste bin 1210 may be configured to move between a first position (or referred to as an extended position, as illustrated in panels III and IV) and a second position (or referred to as a retracted position, as illustrated in panel II and V). The waste bin 1210 may be positioned in the second position when in non-draining mode (as illustrated as "turning off draining mode" in panel V), and moved from the second position (panel II) to the first position during draining mode (as illustrated in panels III and IV). The draining mode may include the period of active drainage (panel IV), and also the transition time before the drainage starts during which the waste bin 1210 moves from the second position to the first position (panels II and III) and after the drainage finishes during which the waste bin 1210 moves from the first position (panel IV) to the second position (panel V). The waste bin 1210 may be coupled to an actuator 1214 configured to drive this movement. The operation of the actuator 1214 may be controlled by a controller or control circuit 1218.

The drainage assembly 195 may include a stage 1217 configured to support the waste bin 1210 at its second (e.g., retracted) position. The stage 1217 may have an aperture through which the drainage tube 1225 may extend. The aperture may be elongated along the movement direction of the waste bin 1210 so that the stage 1217 does not interfere with the movement of the waste bin 1210 between the first position and the second position and/or the movement of the drainage tube 1225 along with the waste bin 1210. In some embodiments, the stage 1217 may be configured with features to facilitate the movement of the waste bin 1210 between the first position and the second position. For example, the bottom surface of the waste bin 1210 may include one or more mobility components (e.g., two rows of rollers or wheels); the opposing surface of the stage 1217 may include one or more complementary guide pathways (e.g., tracks, rails, etc.) to receive the mobility components, guiding the movement of the waste bin 1210. In some embodiments, the stage 1217 may provide support for the waste bin 1210 during at least part of its movement between the first position and the second position. For example, the coupling of the guide pathways and the mobility components may be configured to allow relative movement in a certain direction (e.g., linear movement between the first position and the second position), but not in another direction (e.g., tilt or rotation). When the waste bin 1210 is located between the first position and the second position and/or at the first position, the mobility components may remain coupled to the guide pathways on the stage 1217 so that the waste bin 1210 is supported by the stage 1217. In some embodiments, at its first (e.g., extended) position, the waste bin 1210 may be supported on a stage 1219 positioned underneath the mixing chamber 290. For example, the stage 1219 may serve as a platform where a container for receiving content discharged from the mixing chamber 290 can be placed or supported, such as a user cup, the waste bin 1210, etc. The stage 1219 may be at (substantially) the same level as the stage 1217, allowing the waste bin 1210 to move between them conveniently.

Panel I illustrates a partial schematic of the system 100 or 200 configured in accordance with embodiments of the present document, where the drainage assembly 195 as illustrated may be incorporated or coupled. Panel II illustrates the scenario in which the dispensing opening 292 of the mixing chamber 290 is blocked, preventing content from being dispensed. The waste bin 1210 is positioned in the retracted position. Panel III illustrates the scenario in which the dispensing opening 292 of the mixing chamber 290 is unblocked, allowing content to be dispensed from the dispensing opening 292. The waste bin 1210 is being moved toward the extended position by the actuator 1214. Panel IV illustrates the scenario in which content is being dispensed from the mixing chamber 290 via the dispensing opening 292. The dispensed content may be collected in the waste bin 1210 after passing through the cover 1212 and directed away from the waste bin 1210 via the drainage tube 1225. Panel V illustrates the scenario in which the dispensing opening 292 of the mixing chamber 290 is blocked again, preventing further dispensing of content. The waste bin 1210 may move back to the retracted position and remain in place until actuated.

This configuration of the drainage assembly 195 as illustrated in FIG. 12 may allow for a modular design, where the waste bin 1210 can be easily accessed, removed, or replaced, enhancing the system's overall flexibility and adaptability to different operational needs. The retracted position may allow the waste bin 1210 to be stored compactly when not in use, saving space within the system. The ability to retract the waste bin 1210 when not in use may reduce or minimize exposure to waste. In some embodiments, the system 100 or 200 may include a sensor or sensing circuit configured to detect the positioning of the waste bin 1210 and allow dispensing only when the system 100 or 200 determines that the waste bin 1210 is properly positioned, thereby avoiding spill accidents.

Figure 13:
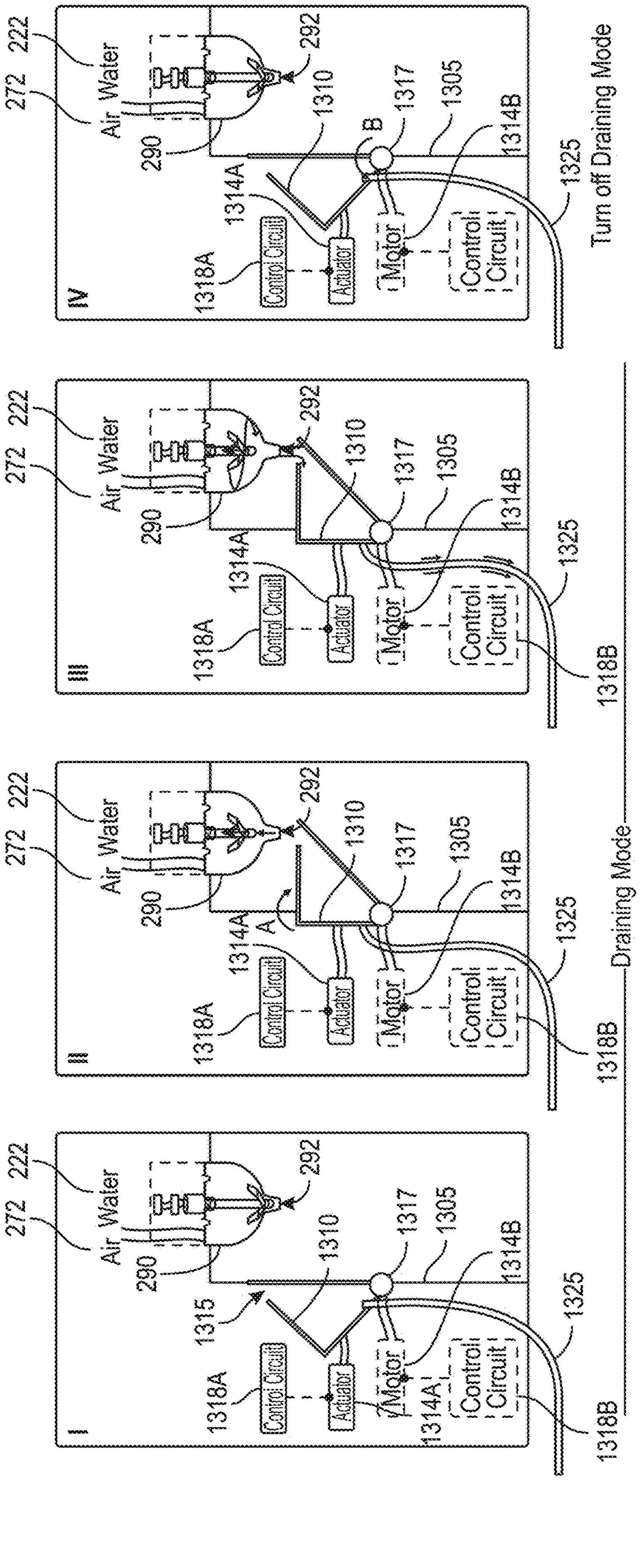

As illustrated in FIG. 13, the drainage assembly 195 of the system 100 or 200 may include a waste bin 1310 coupled to a drainage tube 1325. The waste bin 1310 may be positioned underneath the mixing chamber 290 to collect liquid waste from the mixing chamber 290 or other components of the system 100 or 200. Suitable materials for the waste bin 1310 may include stainless steel, high-density polyethylene (HDPE), polypropylene, or other corrosion-resistant plastics, which may provide durability, chemical resistance, and ease of maintenance. The waste bin 1310 may include an opening 1315. The opening 1315 may be configured with various features such as perforations, slots, a mesh screen, or the like, or a combination thereof. These features may allow liquid waste to pass through into the waste bin 1310 while preventing larger debris (e.g., debris whose dimensions exceed a threshold) from entering, thus ensuring efficient separation and collection of waste materials. The drainage tube 1325 may direct liquid waste away from the waste bin 1310 to, e.g., an external drainage system (e.g., a sink, a drain line, a sewer connection, a wastewater collection tank, etc.).

The waste bin 1310 may be configured to move between a first position (or referred to as an extended position, as illustrated in panels II and III) and a second position (or referred to as a retracted position, as illustrated in panels I and IV). The waste bin 1310 may be positioned in the second position when in non-draining mode (as illustrated as "turning off draining mode" in panel IV), and moved from the second position (panel I) to the first position during draining mode (as illustrated in panels II and III). The draining mode may include the period of active drainage (panel III), and also the transition time before the drainage starts during which the waste bin 1310 moves from the second position to the first position (panels I and II) and after the drainage finishes during which the waste bin 1310 moves from the first position to the second position (panel IV). The waste bin 1310 may be rotatably attached to a wall 1305 (e.g., part of the housing 105) via a rotatable connection 1317. Examples of the rotatable connection may include a hinge. The waste bin 1310 may be coupled to an actuator 1314A configured to drive this movement. The operation of the actuator 1314A may be controlled by a controller or control circuit 1318A. Additionally or alternatively, the rotational movement of the 1310 may be driven by a motor 1314B coupled to the rotation connection 1317. The operation of the actuator 1314B may be controlled by a controller or control circuit 1318B. The drainage tube 1325 may be located at or near a bottom portion of the waste bin 1310 in its first (e.g., retracted) position, facilitating (substantially) complete removal of liquid waste from the waste bin 1310.

Panel I illustrates the scenario in which the dispensing opening 292 of the mixing chamber 290 is blocked, preventing content from being dispensed. Panel II illustrates the scenario in which the dispensing opening 292 of the mixing chamber 290 is unblocked, allowing content to be dispensed from the dispensing opening 292. The waste bin 1310 is being moved toward the extended position by rotating in direction A. The rotation may be driven by the actuator 1314A and/or the motor 1314B. Panel III illustrates the scenario in which content is being dispensed from the mixing chamber 290 via the dispensing opening 292. The dispensed content may be collected in the waste bin 1310 after passing through the opening 1315 and directed away from the waste bin 1310 via the drainage tube 1325. Panel IV illustrates the scenario in which the dispensing opening 292 of the mixing chamber 290 is blocked again, preventing further dispensing of content. The waste bin 1310 may rotate back in the direction B (opposite to direction A in panel II) to the retracted position and remain in place until actuated.

This configuration of the drainage assembly 195 as illustrated in FIG. 13 may allow for a modular design, where the waste bin 1310 can be easily accessed, removed, or replaced, enhancing the system's overall flexibility and adaptability to different operational needs. The retracted position may allow the waste bin 1310 to be stored compactly when not in use, saving space within the system. The ability to retract the waste bin 1310 when not in use may reduce or minimize exposure to waste. In some embodiments, the system 100 or 200 may include a sensor or sensing circuit configured to detect the positioning of the waste bin 1310 and allow dispensing only when the system 100 or 200 determines that the waste bin 1310 is properly positioned, thereby avoiding spill accident.

Figure 14:
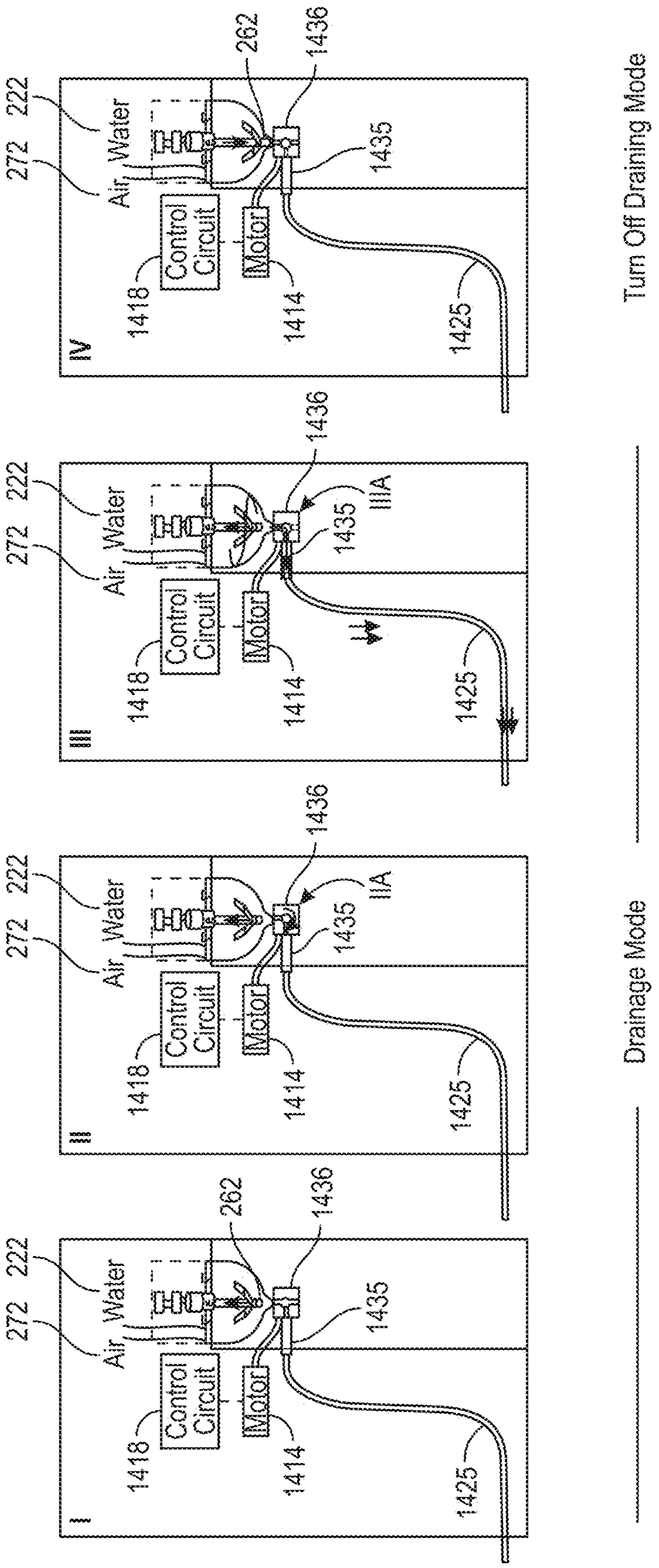

As illustrated in FIG. 14, the drainage assembly 195 of the system 100 or 200 may include a drainage tube 1425 and omit a waste bin. The drainage tube 1425 may be coupled to the dispensing opening 292 of the mixing chamber 290 via a connector 1435 and a three-way valve 1436. The connector 1435 may remain connected to the drainage tube 1425 and the three-way valve 1436. For example, the three-way valve 1436 may be a ball valve. The three-way valve 1436 may include an electrical or motorized valve controlled by a motor 1414. The operation of the motor 1414 may be controlled by a controller or control circuit 1418. The motor 1414 may cause the three-way valve 1436 to switch between a first configuration and a second configuration. Under the first configuration of the three-way valve 1436, a fluid pathway may be established between the mixing chamber 290 and the drainage tube 1425, allowing content dispensed from the mixing chamber 290 to be drained through the drainage tube 1425, as illustrated in panel III of FIG. 14 and discussed further below. Under the second configuration, the fluid pathway between the mixing chamber 290 and the drainage tube 1425 may be blocked, preventing content dispensed from the mixing chamber 290 to be drained through the drainage tube 1425, as illustrated in panels I and IV of FIG. 14 and discussed further below. Instead, content dispensed from the mixing chamber 290 may be received by a container (e.g., a user cup) properly positioned, e.g., underneath the dispensing opening 292.

Panel I illustrates the scenario in which the dispensing opening 292 of the mixing chamber 290 is unblocked while the three-way valve 1436 is at its second configuration so that the fluid pathway between the mixing chamber 290 and the drainage tube 1425 is blocked, preventing content dispensed from the mixing chamber 290 to be drained through the drainage tube 1425. Panel II illustrates the scenario in which the dispensing opening 292 of the mixing chamber 290 is unblocked while the three-way valve 1436 is being switched from its second configuration to its first configuration. This switch may be driven by the motor 1414 in response to a signal from the controller or control circuit 1418. Panel III illustrates the scenario in which the dispensing opening 292 of the mixing chamber 290 is unblocked and the three-way valve 1436 is at its first configuration so that content is being dispensed from the mixing chamber 290 via the dispensing opening 292. The dispensed content may be directed away via the drainage tube 1425. Panel IV illustrates the scenario in which the dispensing opening 292 of the mixing chamber 290 is blocked, preventing further dispensing of content.

When in non-draining mode (illustrated as "turning off draining mode" in panel IV), the three-way valve 1436 may be at its second configuration so that the fluid pathway between the mixing chamber 290 and the drainage tube 1425 is blocked. Conversely, during draining mode (as illustrated in panels I-III), the three-way valve 1436 may be switched to its first configuration to establish a fluid pathway between the mixing chamber 290 and the drainage tube 1425, or another route other than the drainage tube 1425 (e.g., a container temporarily positioned to received liquid waste). The draining mode may include the period of active drainage (panel III), and also the transition time before the drainage starts during which the three-way valve 1436 is being adjusted (panels I and II) and after the drainage finishes during which the three-way valve 1436 is being adjusted.

This configuration of the drainage assembly 195 as illustrated in FIG. 14 may obviate the need to include a waste bin, allowing for a simpler and more compact design. The mixing chamber 290 and the drainage tube 1425 may remain in place during both draining and non-draining modes, while the pathway between the mixing chamber 290 and the drainage tube 1525 is conveniently established or disrupted by adjusting the three-way valve 1436. In some embodiments, the system 100 or 200 may coordinate the dispensing process with the configuration of the three-way valve 1436, thereby avoiding spill accidents.

Figure 15:
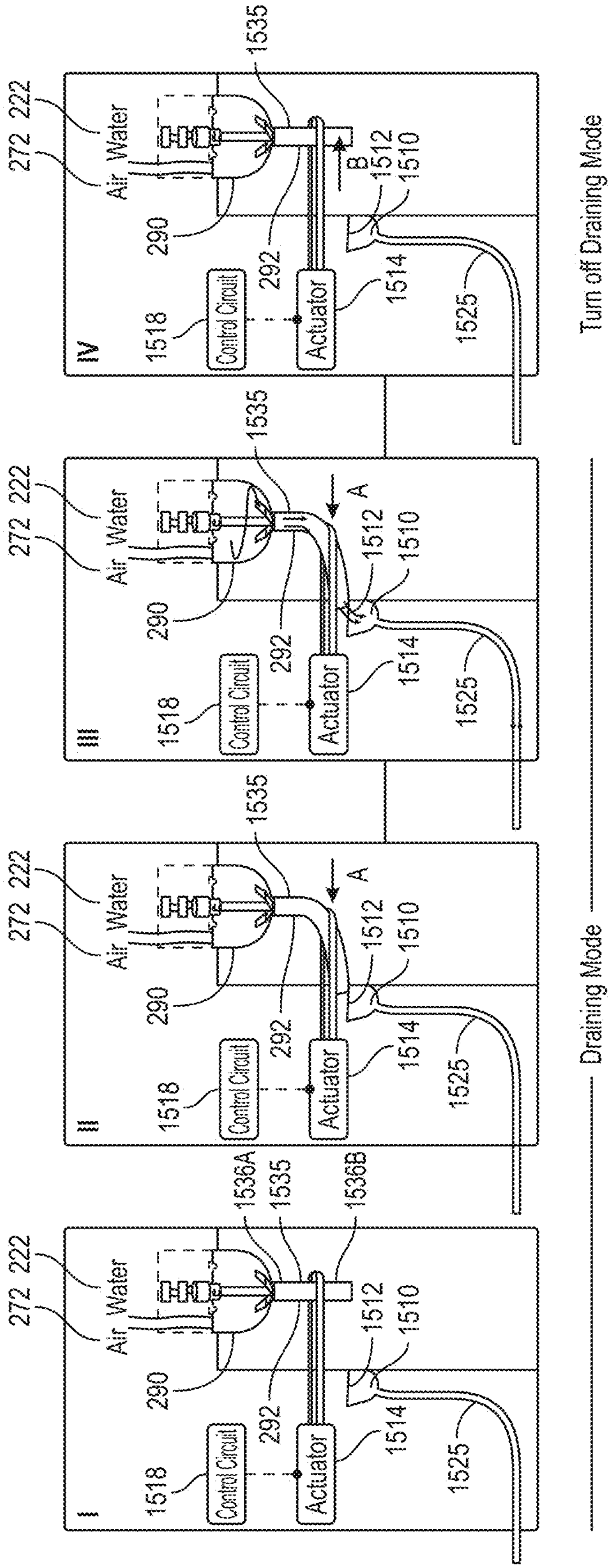

As illustrated in FIG. 15, the drainage assembly 195 of the system 100 or 200 may include a drainage tube 1525 and omit a waste bin. The drainage tube 1525 may be releasably coupled to the dispensing opening 292 of the mixing chamber 290 via a hose (or referred to as a connector) 1535. The hose 1535 may have openings 1536A and 1536B at two end portions. A first hose opening 1536A of the hose 1535 may remain in fluid communication with (e.g., coupled together, positioned underneath, etc.) the dispensing opening 292 of the mixing chamber 290. A second hose opening 1536B of the hose 1535 may be releasably coupled to the drainage tube 1525 via a transition chamber 1510 which has an opening 1512. At least a portion of the hose 1535 may be flexible. The second hose opening 1536B may be releasably coupled to the drainage tube 1525 when the hose 1535 is deflected so that the second hose opening 1536B is received by or otherwise in fluid communication with the transition chamber 1510 through its opening 1512, forming a pathway allowing liquid waste to drain from the mixing chamber 290 into the drainage tube 1525. The hose 1535 may be deflected by an actuator 1514. The actuator 1514 may cause the hose 1535 to deflect by exerting force thereon via, e.g., a band coupled to both the hose 1535 and the actuator 1514. The operation of the actuator 1514 may be controlled by a controller or control circuit 1518. When the hose 1535 is not (sufficiently) deflected, the second hose opening may be not coupled to the transition chamber 1510; instead, content dispensed from the mixing chamber 290 may be received by a container (e.g., a user cup) properly positioned (e.g., positioned underneath the dispensing opening 292).

In some embodiments, the hose 1535 may be rigid but include at least two sections movably connected (e.g., via a hinge connection). The hose 1535 may have a first section coupled to the mixing chamber 290 at the dispensing opening 292, and a second section that may be coupled to the drainage tube 1525. The hose 1535 may be releasably coupled to the drainage tube 1525 by changing the relative position of the at least two sections. For example, when the at least two sections substantially align along the vertical direction (e.g., along the rotation axis Z of the mixing chamber 290), the hose 1535 may be not coupled to the drainage tube 1525; when the at least two sections are positioned at an angle so that the second hose opening 1536B is received by the transition chamber 1510 via its opening 1512, the hose 1535 becomes coupled to the drainage tube 1525, thereby directing content dispensed from the mixing chamber to the drainage tube 1525.

Panel I illustrates the scenario in which the hose 1535 is not coupled to the mixing chamber 290, preventing content dispensed from the mixing chamber 290 to be drained through the drainage tube 1525. Panel II illustrates the scenario in which the hose 1535 is being deflected. This deflection may be driven by the actuator 1514 in response to a signal from the controller or control circuit 1518. Panel III illustrates the scenario in which the dispensing opening 292 of the mixing chamber 290 is unblocked and the hose 1535 is coupled to the drainage tube 1525 so that content dispensed from the mixing chamber 290 is directed away via the drainage tube 1525. Panel IV illustrates the scenario in which the hose 1535 is released from deflection, disrupting the coupling between the hose 1535 and the drainage tube 1525, preventing drainage of content dispensed from the mixing chamber 290.

When in non-draining mode (illustrated as "turning off draining mode" in panel IV), the hose 1535 may not be (sufficiently) deflected and, therefore, not coupled to the drainage tube 1525. Conversely, during draining mode (as illustrated in panels I-III), the hose 1535 may be sufficiently deflected to be releasably coupled to the drainage tube 1525 to establish a pathway between the mixing chamber 290 and the drainage tube 1525. The draining mode may include the period of active drainage (panel III), and also the transition time before the drainage starts during which the hose 1535 is being deflected (panels I and II) and after the drainage finishes during which the hose 1535 is being released from deflection. The mixing chamber 290 and the drainage tube 1525 remain in place during both draining and non-draining modes, while the pathway between the mixing chamber 290 and the drainage tube 1525 is established or disrupted by deflecting (or otherwise adjusting) the hose 1535. This configuration may allow for efficient switching between draining and non-draining modes, reducing or minimizing the risk of leaks. The ability to maintain the positions of the mixing chamber 290 and drainage tube 1525 may enhance the system's reliability and reduce wear on components, contributing to longer system longevity and lower maintenance needs.

Figure 16A:
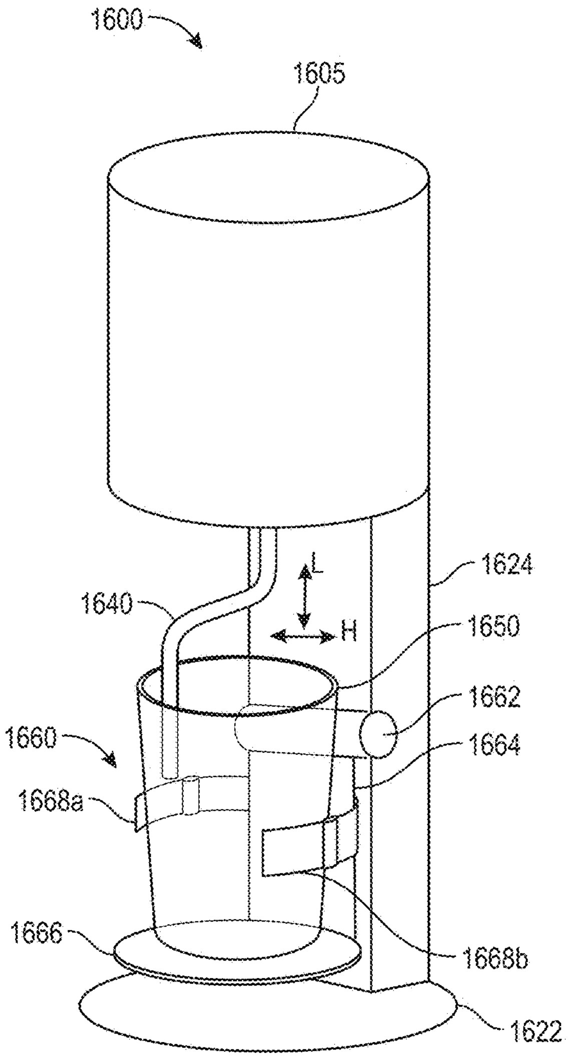
FIG. 16A is a partial schematic illustration of a beverage system configured in accordance with embodiments of the present technology.

FIG. 16A is a partially schematic illustration of a beverage system 1600 ("the system 1600") configured in accordance with embodiments of the present technology. The system 1600 may be an exemplary implementation of the system 100 or 200. The system 1600 can include a housing 1605, a base 1622, and a stem 1624 extending therebetween. At least a portion of the fluid feeder 120, the ingredient feeder 130, the cleaning solution feeder 140, the mixer 150, the dispenser 160, the pressurized gas assembly 170, the heater 180, and/or the mixing chamber 190 or 290 may be accommodated within the housing 1620. The system 1600 may include a cup support 1660 coupled to the stem 1624. As illustrated, the system 1600 may include a dispensing tube 1640 coupled to the mixing chamber 190 or 290 to direct content exiting the mixing chamber 190 or 290 to a container, e.g., a user cup. The cup support 1660 may be configured to support a user cup (or cup for brevity) 1650 and/or position the cup 1650 to receive content from the mixing chamber 190 via the dispensing tube 1640.

Figure 16B:
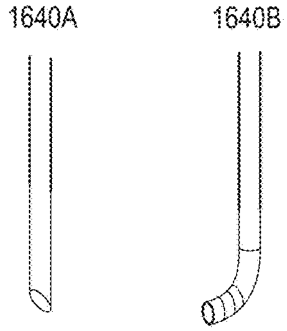
FIG. 16B is a schematic illustration of a dispensing tube configured in accordance with embodiments of the present technology.

As illustrated in FIG. 16A, the dispensing tube 1640 may bend to reach down along an inner sidewall of the cup 1650. The dispensing tube 1640 may have a different shape than illustrated in FIG. 16A. FIG. 16B illustrates exemplary embodiments of the dispensing tube 1640 including, e.g., a straight tube 1640A, a straight tube with a bent tip portion 1640B. In some embodiments, the dispensing tube 1640 may be detachably coupled to the mixing chamber 190 or 290 at the dispensing opening 292. For example, an end portion of the dispensing tube 1640 may be connected to the dispensing opening 292 either on the inner side or on the exterior of the dispensing opening 292. The connection may be achieved by snug fitting by friction, a threaded connection, magnetic force, or the like, or a combination thereof. In some embodiments, the dispensing tube 1640 may extend or retract along the length direction L. The L direction may substantially coincide with the rotation axis Z of the mixing chamber 190 or 290. The dispensing tube 1640 may be rigid or deformable. The extension, retraction, and/or deformation of the dispensing tube 1640 may adjust the distance between an outlet of the dispensing tube 1640 and a landing point in the cup 1650 where content exiting the outlet of the dispensing tube 1640 lands.

The cup support 1660 can include a platform 1666 on which the cup 1650 can sit, a latch 1662 coupled to the stem 1624, a lever arm 1664 extending therebetween, and first and second arms 1668*a*, 1668*b* extending from either side of the lever arm 1664. As shown, the first and second arms 1668*a*, 1668*b* can have curvatures to generally extend around the sidewall of (or circumferentially wrap around) the cup 1650, preventing the cup 1650 from falling out during operation of the system 1600. In some embodiments, the first and second arms 1668*a*, 1668*b* may be elastic such that the cup 1650 can be pushed sideways between the first and second arms 1668*a*, 1668*b* and onto the platform 1666.

A portion of the cup support 1660 (e.g., the platform 1666) may be configured to move along at least one direction to position the cup 1650 relative to the dispensing tube 1640 to achieve a desired dispensing mode for producing a beverage, or a portion thereof, as described elsewhere in the present document. For example, the platform 1666 may be configured to move along the direction L to adjust the distance between an outlet of the dispensing tube 1640 and the cup 1650, e.g., a landing point in the cup 1650 where content exiting the outlet of the dispensing tube 1640 lands. As another example, the platform 1666 may be configured to move in one or more direction in a plane (substantially) perpendicular to the direction L, e.g., along a transverse direction H, or rotate with respect to the direction L. As a still further example, the platform 1666 may be configured to rotate about the latch 1662.

Figure 16C:
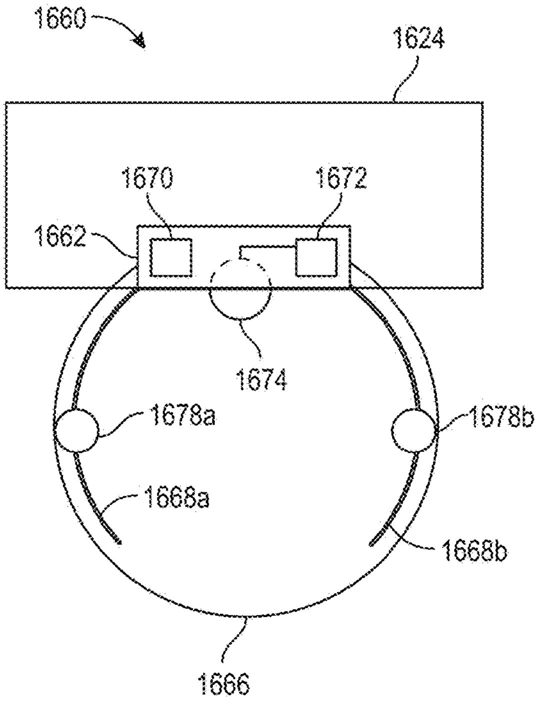
FIG. 16C is a partial schematic showing a top, cutaway view of the beverage system from FIG. 16A.

FIG. 16C is a partially schematic showing a top, cutaway view of the system 1600, particularly illustrating select components of the cup support 1660. As shown, the cup support 1660 can further include a first motor 1670 operably coupled to the latch 1662, a first roller 1674, a second motor 1672 operably coupled to the first roller 1674, and second and third rollers 1678*a*, 1678*b*. The first roller 1674 can be coupled to the lever arm 1664 and exposed such as to contact the cup 1650. The second and third rollers 1678*a*, 1678*b* can be coupled to the first and second arms 1668*a*, 1668*b*, respectively, and also exposed such as to contact the cup 1650. As discussed further below with reference to FIGS. 17A-17C, the first motor 1670 can rotate the latch 1662 (and thus the rest of the cup support 1660) relative to the stem 1624, the second motor 1672 can rotate the first roller 1674, and the second and third rollers 1678*a*, 1678*b* may be not motorized. In some embodiments, the second and third rollers 1678*a*, 1678*b* may be freely rotatable yet biased (e.g., via springs) to allow rotation of the cup 1650 (e.g., when a rotating force is applied thereon) and return the cup 1650 to the unbiased orientation (e.g., when the rotating force is ceased.

Figure 17A:
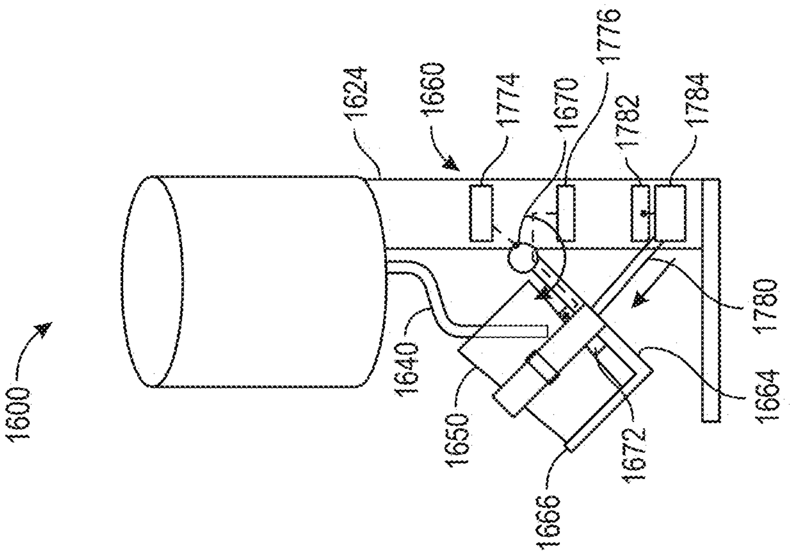
FIGS. 17A-17C illustrate operations of the beverage system illustrated in FIG. 16A according to some embodiments of the present technology.
Figure 17B:
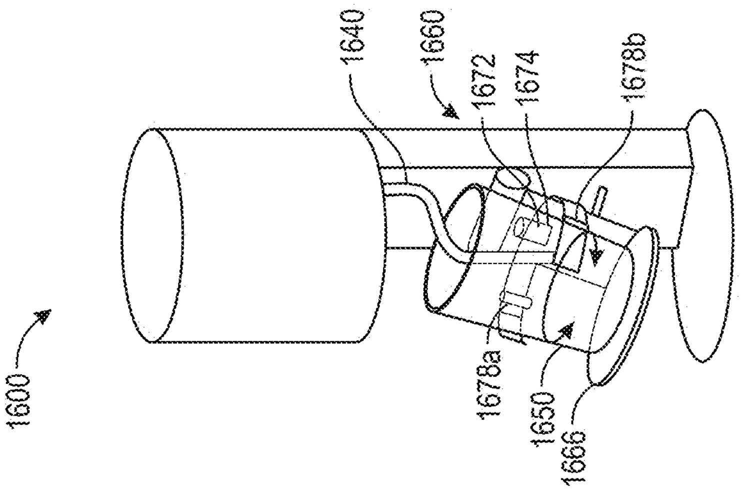
Figure 17C:
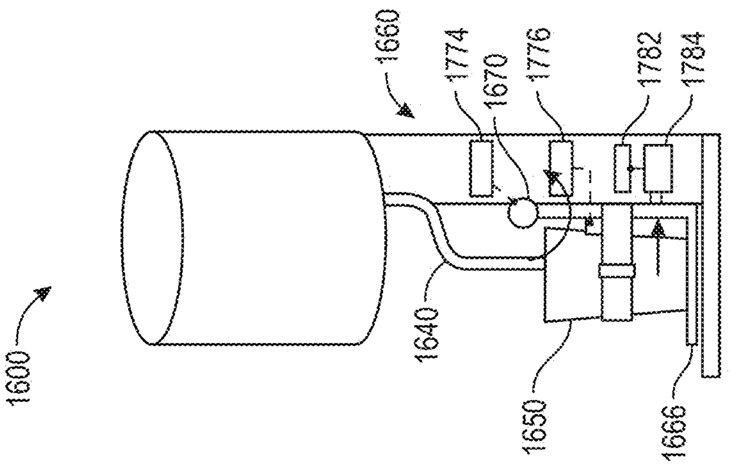

FIGS. 17A-17C illustrate exemplary operations of the system 1600. Referring first to FIG. 17A, the cup support 1660 can further include a first controller 1774 operably coupled to the first motor 1670, a second controller 1776 operably coupled to the second motor 1672, an actuator 1784, and a third controller 1782 operably coupled to the actuator 1784. One or more of the aforementioned components can be housed within the stem 1624 (as schematically shown) or elsewhere in the system 1600). In operation, the first controller 1774 can control the first motor 1670 to rotate the platform 1666 about the latch 1662 and away from the stem 1624. The third controller 1782 can control the actuator 1784 to extend a strut 1780 that extends between the stem 1624 and the lever arm 1664. The actuator 1784 and the strut 1780 can facilitate rotation of the platform 1666, and thus the cup 1650, by reducing the mechanical load on the first motor 1670. As the platform 1666 rotates, the cup 1650 may be repositioned and reoriented relative to the dispensing tube 1640 such that the outlet of the dispensing tube 1640 is adjacent to a different portion of the inner surface of the cup 1650.

Referring next to FIG. 17B, the second controller 1776 can control the second motor 1672 to rotate the first roller 1674, which contacts the cup 1650. The first roller 1674 can include a relatively high-friction material (e.g., rubber) such that rotation of the first roller 1674 in turn rotates the cup 1650 about its central axis. As aforementioned, the second and third rollers 1678*a*, 1678*b* can freely rotate such that only the first roller 1674 drives rotation of the cup 1650. The second and third rollers 1678*a*, 1678*b* can contact the cup 1650 to secure the cup 1650 within the first and second arms 1668*a*, 1668*b*. Once the second motor 1672 stops, the second and third rollers 1678*a*, 1678*b*, which may be biased, can return the cup 1650 to its unbiased orientation. As the cup 1650 rotates along the first, second, and third rollers 1674, 1678*a*, 1678*b*, the cup 1650 may be reoriented relative to the dispensing tube 1640 such that the outlet of the dispensing tube 1640 is adjacent a different portion of the inner surface of the cup 1650. The motions described with reference to FIGS. 17A and 17B can be combined to achieve a desired dispensing mode. In some cases, the rotation of the cup 1650 may occur when the platform is tilted or not.

Referring next to FIGS. 17C, once dispensing into the cup 1650 is completed, the first controller 1774 can control the first motor 1670 to rotate the platform 1666 about the latch 1662 and back towards from the stem 1624. The third controller 1782 can control the actuator 1784 to retract the strut 1780. As aforementioned, the actuator 1784 and the strut 1780 can facilitate rotation of the platform 1666, and thus the cup 1650, by reducing the mechanical load on the first motor 1670. The platform 1666 may return to its original position (e.g., a vertical position).

The system 1600 may be configured to achieve a desired dispensing mode by properly positioning the cup 1650 relative to the dispensing tube 1640. The relative position may be achieved by moving the cup 1650, moving the dispensing tube 1640, or a combination thereof.

C. Methods of Preparing Beverages

Figure 18:
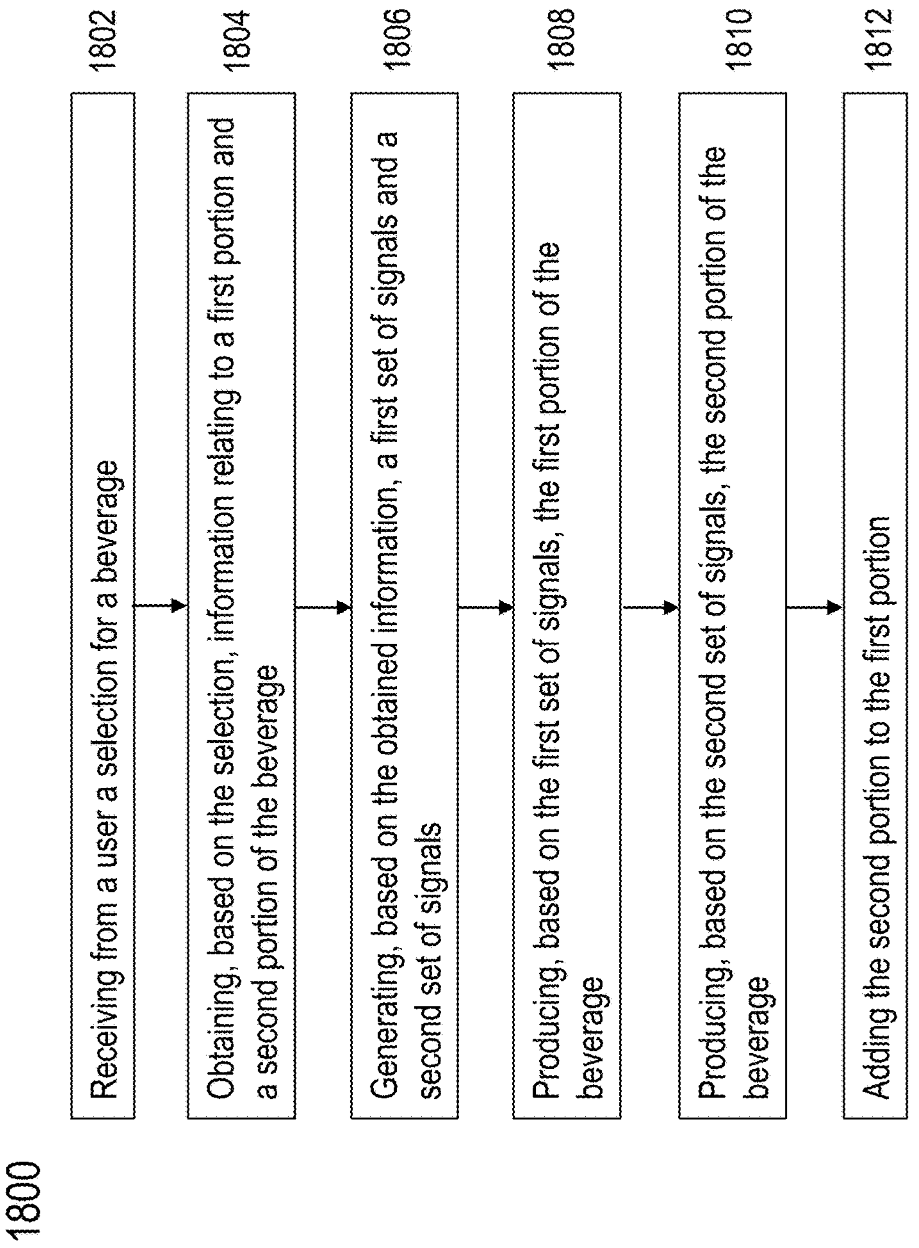
FIGS. 18-26 show beverage preparation processes according to some embodiments of the present technology.

FIG. 18 is a flowchart illustrating a multi-stage process 1800 for preparing a beverage in accordance with embodiments of the present technology. While the steps of the process 1800 are described in a particular order herein, one or more of the steps can be performed in a different order or can be omitted, and the process 1800 can include additional steps.

The process 1800 can begin at block 1802 by receiving from a user a selection for a beverage. The system 100 or 200 may provide options for user selection. Options may include, e.g., shaken drinks, layered drinks, liquid dispensing for smoothies, etc. The system 100 or 200 may dynamically adjust beverage options available for selection based on factors such as the ingredients available or the operational condition of the system 100 or 200. For example, the system 100 or 200 may determine whether the option of a hot beverage is available for selection based on whether the heating element 282 is functioning.

The system 100 or 200 may provide or be connected to a user interface configured to present information (e.g., various beverage options) and receive user input (e.g., user selection of a beverage option). In some embodiments, the system 100 or 200 may include or be in communication with a touchscreen or a display that is coupled with an input device, where the user interface is implemented. In some embodiments, the user interface may be implemented on a webpage or as an application on a user device in communication with the system 100 or 200. For example, a user may access the webpage by inputting the website address or scanning a machine-readable code using a user device. A user can make a selection by interacting with the user interface.

At block 1804, the process 1800 may continue by obtaining, based on the selection, information relating to a first portion and a second portion of the beverage. For example, based on a user selection of a beverage to be produced, the system 100 or 200 may obtain, based on the beverage selection, a recipe for the beverage.

In some embodiments, the portion information may be part of the recipe. For example, the recipe may include information on the respective amounts of the fluid and at least one target ingredient in respective portions. In some embodiments, the recipe may specify respective amounts of the fluid and at least one target ingredient for the entire beverage but lack the portion information; the system 100 or 200 may determine, based on the recipe, portion information for a first portion and a second portion of the beverage. For example, the system 100 or 200 may determine, based on the recipe, how to divide the amount of the fluid and the amount of at least one target ingredient into portions. As another example, the system 100 or 200 may determine the order of producing and/or dispensing the portions. In some embodiments, different portions of a beverage may be prepared based on different recipes. For example, the first portion may be prepared based on a first recipe, and the second portion may be prepared based on a second recipe that is different from the first recipe.

The portion information may include that the first portion may include a first amount of a first fluid and a first amount of a first target ingredient, and the second portion may include a second amount of a second fluid and a second amount of a second target ingredient. The first fluid and the second fluid may be the same or different. For example, the first fluid may be water, and the second fluid may be sparkling water. Different fluids may be fed through different fluid feeders 120 (e.g., fluid feeders 120A and 120B as illustrated in FIG. 1). For convenient illustration, the following description is provided with reference to the exemplary scenarios in which the first fluid and the second fluid are the same type of fluid, e.g., water, and refers to both as fluid for brevity. The first amount and the second amount of the fluid may be the same or different.

The first target ingredient in the first portion and the second target ingredient in the second portion may be of the same type or different types, and/or may be present in the same amount or different amounts. For example, the first portion and the second portion may include the same type(s) and/or amount(s) of target ingredient(s). See, e.g., FIG. 19 and relevant description thereof. As another example, the second portion may have the same type(s) of target ingredient(s) as the first portion but in different amount(s). As a further example, the first portion may include at least one target ingredient not in the second portion, or omit at least one target ingredient included in the second portion.

The first and second portions may differ in one or more different properties including, e.g., viscosity, density, color, opacity, etc. For example, the first portion may have a first viscosity, and the second portion may have a second viscosity that is different from the first viscosity. The property differences may be due, at least in part, to variations in the type and/or amount of the first and second target ingredients. As used herein, the viscosity of a portion (e.g., the first portion, the second portion) may be described as high or low by comparison to a threshold viscosity or a reference viscosity. For example, the reference viscosity may be that of water at a specific temperature (e.g., room temperature, the temperature at which the portion is produced or dispensed, etc.). The threshold viscosity may be set relative to the reference viscosity, e.g., 20% or 10% above it. A portion may be referred to as having a high viscosity if its viscosity exceeds the threshold viscosity. A portion may be referred to as having a low viscosity if its viscosity is below the threshold viscosity. In some embodiments, both the first portion and the second portion may have low viscosities or high viscosities. In some embodiments, one of the first portion and the second portion may have a high viscosity, while the other has a low viscosity. As used herein, a portion characterized as having low viscosity may also be referred to as thin. As used herein, a portion characterized as having high viscosity may also be referred to as thick.

The portion information may include an order in which the first portion and the second portion are produced and/or dispensed into a container (e.g., a user cup). For example, the portion information may specify that the second portion may be produced and/or dispensed into a container (e.g., a user cup) after the first portion. The order may affect the mixing of the first portion and the second portion after being dispensed into a container, e.g., a user cup, which in turn may affect one or more attributes of the beverage including, e.g., taste, appearance, or the like, or a combination thereof.

At block 1806, the process 1800 may continue by generating, based on the obtained information, a first set of signals and a second set of signals. The first set of signals may relate to the first portion, and the second set of signals may relate to the second portion. The first set of signals may include a first fluid signal, a first ingredient signal, a first mixing signal, and/or a first dispensing signal. The second set of signals may include a second fluid signal, a second ingredient signal, a second mixing signal, and/or a second dispensing signal.

A fluid signal (e.g., the first fluid signal of the first set of signals, the second fluid signal of the second set of signals) may be configured to cause the fluid feeder 120 to discharge a specific amount (e.g., the first amount, the second amount) of the fluid into the mixing chamber 190 or 290. For example, a fluid signal may include a signal for the pump 224 and/or a signal for the valve 226, causing a specified amount of the fluid (e.g., water from the water source 222) to be discharged with one or more desired parameters into the mixing chamber 190 or 290 via, e.g., the fluid channel 221 and/or the spray rim 429. Examples of relevant parameters may include pressure, a flow rate, or the like, or a combination thereof. Merely by way of example, the specified amount of the fluid may be discharged into the mixing chamber 190 or 290 with a pressure to facilitate mixing with other content (one or more target ingredients) in the mixing chamber 190 or 290.

In some embodiments, a fluid signal of a set of signals may relate to an amount setting. In some cases, a user may select a beverage with ice. The amount of ice added to a user cup may determine or relate to the remaining capacity of the user cap to hold the beverage produced by the system 100 or 200. If a user adds more ice than intended or desired, a full amount of fluid and/or at least one target ingredient specified in a recipe may exceed the remaining capacity of the user cup and may cause overflow. To address this and other issues, the system 100 or 200 may provide two fluid amount settings, a preset fluid amount and a user-defined fluid amount. The preset fluid amount setting may be suitable for a staff-serve scenario when the beverage is served by a trained employee. The employee may have the knowledge or skill to control the ice amount, avoiding overflow issues; thus, the fluid amount specified by the recipe may be used under the preset setting. The user-defined fluid amount setting may be suitable when a user is operating the system 100 or 200 to produce the beverage. For example, the system 100 or 200 may allow a user to control the fluid amount by interacting with the system 100 or 200 substantially in real time. Merely by way of example, a user may press and hold a button to allow the system 100 or 200 to obtain fluid and proceed with the beverage production. When the user releases the button (e.g., when the user observes that the cup is almost full), the system 100 or 200 may stop receiving additional fluid. Accordingly, when the user presses the button, the system may produce and dispense content at a desired composition or ingredient-fluid ratio per portion into the cup; when the user releases the button, the system may finish the last portion and perform cleaning as the ending process.

An ingredient signal (e.g., the first ingredient signal of the first set of signals, the second ingredient signal of the second set of signals) may be configured to cause the ingredient feeder 130 to discharge a specific amount (e.g., the first amount) of a target ingredient (e.g., the first target ingredient, the second target ingredient) into the mixing chamber 190 or 290. The ingredient signal may include signals for operating components involved in discharging a target ingredient. For example, the ingredient signal may include a signal for the pump 234 and/or a signal for the valve 236, causing the specified amount of a target ingredient (e.g., an ingredient from an ingredient source 232) to be discharged with one or more desired parameters into the mixing chamber 190 or 290 via, e.g., the ingredient nozzle 239. Examples of relevant parameters may include flow rate, pressure, temperature, or a combination thereof. For instance, the specified amount of the target ingredient may be discharged into the mixing chamber 190 or 290 with a controlled flow rate to facilitate mixing with other content in the mixing chamber 190 or 290.

A mixing signal (e.g., the first mixing signal of the first set of signals, the second mixing signal of the second set of signals) may be configured to cause the mixer 150 to mix the fluid and at least one target ingredient in the mixing chamber 190 or 290. The mixing signal may be configured to cause the mixer 150 to operate with one or more desired parameters to mix the content in the mixing chamber 190 or 290. Examples of relevant parameters may include duration, rotation speed, vibration intensity, and mode of motion (e.g., uniform vibration, oscillatory motion, pulsating motion, etc.). In some embodiments, if the first and second portions differ in one or more properties, the first mixing signal and the second mixing signal may be configured to cause the mixer 150 to operate with different parameters for mixing the first portion and the second portion. For example, the viscosity of the first portion may be higher than the viscosity of the second portion; the mixer 150 may mix, based on the first mixing signal, the first portion with higher power, or for a longer duration than the second portion, or both, than the second portion.

A dispensing signal (e.g., the first dispensing signal of the first set of signals, the second dispensing signal of the second set of signals) may be configured to cause the dispenser 160 to allow at least some of the content (e.g., a mixture of the fluid and the first target ingredient of the first portion, a mixture of the fluid and the second target ingredient of the second portion) in the mixing chamber 190 or 290 to be dispensed from the mixing chamber 190 or 290. For example, the dispensing signal may be configured to cause the actuator 264 to move the plug 262 away from the dispensing opening 292 of the mixing chamber 290, thereby increasing the portion of the dispensing opening 292 available for content to pass through and exit the mixing chamber 290. In some embodiments, if the first and second portions differ in one or more properties, the first dispensing signal and the second dispensing signal may be configured to cause the dispenser 160 to operate with different parameters for dispensing the first portion and the second portion. For example, the viscosity of the first portion may be higher than the viscosity of the second portion, resulting in a lower flow rate for the first portion; based on the first dispensing signal, the dispenser 160 may keep the dispensing opening 292 open for a longer duration for the first portion than for the second if their volumes are comparable or (substantially) the same. Additionally or alternatively, the first set of signals may include a pressurized air signal configured to activate the air pump 274, generating pressurized air to be delivered to the mixing chamber 190 or 290 to facilitate the dispensing of the first portion.

In some embodiments, the system 100 or 200 may include one or more features to achieve a desired dispensing mode by properly positioning a user cup relative to an outlet through which content from the mixing chamber 190 or 290 is discharged. The outlet may be the dispensing opening 292 of the mixing chamber 190 or 290, or an outlet of a dispensing tube 1640 coupled to the mixing chamber 190 or 290. For example, the system 100 or 200 may include a moveable cup support 1660 (as illustrated in FIG. 16A) for adjustably positioning a user cup. Additionally or alternatively, the mixing chamber 190 or 290 may be moveable, or coupled to the dispensing tube 1640 that is adjustable, e.g., by extending, retracting, and/or deformation, to adjust the position of the outlet of the dispensing tube 1640 relative to the user cup. By adjusting the cup support 1660, the mixing chamber 190 or 290, and/or the dispensing tube 1640, the user cup may be specifically positioned relative to the dispensing opening 292 or the outlet of the dispensing tube 1640 to facilitate or achieve a desired dispensing mode. Examples of dispensing modes may include dispensing to a center area of the user cup, to an off-center area of the user cup, to a sidewall of the user cup, from a desired distance above the user cup, or the like, or a combination thereof. The relative position may remain constant or change during a portion production. For example, the cup support 1660 and the dispensing tube 1640 may remain stationary such that content is dispensed to a (substantially) same center area of the user cup in a portion production. As another example, the cup support 1660 and/or the dispensing tube 1640 may move such that content is dispensed to various parts of the user cup (e.g., various parts on the inner sidewall of the user cup) in a portion production. In this connection, a set of signals (e.g., the first set, the second set) may include signals for positioning or moving the cup support 1660, the mixing chamber 190 or 290, and/or the dispensing tube 1640, to achieve a desired dispensing mode. The dispensing mode of the first portion may be the same as or different from the dispensing mode of the second portion.

At block 1808, the process 1800 may continue by producing, based on the first set of signals, the first portion of the beverage. At block 1810, the process 1800 may continue by producing, based on the second set of signals, the second portion of the beverage. At block 1812, the process 1800 may continue by adding the second portion to the first portion, or a mixture including the first portion, thereby producing the beverage by multi-stage preparation.

In some embodiments, at least one of the first portion or the second portion may include a third amount of a third target ingredient; the ingredient signal of the corresponding set of signals may be configured to cause the ingredient feeder 130 to discharge the third amount of the third target ingredient into the mixing chamber 190 or 290 before or after the mixing based on the mixing signal of the corresponding set of signals begins.

In some embodiments, the process 1800 may include generating, based on the obtained information, a third set of signals; and producing, based on the third set of signals, a third portion of the beverage before or after producing the second portion. The third portion may include the same types and/or amounts of components (e.g., the fluid, the first target ingredient, the second target ingredient) as the first portion or the second portion. One or more of the operations illustrated in blocks 1808, 1810, and/or 1812 may be repeated for the third portion. For example, the third portion may include only the fluid and no target ingredient; the third portion may be produced after the production of the first portion and the second portion and serve as a cleaning portion to clean at least part of the system 100 or 200 (e.g., the mixing chamber 190 or 290, the mixer 150, the dispenser 160, etc.). In some embodiments, the third amount of the fluid may be part of the recipe for the beverage, and after cleaning the used third portion may be added to the first portion and the second portion, becoming part of the beverage produced. In some embodiments, after cleaning the third amount may be discarded. The cleaning portion may reduce or eliminate the need to run a separate cleaning cycle (and the associated water consumption and time) between consecutive beverage productions, thereby improving the efficiency of the beverage production, and reduce the risk of contamination between beverages. In some embodiments, the third portion may include a third amount of a third fluid different from the first portion or the second portion. The third fluid signal may be configured to cause the fluid feeder 120 (or from a different fluid source) to feed the third fluid into the mixing chamber 190 or 290. In some embodiments, the third portion may be discharged into the user cup directly without passing through the mixing chamber 190 or 290.

In some embodiments, the operations relating to one portion may partially overlap with operations relating to a subsequent portion. For example, the dispensing from the mixing chamber 190 or 290 relating to one portion may partially overlap with the mixing in the mixing chamber 190 or 290 relating to the immediately subsequent portion, as described elsewhere in the present document. See, e.g., FIG. 19 and relevant description thereof.

In some embodiments, the process 1800 may include or omit one or more operations discussed above. For example, the process 1800 may include generating a pressurized air signal configured to cause the air pump 274 to generate pressurized air and deliver the pressurized air to one or more components of the system 100 or 200. As an illustration, the process 1800 may include delivering pressurized air to the mixing chamber via, e.g., the spray rim 429 (without being mixed with water) to facilitate the dispensing of content (e.g., a mixture of water and one or more target ingredients with high viscosity) from the mixing chamber 190 or 290. As another illustration, the process 1800 may include delivering pressurized air to the spray rim 429 to be mixed with and pressure water before being discharged into the mixing chamber 190 or 290 as part of a cleaning process. As another example, the process 1800 may include generating a cleaning solution signal configured to cause the cleaning solution feeder 140 to discharge one or more cleaning solutions and performing a cleaning process using the one or more cleaning solutions. As a further example, the process 1800 may include generating a drainage instruction configured to cause the drainage assembly 195 to drain liquid waste. As still a further example, the process 1800 may include extracting air from the mixing chamber 190 or 290 before the fluid and/or one or more target ingredient are added (e.g., before 1808 and/or 1810). As an illustration, when the dispenser 160 (e.g., the plug 262 as illustrated in FIG. 2A) seals or blocks the dispensing opening 292 of the mixing chamber 290, the mixing chamber 290 between the nozzle plate 237 and the (now sealed or blocked) dispensing opening 292 may become (sufficiently) air-tight; through an opening on the nozzle plate 237, a vacuum system or assembly including a gas pump (e.g., the air pressure pump 274 or a different pump) may extract air from the mixing chamber 190 before ingredient(s) and/or fluid are added and/or mixed. This air extraction process may continue for a certain period (e.g., 10, 20, or 30 seconds) and/or until the air pressure in the mixing chamber 190 reaches a specified level. Reducing or minimizing air in the mixing chamber 190 during the mixing operation may slow down ingredient oxidation and/or reduce foam generation (e.g., when mixing a dairy product), thereby improving the quality of the produced beverage and/or simplifying the cleaning process. As a still further example, the process 1800 may omit either a first mixing signal of the first set of signals, the second mixing signal of the second set of signals, or both, which may result in the mixer 150 not performing a mixing operation during the production of the first portion in 1808, the second portion in 1810, or both. Examples of scenarios when the omission may be suitable may include when the applicable target ingredient (e.g., the first target ingredient, the second target ingredient) is highly soluble in the fluid, when it is desirable to avoid or limit mixing between the fluid and the applicable target ingredient in the mixing chamber 190 or 290 (e.g., before the dispensing of a mixture of the fluid and the applicable target ingredient from the mixing chamber 190 or 290), etc. As used herein, an ingredient being highly soluble in the fluid may indicate that the time for the applicable target ingredient to dissolve in the fluid (referred to as a "dissolve time") is short compared to the time between (a) the dispensing of the applicable target ingredient into the mixing chamber 190 or 290 and (b) the dispensing of the mixture of the applicable target ingredient and the fluid from the mixing chamber 190 or 290 (referred to as a "chamber time"). As used herein, the "dissolve time" being "short" compared to the "chamber time" may indicate that the "dissolve time" is no more than 80%, 60%, 50%, 40%, 30%, 20%, or 10% of the "chamber time."

In some embodiments, a beverage may be produced by combining contents made based on two recipes in multiple stages. The beverage may be a layered drink. For example, the content corresponding to a first recipe may be produced in one or more portions by performing at least part of the process 1800 and dispensed into a user cup, and then content corresponding to a second recipe may be produced in one or more portions by performing at least part of the process 1800 and dispensed into the same user cup. Optionally, cleaning may be performed using water designated as a cleaning portion as a last portion of the first recipe and the used cleaning portion may be dispensed into the user cup. Alternatively, cleaning may be performed between the production based on the first recipe and the production based on the second recipe using water which is not part of the first recipe and the used cleaning portion may be added to the user cup or discarded. In some cases, no cleaning is performed between the production based on the first recipe and the production based on the second recipe.

Figure 19:
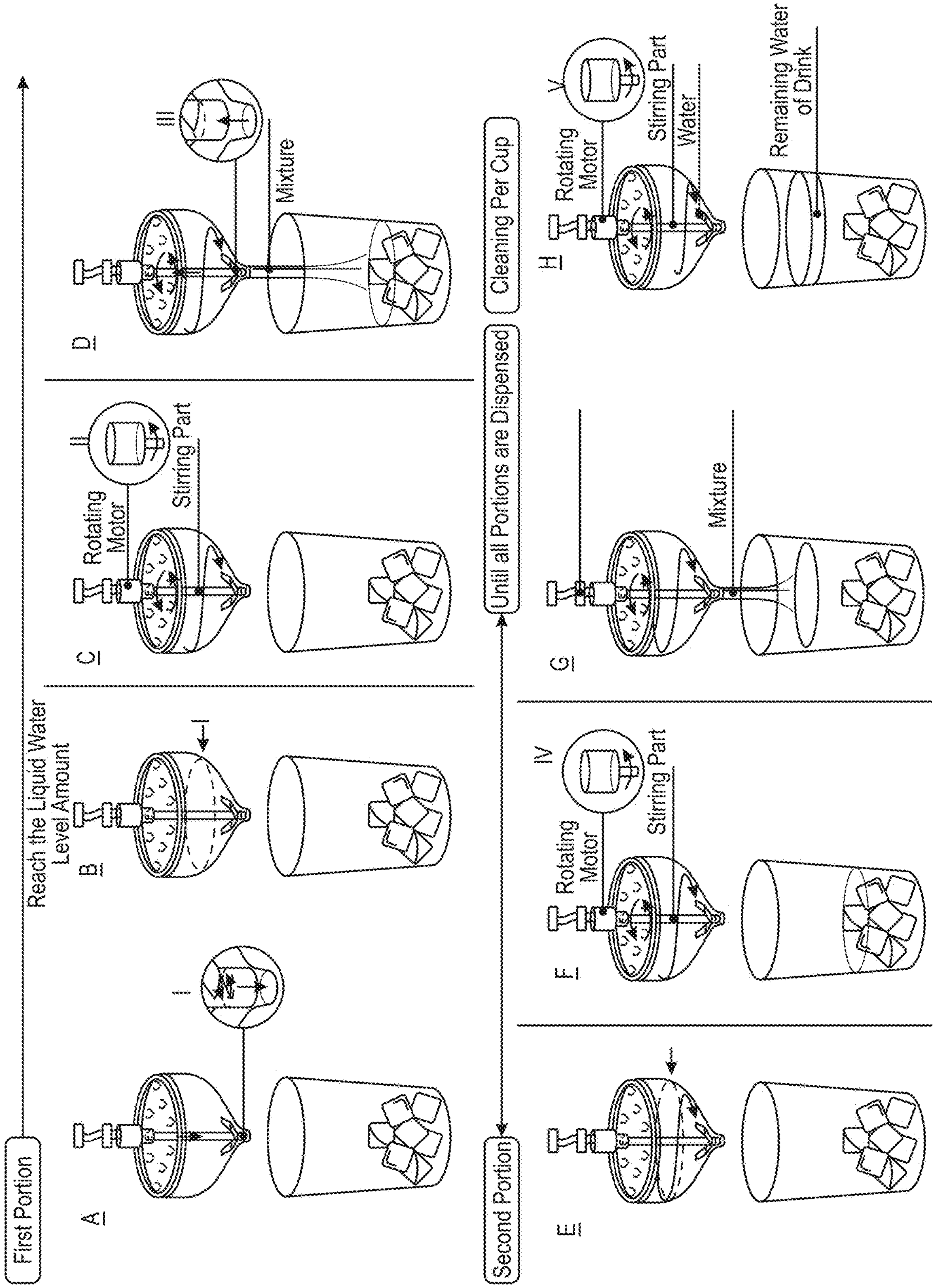

FIG. 19 illustrates a beverage preparation process 1900 according to some embodiments of the present technology. While the steps of the process 1900 are described in a particular order herein, one or more of the steps can be performed in a different order or can be omitted, and the process 1900 can include additional steps.

The process 1900 may be performed to prepare a "shaken drink" corresponding to a recipe. As used herein, a shaken drink may be made of a fluid and at least one target ingredient mixed together. According to the process 1900, the beverage may be prepared in two portions, a first portion corresponding to operations A-D and a second portion corresponding to operations E-G. For example, the first portion and the second portion may be (substantially) identical in that the two portions have the same type(s) and amount(s) of fluid and the same type(s) and amount(s) of at least one target ingredient (or referred to as the same composition in the same amount). As another example, the first portion and the second portion may have the same composition in different amounts. With reference to an example in which a beverage made of a fluid and a target ingredient, the same component may indicate that the first portion includes a first fluid amount of the fluid and a first ingredient amount of the target ingredient, the second portion includes a second fluid amount of the fluid and a second ingredient amount of the target ingredient, the ratio of the first ingredient amount to the first fluid amount is the same as the ratio of the second ingredient amount to the second fluid amount. In this example, the first fluid amount may be different from the second fluid amount; the first ingredient amount may be different from the second ingredient amount.

In part A, the mixer 150 (e.g., a stirrer with a stirring part) may be in a standby status, and the mixing chamber 190 or 290 may be closed with the dispensing opening 292 being (substantially) sealed or blocked by the dispenser 160 (e.g., a plug/rod), as illustrated in circular I of part A.

In part B, the system 100 or 200 may discharge the fluid and the at one target ingredient into the mixing chamber 190 or 290, causing the liquid level in the mixing chamber 190 or 290 to rise.

In part C, when the accumulated liquid in the mixing chamber 190 or 290 reaches a minimum blending liquid level (allowing safe and/or efficient mixing), the mixer 150 may begin to mix or blend the components (including the fluid and at least one target ingredient) in the mixing chamber 190 or 290. The mixing or blending may occur by rotating the stirring part of the mixer 150 using a rotating motor, as illustrated in circular II.

In part D, the dispenser 160 (e.g., a plug/rod) may be released as illustrated in circular III, allowing the mixture of the fluid and the at least one target ingredient from part C to be dispensed into a consumer cup. In some cases, the consumer cup may be partially filled with ice before the mixture is dispensed into the cup. In some cases, the consumer cup may be empty without ice or may be partially filled with content other than ice before the dispensing.

Before the liquid reaches the minimum blending liquid level, the system 100 or 200 may begin the production of the second portion. In part E, the system 100 or 200 may discharge components of the second portion (including the fluid and the at least one target ingredient) into the mixing chamber 190 or 290, and in part F, the mixer 150 may mix the components in the mixing chamber 190 or 290 by rotating the stirring part of the mixer 150 as illustrated in circular IV, while in part G the mixture from the first portion and/or the second portion is gradually dispensed into the consumer cup. The process may repeat for subsequent portions. The system 100 or 200 may continue dispensing and blending until all portions are dispensed.

After all portions including the least one target ingredient are dispensed, the system 100 or 200 may initiate a cleaning process using the designated cleaning portion between cups, as referred to cleaning per cup as illustrated in part H of FIG. 19. The mixer 150 may operate by rotating the stirring part as illustrated in circular V to facilitate the cleaning.

Once cleaning is complete, the used cleaning portion may be added to the consumer cup, constituting the final portion of the recipe. The system 100 or 200 may return the mixing chamber 190 or 290 to the closed configuration (e.g., by moving the plug/rod of the dispenser 160 using an actuator), and the system 100 or 200 may stand by for a next beverage production.

Figure 20:
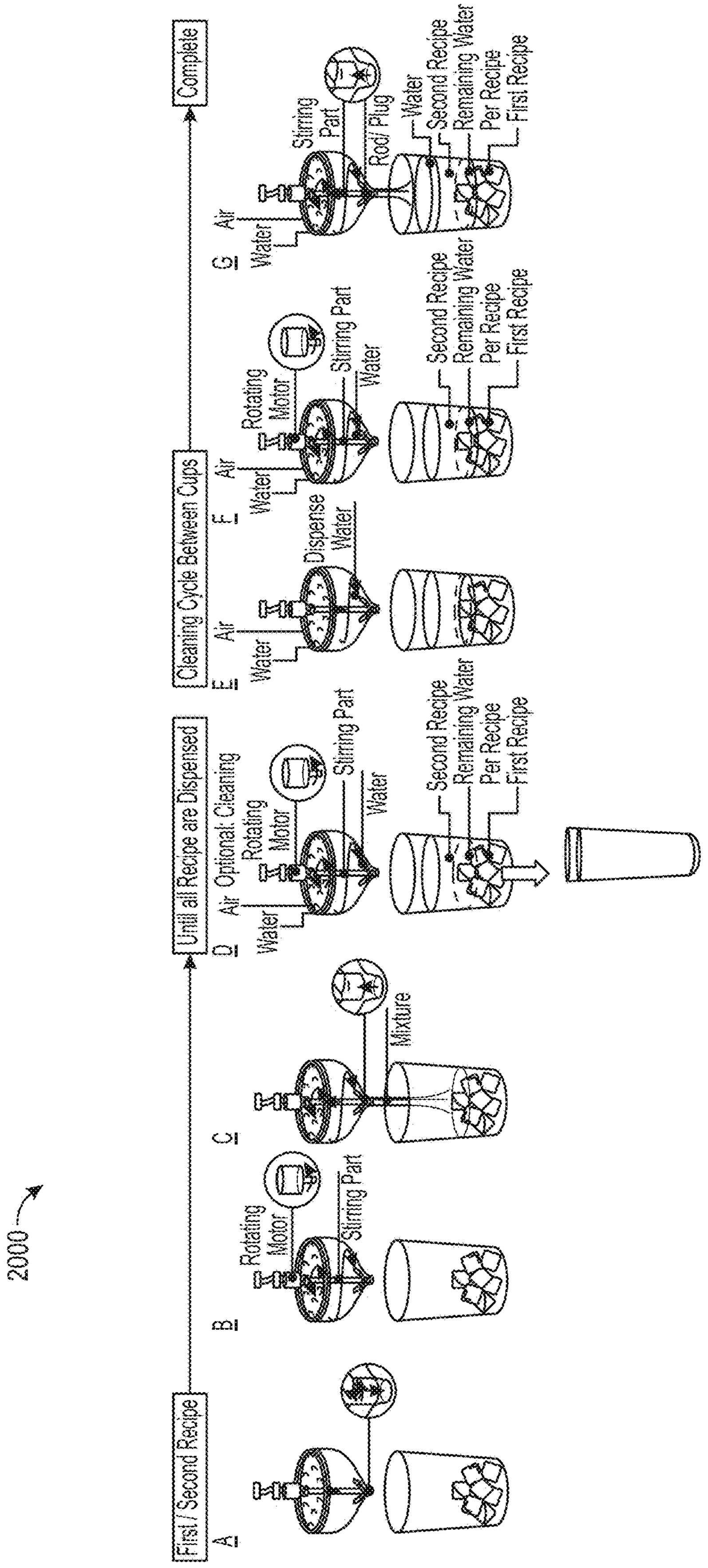

FIG. 20 illustrates a beverage preparation process 2000 according to some embodiments of the present technology. While the steps of the process 2000 are described in a particular order herein, one or more of the steps can be performed in a different order or can be omitted, and the process 2000 can include additional steps.

The process 2000 may be performed to prepare a layered drink which is the combination of two recipes. In some cases, content generated based on each of the two recipes may be thin with low viscosity. Production based on one or both recipes may be performed in portions. Production based on one or both recipes may be performed in a single portion. Parts A through D may be performed for each of one or more portions of the first recipe and content so generated dispensed into a user cup. Parts A through D may be (substantially) the same as or similar to parts A through G of process 1900 in FIG. 19, the description of which is not repeated here. Parts A through D, or a portion thereof, may be repeated for each of one or more portions of the second recipe and content so generated dispensed into the user cup. Between the production based on the first recipe and the production based on the second recipe, the process 2000 may include a cleaning step, e.g., by allocating a certain amount of water of the first recipe to be used as a cleaning portion at the end of its production, or by allocating a certain amount of water of the second recipe to be used as a cleaning portion at the beginning of its production, or both. The used cleaning portion may be dispensed into the user cup or discarded, as described elsewhere in the present document. In part E through G, after the production based on the second recipe, cleaning may be performed and the used cleaning portion may be dispensed into the user cup as part of the beverage or discarded, as described elsewhere in the present document. In some cases, the cleaning illustrated in parts E through G may be omitted.

In some embodiments, the content generated based on the first recipe and the content generated based on the second recipe may form different layers in the drink temporarily. A first used cleaning portion as the last portion of the first recipe and/or the first portion of the second recipe, as illustrated as the "remaining water per recipe," may form a different layer temporarily between the two layers corresponding to the first recipe and the second recipe, respectively. A second used cleaning portion generated in parts E through G may temporarily form a separate layer as illustrated as "water" in part G of FIG. 20. Accordingly, the beverage so produced may be a layered drink including multiple layers corresponding to one or more of the first recipe, the first used cleaning portion, the second recipe, and the second used cleaning portion from the second recipe. By following this process, the system 100 or 200 may automatically create a layered drink effect, with distinct recipes neatly stacked on top of each other in the user cup. The layers may gradually mix, with the separation between layers gradually disappearing over time.

Figure 21:
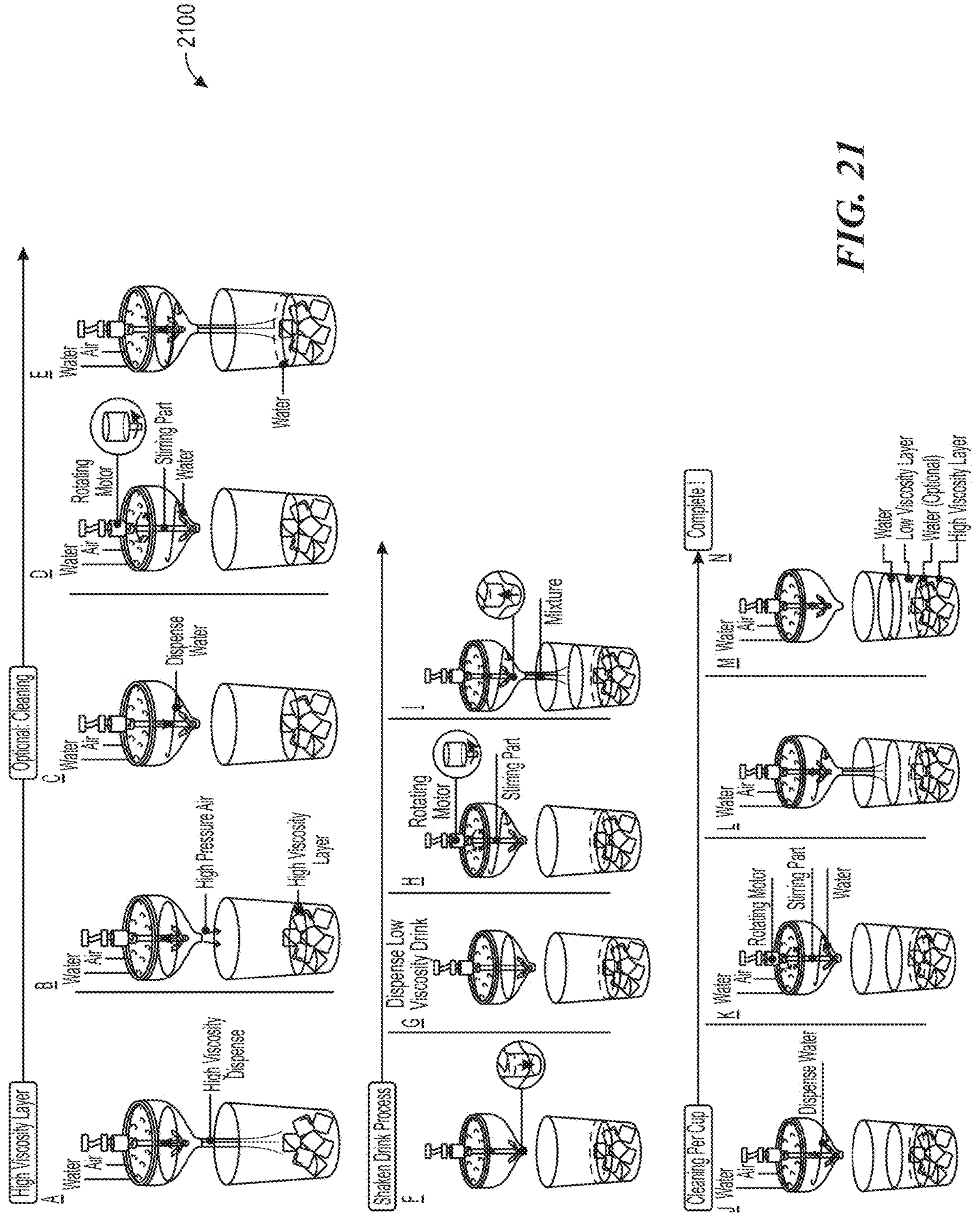

FIG. 21 illustrates a beverage preparation process 2100 according to some embodiments of the present technology. While the steps of the process 2100 are described in a particular order herein, one or more of the steps can be performed in a different order or can be omitted, and the process 2100 can include additional steps.

The process 2100 may be performed to prepare a layered drink which is the combination of two recipes. In some cases, content generated based on the two recipes may have different viscosity with one being thin with low viscosity and the other being thick with high viscosity. Production based on one or both recipes may be performed in portions. Based on the first recipe for producing high-viscosity content, parts A and B may be performed for each portion and content so generated dispensed into a user cup. In some cases, the consumer cup may be partially filled with ice before the mixture is dispensed into the cup. In some cases, the consumer cup may be empty without ice or may be partially filled with content other than ice before the dispensing. Part A may correspond to parts A, B, and C of FIG. 19, the description of which is not repeated here. In part B, the high-viscosity content generated in part A may be dispensed in a user cup. Part B may be similar to part D of FIG. 19 except that a mechanism to facilitate dispensing of high-viscosity content may be employed. For example, high pressure air may be discharged into the mixing chamber 190 or 290 to facilitate the dispensing of the high-viscosity content, as described elsewhere in the present document. In parts C through E at the end of the production based on the first recipe, cleaning may be performed and a first used cleaning portion may be dispensed into the user cup as part of the first recipe or discarded, as described elsewhere in the present document. In some cases, the cleaning illustrated in part E may be omitted.

Then based on the second recipe for producing low-viscosity content, parts G through J may be performed for each portion. Parts G through J may be (substantially) the same as or similar to parts A through G of process 1900 in FIG. 19, the description of which is not repeated here. Content generated based on the second recipe may be dispensed into the user cup. In some cases, as illustrated in parts K through N, the second recipe may include a cleaning portion, and a second used cleaning portion may be dispensed into the user cup as part of the second recipe.

In some embodiments, the content generated based on the first recipe and the content generated based on the second recipe may form different layers in the drink temporarily. The first used cleaning portion as the last portion of the first recipe, as illustrated as the "water" in part E and "water (optional)" in part M, may temporarily form a different layer between the two layers corresponding to the first recipe and the second recipe. The second used cleaning portion may temporarily form a separate layer (e.g., a top layer of the drink) as illustrated as "water" in part M of FIG. 21. The beverage so produced may be a layered drink including multiple layers corresponding to one or more of the first recipe, the first used cleaning portion from the first recipe, the second recipe, and the second used cleaning portion from the second recipe. By following this process, the system 100 or 200 may automatically create a layered drink effect, with distinct recipes neatly stacked on top of each other in the user cup. The layers may gradually mix, with the separation between layers gradually disappearing over time.

To produce a beverage by combining contents of different viscosities, the order of dispensing these contents into a user cup may affect one or more properties of the beverage including, e.g., appearance, taste, etc., due at least in part to different mixing behaviors between the contents relating to their relative positions in the cup. If the content with high viscosity is below the content with low viscosity, the mixing of these contents may occur more slowly than if the content with high viscosity is above the content with low viscosity.

Figure 22:
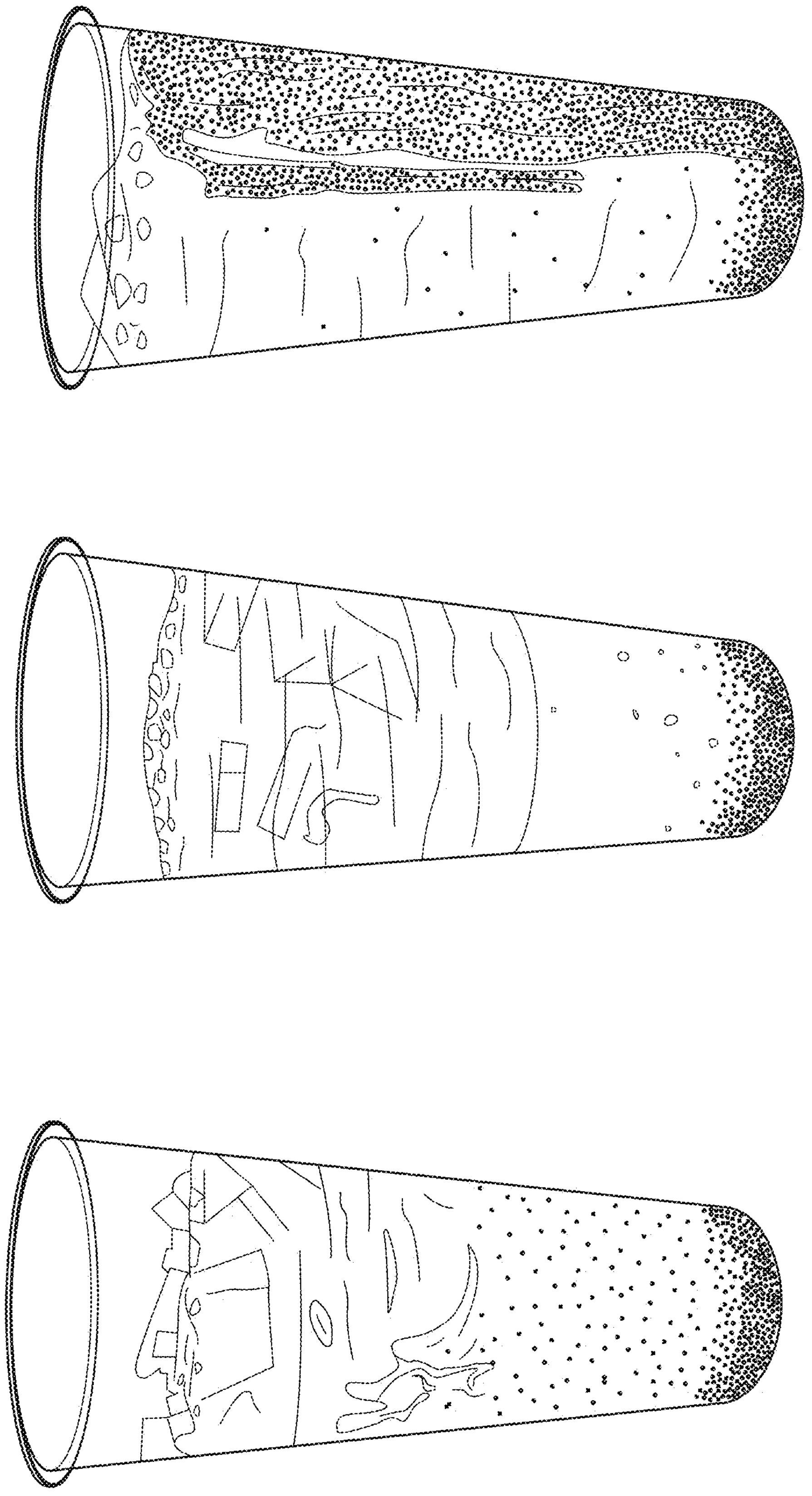

FIG. 22 illustrates schematics of drinks with ice and a combination of contents with different viscosity generated according to embodiments of the present technology. Part A illustrates a drink produced by first dispensing content with high viscosity and then content with low viscosity, which may create a gradient effect. The content with high viscosity that is dispensed first may stick on ice and take a while to slip down to the bottom of the cup. When the content with low viscosity is dispensed, the content may mix with the content with high viscosity slightly.

Part B illustrates a drink produced by first dispensing content with low viscosity and then content with high viscosity, which may create a better layered effect than the case in part A. The content with high viscosity may flow better when ice is covered with liquid (the content with low viscosity that is dispensed into the cup before the content with high viscosity). The content with high viscosity may slip to the bottom with less friction from the ice.

Part C illustrates a drink produced by dispensing content with high viscosity near the inner sidewall of the cup, the content may stick on the sidewall of the cup and reduce the aesthetic of the drink, suggesting that the content with high viscosity may be dispensed toward a center area of the cup.

With reference to the system 1600 in FIG. 16A for illustration, this may be achieved by centering the dispensing opening 292 or the outlet of the dispensing tube 1640 at the cup.

In some embodiments, to create a layered effect in a beverage without ice, the system 100 or 200 may dispense content with low viscosity prior to content with high viscosity. If the system 100 or 200 dispenses content with high viscosity prior to content with low viscosity, the high viscosity content may be disturbed and mix with the low viscosity content when the low viscosity content impacts the high viscosity content, causing splashing.

Figure 23:
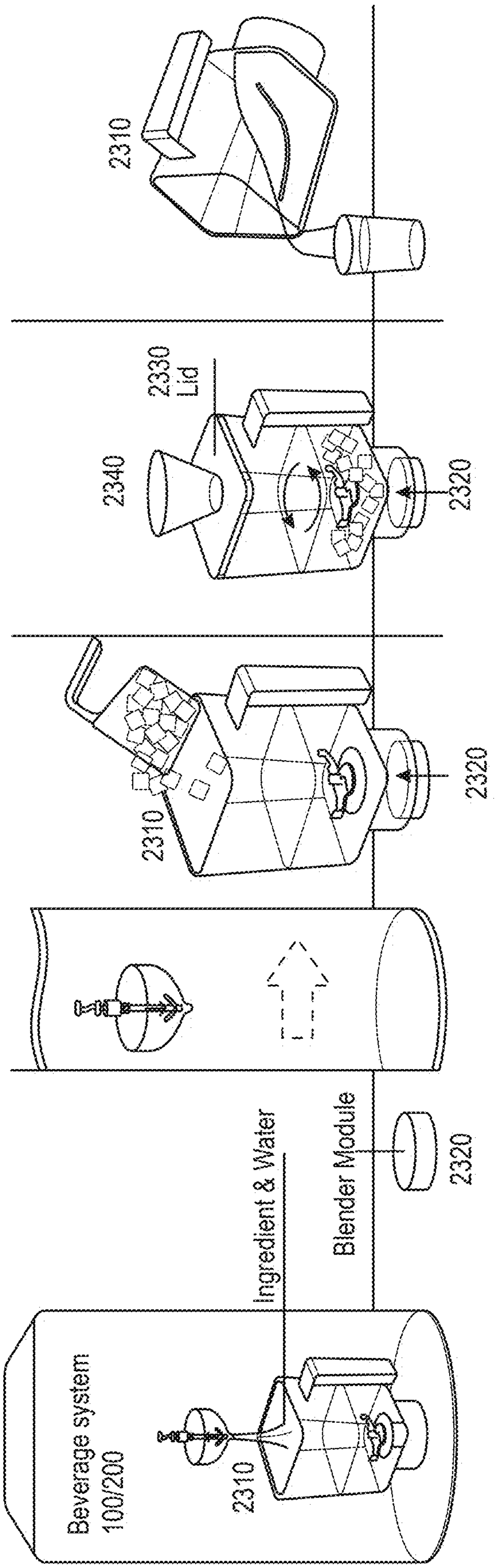

FIG. 23 illustrates a beverage preparation process 2300 according to some embodiments of the present technology. While the steps of the process 2300 are described in a particular order herein, one or more of the steps can be performed in a different order or can be omitted, and the process 2300 can include additional steps.

The process 2300 may be performed to prepare an ice-blended drink. The process 2300 may be similar to the process 1900. If the content (e.g., a mixture of water and at least one target ingredient) to be dispensed from the mixing chamber 190 or 290 has high viscosity, pressurized air may be used to pressurize the mixing chamber 190 or 290 to facilitate the dispensing. The process 2300 may run a cleaning using a cleaning portion as a last portion of the beverage production.

In part A, the system 100 or 200 may produce and dispense content from the mixing chamber 190 or 290 into a blender cup. Part A of FIG. 23 may correspond to parts A, B, and C of FIG. 19, the description of which is not repeated here. If the content has high viscosity, pressurized air (e.g., provided by the air pressure pump 274) may be used to pressurize the mixing chamber 190 or 290 to improve the dispensing speed of the high-viscosity content. Part A may be repeated for each of multiple portions in portioned preparation of the content. Cleaning may be performed using a cleaning portion of the fluid as a last portion in the portioned preparation. The used cleaning portion may be part of the recipe and dispensed into the blender cup. The blender cup may have no ice when the dispensing occurs.

In part B, the blender cup may be removed from the system 100 or 200 and placed on a blender module 2320. Before blending using the blender module 2320 begins, ice may be added to the blender cup manually from an ice cup or from an ice machine. In part C, a lid 2330 may be placed on the blender cup 2310. In some embodiments, a funnel 2340 may be coupled to the lid 2330. The blender module 2320 may blend the content in the blender cup 2310 including the mixture from the system 100 or 200 and ice. The mixture may include water and at least one target ingredient. The blending may facilitate the production of an ice blended drink. In part D, the ice blended drink may be poured to a user cup.

One or more of parts A through D may be performed manually or automatically. For example, in part B, ice may be added automatically by, e.g., moving the blender cup 2310 to an outlet of an ice machine and activating the ice machine to dispense ice into the blender cup. Merely by way of example, this automation may be achieved by, e.g., automated transfer of the blender cup 2310 from the system 100 or 200 to the ice machine and activating the ice dispensing by the ice machine based on sensing of proper positioning of the blender cup in or around the ice machine. Exemplary ways of the sensing may involve a contact sensor or sensing circuit, an imaging sensor or sensing circuit, a proximity sensor or sensing circuit, or the like, or a combination hereof. As another example, in part C, the lid 2330 and/or the funnel 2340 may be placed on the blender cup automatically by, e.g., a robot. As a further example, the pouring in part D may be performed automatically using, e.g., a robot, a moveable support where the blender cup 2310 is supported (e.g., similar to the cup support 1660). In some embodiments, one or more of these operations may be performed by a user.

Figure 24:
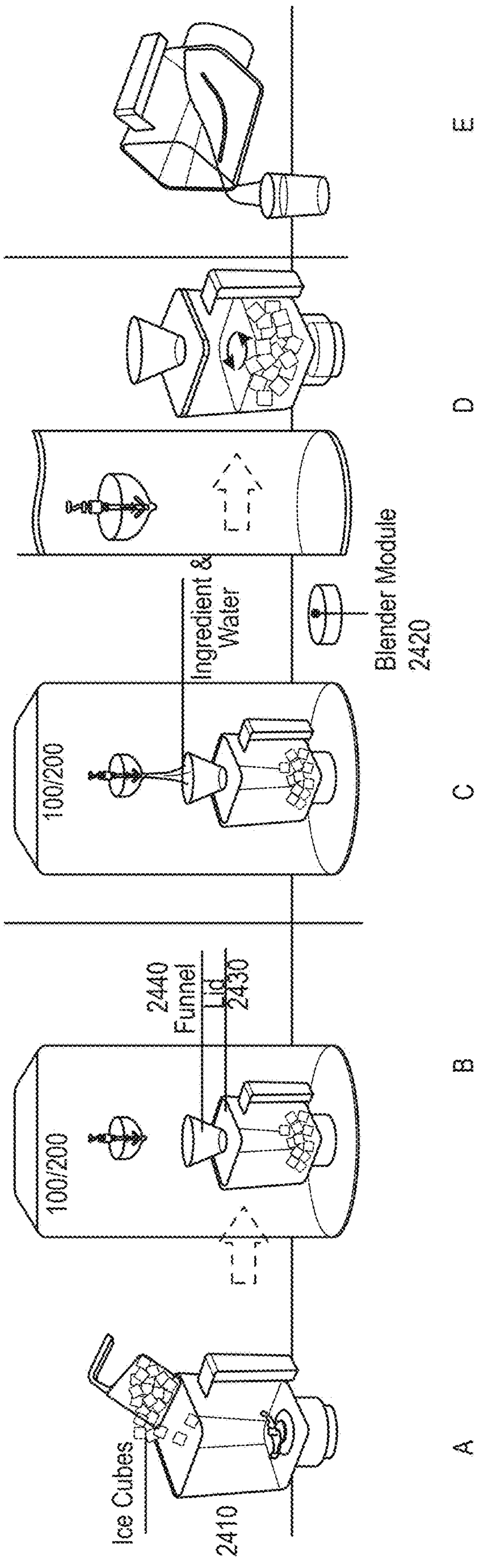

FIG. 24 illustrates a beverage preparation process 2400 according to some embodiments of the present technology. While the steps of the process 2400 are described in a particular order herein, one or more of the steps can be performed in a different order or can be omitted, and the process 2400 can include additional steps.

The process 2400 may be performed to prepare an ice-blended drink. The process 2400 may be (substantially) identical or similar to the process 2300 except that ice may be added to the blender cup 2410 before content made by the system 100 or 200 is dispensed into the blender cup. Other descriptions of the process 2300 may be applicable to the process 2400, and not repeated.

Figure 25:
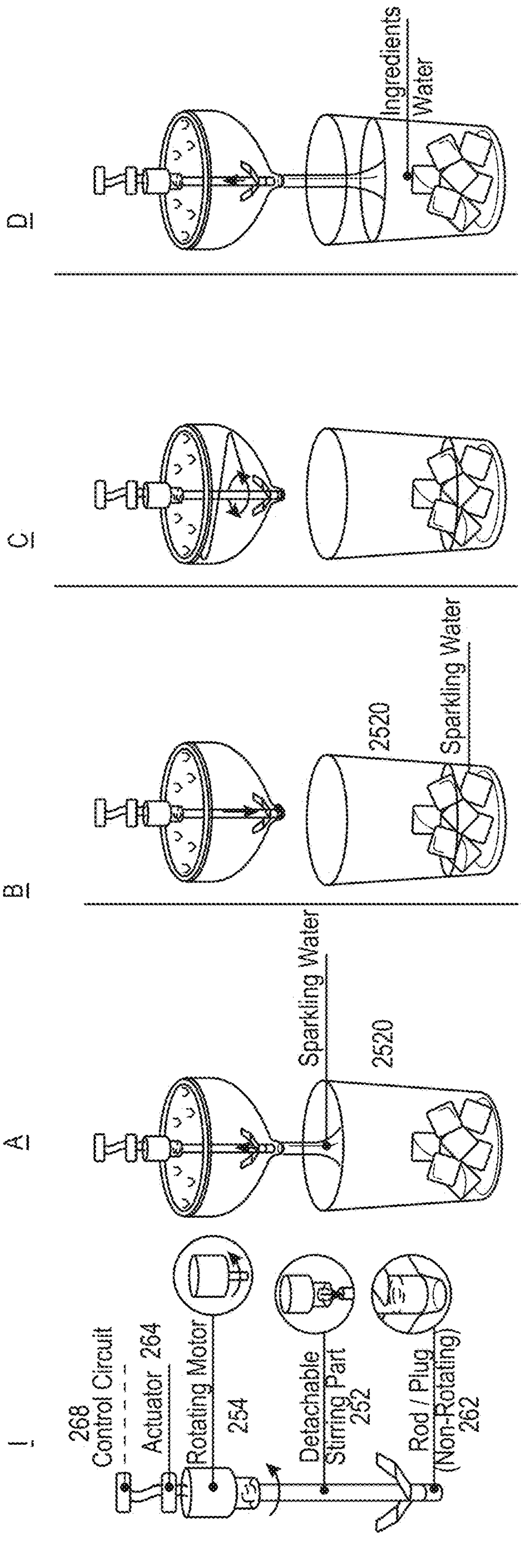

FIG. 25 illustrates a beverage preparation process 2500 according to some embodiments of the present technology. While the steps of the process 2500 are described in a particular order herein, one or more of the steps can be performed in a different order or can be omitted, and the process 2500 can include additional steps.

The process 2500 may be performed to prepare a sparkling drink. The process 2500 may be similar to the process 2000. The first recipe in the process 2500 may include sparkling water. Part I illustrates components of the system 100 or 200. In part A, the system 100 or 200 may dispense sparkling water into a user cup by moving the dispenser 160 upward by the actuator 264 (through the stirrer 252) to make the dispensing opening 292 available for passage of the sparkling water. In part B, the actuator 264 may move the stirrer 252 (and the plug 262 coupled to the stirrer 252) down to close the dispensing opening 292. In part C, the rotating motor 254 may control the stirring part of the stirrer 252 to stir the components in the mixing chamber 190 or 290, while the plug 262 remains stationary. In part D, the actuator 264 may move the plug 262 upward (through the stirrer 252) to make the dispensing opening 292 available for dispensing the mixture generated in part C into the user cup. Gas in the sparkling water may travel upward in the user cup, which may cause the mixture dispensed after the dispensing of the sparkling water to mix further.

In some embodiments, after the sparkling water is dispensed in part A, a cleaning may be performed using a cleaning portion of water and the used cleaning portion may be dispensed into the user cup to be mixed with the sparkling water or discarded.

Figure 26:
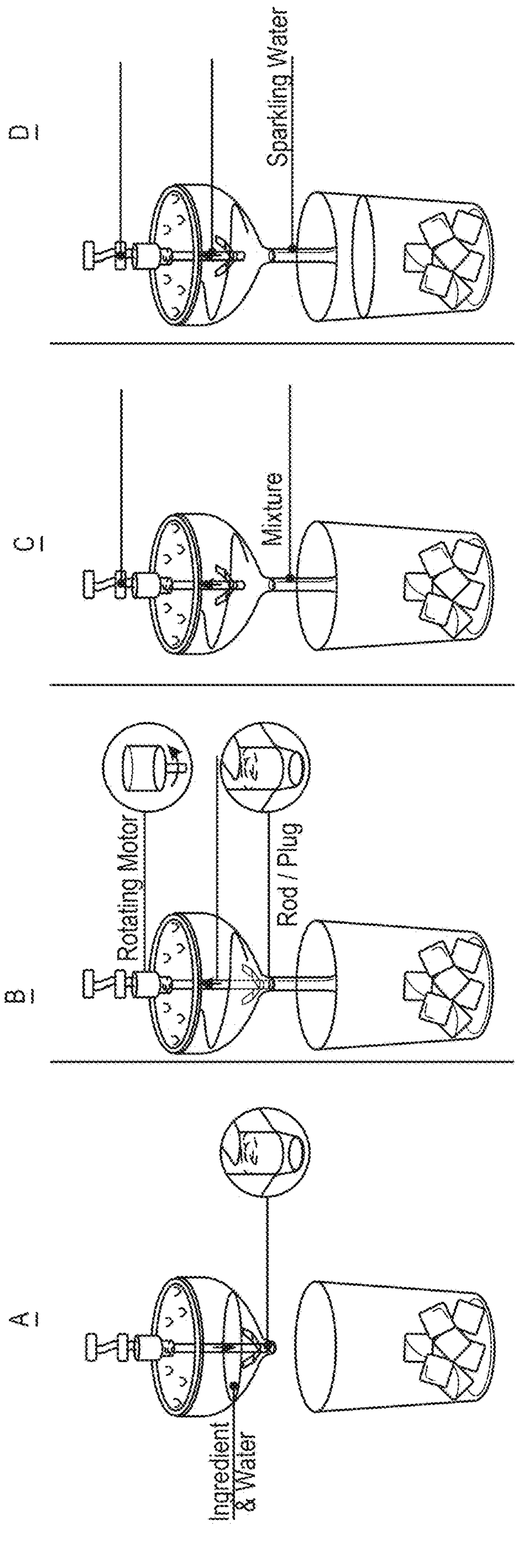

FIG. 26 illustrates a beverage preparation process 2600 according to some embodiments of the present technology. While the steps of the process 2600 are described in a particular order herein, one or more of the steps can be performed in a different order or can be omitted, and the process 2600 can include additional steps.

The process 2600 may be performed to prepare a sparkling drink. The process 2600 may be substantially identical to the process 2500 except that the order of the production based on the first recipe and the second recipe is reversed compared to the process 2500. Instead of dispensing sparkling water into a user cup before the content produced based on another recipe as in the process 2500, the process 2600 includes dispensing sparkling water into the user cup after the content produced based on another recipe. In some embodiments, a cleaning may be performed between the dispensing of content and the dispensing of the sparkling water.

D. Computer Systems

Figure 27:
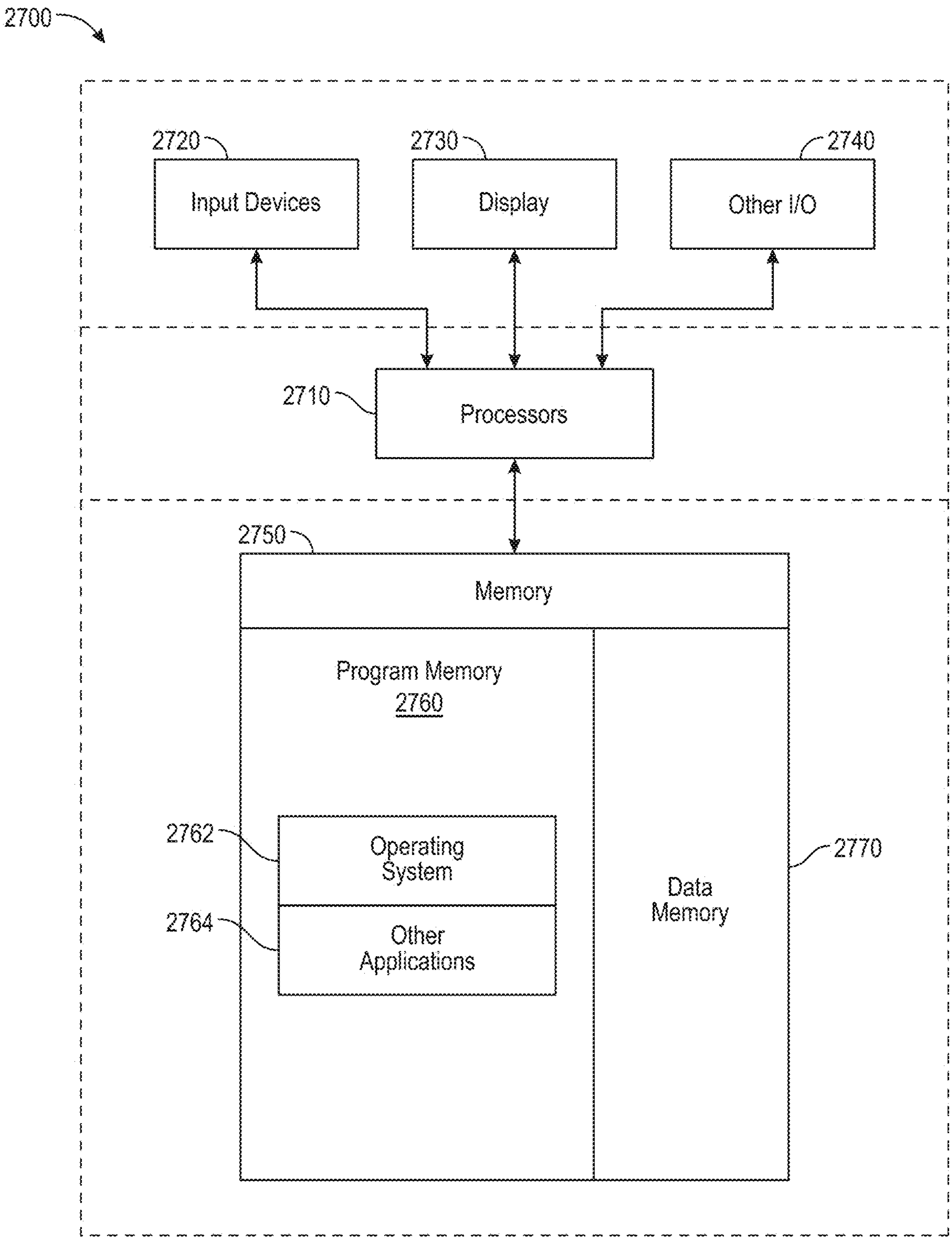
FIG. 27 is a block diagram illustrating an overview of devices on which some implementations can operate.

Several implementations are discussed below in more detail in reference to the figures. FIG. 27 is a block diagram illustrating an overview of devices on which some implementations of the disclosed technology can operate. The devices can include hardware components of a device 2700 that execute customized queries created from user selections, of query elements, that are based on meta-data from data set registrations. Device 2700 can include one or more input devices 2720 that provide input to the Processor(s) 2710 (e.g., CPU(s), GPU(s), HPU(s), etc.), notifying it of actions. The actions can be mediated by a hardware controller or control circuit that interprets the signals received from the input device and communicates the information to the processors 2710 using a communication protocol. Input devices 2720 include, for example, a mouse, a keyboard, a touchscreen, an infrared sensor, a touchpad, a wearable input device, a camera- or image-based input device, a microphone, or other user input devices.

Processors 2710 can be a single processing unit or multiple processing units in a device or distributed across multiple devices. Processors 2710 can be coupled to other hardware devices, for example, with the use of a bus, such as a peripheral component interconnect (PCI) bus or small computer system interface (SCSI) bus. The processors 2710 can communicate with a hardware controller or control circuit for devices, such as for a display 2730. Display 2730 can be used to display text and graphics. In some implementations, display 2730 provides graphical and textual visual feedback to a user. In some implementations, display 2730 includes the input device as part of the display, such as when the input device is a touchscreen or is equipped with an eye direction monitoring system. In some implementations, the display is separate from the input device. Examples of display devices include: a liquid crystal display (LCD) screen, a light emitting diode (LED) screen, a projected, holographic, or augmented reality display (such as a heads-up display device or a head-mounted device), and so on. Other input/output (I/O) devices 2740 can also be coupled to the processor, such as a network card, video card, audio card, USB, firewire or other external device, camera, printer, speakers, compact disc read-only memory (CD-ROM) drive, digital versatile disc (DVD) drive, disk drive, or Blu-Ray device.

In some implementations, the device 2700 also includes a communication device capable of communicating wirelessly or wire-based with a network node. The communication device can communicate with another device or a server through a network using, for example, transmission control protocol/internet protocol (TCP/IP) protocols. Device 2700 can utilize the communication device to distribute operations across multiple network devices.

The processors 2710 can have access to a memory 2750 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 2750 can include program memory 2760 that stores programs and software, such as an operating system 2762 and other application programs 2764. Memory 2750 can also include data memory 2770, e.g., table data, column data, value filter data, user interface data, database element data, selection data, root table data, code snippet data, join query data, query template data, connection data, configuration data, settings, user options or preferences, etc., which can be provided to the program memory 2760 or any element of the device 2700.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 28:
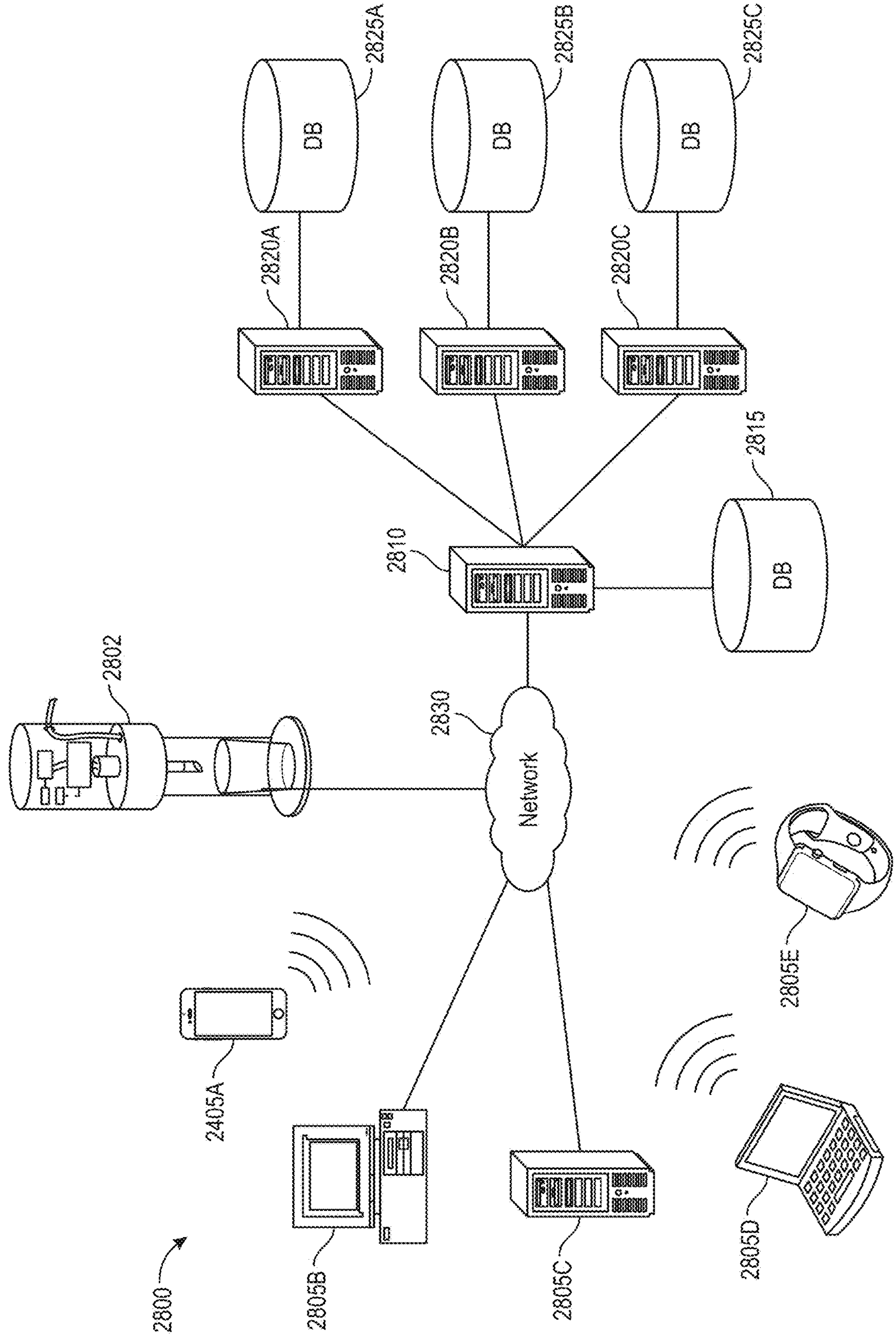
FIG. 28 is a block diagram illustrating an overview of an environment in which some implementations can operate.

FIG. 28 is a block diagram illustrating an overview of an environment 2800 in which some implementations of the disclosed technology can operate. Environment 2800 can include one or more client computing devices 2805A-E (collectively referred to as "client computing devices 2805") and a beverage system 2802. Client computing devices 2805 and the beverage system 2802 (e.g., system 100 or 200 described elsewhere in the present document) can operate in a networked environment using logical connections through network 2830 to one or more remote computers, such as a server computing device.

In some implementations, server 2810 can be an edge server which receives client requests and coordinates fulfillment of those requests through other servers, such as servers 2820A-C. Server computing devices 2810 and 2820 can include computing systems, such as device 2700. Though each server computing device 2810 and 2820 is displayed logically as a single server, server computing devices can each be a distributed computing environment encompassing multiple computing devices located at the same or at geographically disparate physical locations. In some implementations, each server 2820 corresponds to a group of servers.

Client computing devices 2805 and server computing devices 2810 and 2820 can each act as a server or client to other server/client devices. Server 2810 can connect to a database 2815. Servers 2820A-C can each connect to a corresponding database 2825A-C. As discussed above, each server 2820 can correspond to a group of servers, and each of these servers can share a database or can have their own database. Databases 2815 and 2825 can warehouse (e.g., store) information such as table data, column data, value filter data, user interface data, database element data, selection data, root table data, code snippet data, join query data, query template data, connection data. Though databases 2815 and 2825 are displayed logically as single units, databases 2815 and 2825 can each be a distributed computing environment encompassing multiple computing devices, can be located within their corresponding server, or can be located at the same or at geographically disparate physical locations.

Network 2830 can be a local area network (LAN) or a wide area network (WAN), but can also be other wired or wireless networks. Network 2830 may be the Internet, a mobile phone network, a mobile voice or data network (e.g., a 5G or long term evolution (LTE) network), a cable network, a public switched telephone network, a short-range wireless communication network (e.g., Bluetooth or Near Field Communications (NFC)), or some other public or private network. Client computing devices 2805 can be connected to network 2830 through a wired or wireless network interface, such as a satellite path, a fiber-optic path, a cable path, a path that supports internet communications (e.g., internet protocol television (IPTV)), free-space connections (e.g., for broadcast or other wireless signals), etc. While the connections between server 2810 and servers 2820 are shown as separate connections, these connections can be any kind of local, wide area, wired, or wireless network, including network 2830 or a separate public or private network. As described in further detail herein, the client computing devices 2805 and the beverage system 2802 can operate according to an edge computing protocol (e.g., an edge computing decryption protocol).

Figure 29:
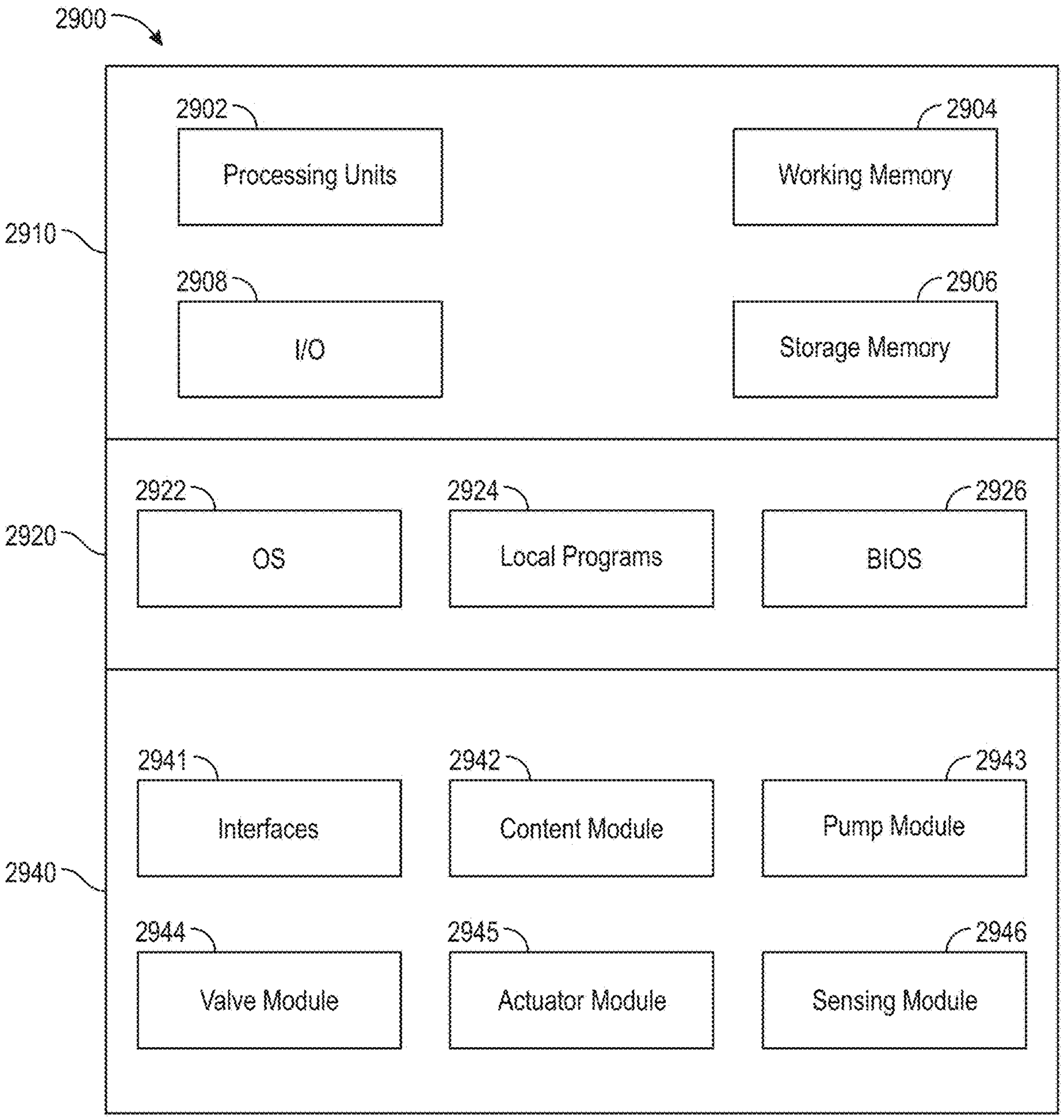
FIG. 29 is a block diagram illustrating components which, in some implementations, can be used in a system employing the disclosed document.

FIG. 29 is a block diagram illustrating components 2900 which, in some implementations, can be used in a system employing the disclosed technology. In some implementations, some or all of the components 2900 can be included in the beverage system 2802 (e.g., the system 100 or 200). The components 2900 include hardware 2910, general software 2920, and specialized components 2940. The components 2900 may correspond to the control 110 as illustrated in FIG. 1.

As discussed above, a system implementing the disclosed technology can use various hardware 2910 including processing units 2902 (e.g., CPUs, GPUs, accelerated processing units (APUs), etc.), working memory 2904, storage memory 2906 (local storage or as an interface to remote storage, such as storage 2815 or 2825), and input and output devices 2908. In various implementations, storage memory 2906 can be one or more of: local devices, interfaces to remote storage devices, or combinations thereof. For example, storage memory 2906 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 2815 or storage provided through another server 2820). Components 2900 can include a machine-readable storage medium having machine executable instructions stored thereon. Components 2900 can be implemented in a client computing device such as client computing devices 2805, on the beverage system 2802, or on a server computing device, such as server computing device 2810 or 2820.

General software 2920 can include various applications including an operating system (OS) 2922, local programs 2924, and a basic input output system (BIOS) 2926.

Specialized components 2940 can be subcomponents of a general software application 2920, such as local programs 2924. Specialized components 2940 can include content module 2942, pump module 2943, valve module 2944, actuator module 2945, and sensing module 2946, and components which can be used for providing user interfaces, transferring data, and controlling the specialized components, such as interfaces 2941. In some implementations, components 2900 can be in a computing system that is distributed across multiple computing devices or can be an interface to a server-based application executing one or more of specialized components 2940.

In some implementations, the content module 2942 may be configured to manage inventory of one or more fluids, ingredients, and/or cleaning solutions stored in or otherwise accessible to the beverage system 2802 and select which content is to be delivered based on an operation to be performed including, e.g., a beverage to be prepared, a cleaning process to be performed, etc. For example, the beverage system 2802 can include ingredient sources or containers (e.g., the ingredient sources 232 in FIGS. 2A and 2B) containing twenty different ingredients, and upon receiving a signal or indication that a specific beverage is desired whose preparation involves two of the twenty ingredients available, the content module 2942 can selectively provide those two ingredients. As another example, the content module 2942 may monitor inventory, based on which the beverage system 2802 may take actions accordingly. For instance, the content module 2942 may track the remaining amount of an ingredient, its shelf life, and/or demand based on historical data (e.g., over the past day, week, month, similar season, etc.). Based on the information acquired by the content module 2942, the beverage system 2802 may provide a reminder for restocking, automatically place an order for restocking, and/or adjust the beverage options available for user selection. For example, the beverage system 2802 may remove an option from the menu presented to a user if a needed ingredient is low or out of stock, and/or add the beverage option back to the menu when the ingredient is restocked in the beverage system 2802.

In some implementations, the pump module 2943 may be configured to manage the driving and/or dispensing of liquid-based and/or gas content in the beverage system 2802 by managing, e.g., the pumps 224, 234, 244, 274, 954, and/or 1054 as described elsewhere in the present document. For example, the pump module 2943 may be configured to manage the driving of content received from, e.g., a source or container (e.g., the water source 222, the ingredient source 232, the cleaning solution source 242, the air source 272 in FIGS. 2A and 2B), through the beverage system 2802 and dispensing it via one or more openings (e.g., one or more openings 227, an ingredient nozzle 239, a cleaning solution nozzle 249, one or more openings 277 or 477 in FIGS. 2A, 2B, 3, and 4). For example, the pump module 2943 can set the appropriate flow rate, dispensing quantity or volume, pressure, frequency, flow direction, etc., depending on, for example, a desired operation (e.g., a cleaning operation, an operation to produce a selected beverage of a desired temperature) and/or characteristics (e.g., viscosity of the individual ingredient(s)/cleaning solution(s) involved). In some embodiments, the pump module 2943 can communicate with other modules, such as the valve module 2944 and/or the sensing module 2946, to coordinate dispensing of content with one or more desired parameters.

In some implementations, the valve module 2944 may be configured to manage the flow of liquid-based and/or gas content in the beverage system 2802 by managing, e.g., the valves 226, 236, 246, 276, and/or 1056 as described elsewhere in the present document. For example, the valve module 2944 can set the appropriate flow rate, dispensing quantity or volume, pressure, frequency, flow direction, etc., depending on, for example, a desired operation (e.g., a cleaning operation, an operation to produce a selected beverage of a desired temperature). In some embodiments, the valve module 2944 can communicate with other modules, such as the pump module 2943 and/or the sensing module 2946, to coordinate dispensing of content with one or more desired parameters.

In some implementations, the actuator module 2945 may be configured to manage the operation of an actuator, motor, pulse generator, etc., in the beverage system 2802. For example, the actuator module 2945 may manage the operation of the actuator or motor 254, 264, 1214, 1314A, 1314B, 1414, and/or 1514 as described elsewhere in the present document. For example, the actuator module 2945 can set the timing, duration, power, etc., of an actuator or motor, depending on, e.g., a desired operation (e.g., a cleaning operation, a mixing operation, a dispensing operation, a drainage operation). In some embodiments, the actuator module 2945 can communicate with other modules, such as the pump module 2943 and/or the valve module 2944, to coordinate dispensing and mixing of content with one or more desired parameters.

In some implementations, the sensing module 2946 may be configured to manage the operation relating to a sensor or sensing circuit in the beverage system 2802. For example, the sensing module 2946 may manage the operation of the heating element 282 based on temperature of content (e.g., water, a mixture including water) in or exiting the fluid channel 221, in the mixing chamber 290, etc. The sensing module 2946 may receive information acquired by a sensor or sensing circuit within or coupled to the beverage system 2802, e.g., the temperature sensor or sensing circuit 212, a pressure sensor or sensing circuit, etc.

Although depicted as separate components, specialized components 2940 may be logical or other nonphysical differentiations of functions and/or may be submodules or code-blocks of one or more applications. The components 2940 may include or correspond to various controller or control circuits described elsewhere in the present document. For example, the pump module 2943 may include or correspond to the controller or control circuits 228A, 238A, 248A, 278A, 958, 1058, etc., as described elsewhere in the present disclosure. As another example, the valve module 2944 may include or correspond to the controller or control circuits 228B, 238B, 248B, 278B, etc., as described elsewhere in the present disclosure. As a further example, the actuator module 2945 may include or correspond to the controller or control circuits 268, 858, 1218, 1318A, 1318B, 1418, 1518, etc., as described elsewhere in the present disclosure. As a still further example, the sensing module 2946 may include or correspond to the controller or control circuits 218, 288, etc., as described elsewhere in the present disclosure.

Those skilled in the art will appreciate that the components illustrated in FIGS. 23-29 described above may be altered in a variety of ways. For example, either of the nozzle actuator module 2948 or the cup actuator module 2950 may be omitted. In some implementations, one or more of the components described above can execute one or more of the processes described above.

E. Examples

The present technology is illustrated, for example, according to various aspects described below as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1. A beverage system, comprising:

- a fluid feeder configured to discharge a fluid;
- an ingredient feeder configured to discharge one or more ingredients;
- a mixing chamber having a dispensing opening, the mixing chamber configured to receive the fluid and ingredients;
- a dispenser configured to control dispensing from the mixing chamber via the dispensing opening; and
- a controller or control circuit programmed to perform operations comprising:
  - receiving from a user a selection for a beverage;
  - obtaining, based on the selection, information relating to a first portion and a second portion of the beverage, wherein:
    - the first portion comprises a first amount of the fluid and a first amount of a first target ingredient; and
    - the second portion comprises a second amount of the fluid and a second amount of a second target ingredient, the second target ingredient being different from the first target ingredient;
  - generating, based on the obtained information, a first set of signals and a second set of signals for a process including:
    - producing, based on the first set of signals, the first portion of the beverage, wherein the first set of signals comprise:
      - a first fluid signal, the first fluid signal causing the fluid feeder to discharge the first amount of the fluid into the mixing chamber;
      - a first ingredient signal, the first ingredient signal causing the ingredient feeder to discharge the first amount of the first target ingredient into the mixing chamber; and
      - a first dispensing signal, the first dispensing signal causing the dispenser to allow at least some of a mixture of the fluid and the first target ingredient to be dispensed from the mixing chamber;
    - producing, based on the second set of signals, the second portion of the beverage, wherein the second set of signals comprise:
      - a second fluid signal, the second fluid signal causing the fluid feeder to discharge the second amount of the fluid into the mixing chamber;
      - a second ingredient signal, the second ingredient signal causing the ingredient feeder to discharge the second amount of the at second target ingredient into the mixing chamber; and
      - a second dispensing signal, the second dispensing signal causing the dispenser to allow at least some of a mixture of the fluid and the second target ingredient to be dispensed from the mixing chamber; and
    - adding the second portion to the first portion, or a mixture comprising the first portion.

Example 2. The beverage system of any one or more examples disclosed herein, wherein: the first amount of the fluid in the first portion and the second amount of the fluid in the second portion may be the same or different.

Example 3. The beverage system of any one or more examples disclosed herein, further comprising a mixer configured to mix the fluid and the one or more ingredients in the mixing chamber.

Example 4. The beverage system of any one or more examples disclosed herein, wherein: the first set of signals further comprise a first mixing signal, the first mixing signal causing the mixer to mix the fluid and the first target ingredient in the mixing chamber.

Example 5. The beverage system of any one or more examples disclosed herein, wherein: the second set of signals further comprise a second mixing signal, the second mixing signal causing the mixer to mix the fluid and the second target ingredient in the mixing chamber.

Example 6. The beverage system of any one or more examples disclosed herein, wherein:

the first portion has a first viscosity; and the second portion has a second viscosity that is different from the first viscosity.

Example 7. The beverage system of any one or more examples disclosed herein, wherein:

at least one of the first portion or the second portion further comprises a third amount of a third target ingredient; and at least one of the first ingredient signal or the second ingredient signal further causes the ingredient feeder to discharge the third amount of the third target ingredient into the mixing chamber before or after the mixing based on the first or second mixing signal begins.

Example 8. The beverage system of any one or more examples disclosed herein, wherein:

the mixture of the fluid and the first target ingredient is dispensed from the mixing chamber at a first flow rate; and the mixture of the fluid and the second target ingredient is dispensed from the mixing chamber at a second flow rate that is different from the first flow rate.

Example 9. The beverage system of any one or more examples disclosed herein, wherein:

the controller or control circuit is programmed to perform the operations further comprising generating, based on the obtained information, a third set of signals; and the process further comprises:

producing, based on the third set of signals, a third portion of the beverage before or after producing the second portion; and adding the third portion to the first portion, or a mixture comprising the first portion.

Example 10. The beverage system of any one or more examples disclosed herein, wherein:

the third portion comprises a third amount of the fluid only; and the production of the third portion occurs between the production of the first portion and the production of the second portion.

Example 11. The beverage system of any one or more examples disclosed herein, wherein:

the fluid is a first fluid; and the fluid feeder is configured to discharge a second fluid; and the third portion comprises a third amount of the second fluid.

Example 12. The beverage system of any one or more examples disclosed herein, wherein the fluid feeder is fluidly connected to a fluid supply source.

Example 13. The beverage system of any one or more examples disclosed herein, wherein the fluid feeder comprises a controllable valve operably connected to the controller or control circuit to controllably discharge the fluid.

Example 14. The beverage system of any one or more examples disclosed herein, wherein the fluid feeder comprises or is in fluid communication with a fluid conduit positioned around a rim of the mixing chamber, the fluid conduit having a plurality of apertures for discharging the fluid into the mixing chamber.

Example 15. The beverage system of any one or more examples disclosed herein, further comprising:

a spray rim that has an interior, a fluid channel operably coupled to the fluid feeder, and a gas conduit operably coupled to a pressurized gas assembly, the fluid channel and the gas conduit collectively occupying at least a portion of the interior of the spray rim, wherein:

the spray rim includes a plurality of apertures and a plurality of nozzles, each nozzle being connected to at least one of the apertures and open to the mixing chamber, each aperture being open to at least one of the gas conduit or the fluid channel and configured to guide the pressurized gas from the gas conduit or the fluid from the fluid channel to the corresponding nozzle where the pressurized gas and the fluid are mixed, thereby pressurizing the fluid before being discharged into the mixing chamber.

Example 16. The beverage system of any one or more examples disclosed herein, wherein the mixer comprises a mechanical stirrer, a vibration stirrer, or an ultrasonic transducer.

Example 17. The beverage system of any one or more examples disclosed herein, wherein the dispenser is configured to move along a direction to adjust how much of the dispensing opening of the mixing chamber is available for dispensing from the mixing chamber.

Example 18. The beverage system of any one or more examples disclosed herein, further comprising at least one actuator configured to cause the dispenser to move along the direction between a first position and a second position, the dispensing opening of the mixing chamber being blocked by the dispenser at the first position, and the dispensing opening of the mixing chamber being fully open when the dispenser is at the second position.

Example 19. The beverage system of any one or more examples disclosed herein, wherein:

the dispenser comprises a plug, and the mixer is coupled to the plug such that the plug moves with the mixer when the mixer undergoes linear motion and remains fixed in place when the mixer undergoes rotational motion.

Example 20. A method, comprising:

receiving from a user a selection for a beverage;

obtaining, based on the selection, information relating to a first portion and a second portion of the beverage, wherein:

the first portion comprises a first amount of a fluid and a first amount of a first target ingredient, and the second portion comprises a second amount of the fluid and a second amount of a second target ingredient;

generating, based on the obtained information, a first set of signals and a second set of signals for a process including:

producing, based on the first set of signals, the first portion of the beverage, wherein the first set of signals comprise:

a first fluid signal, the first fluid signal causing a fluid feeder to discharge the first amount of the fluid into a mixing chamber;

a first ingredient signal, the first ingredient signal causing an ingredient feeder to discharge the first amount of the first target ingredient into the mixing chamber; and a first dispensing signal, the first dispensing signal causing a dispenser to allow at least some of a mixture of the fluid and the first target ingredient to be dispensed from the mixing chamber;

producing, based on the second set of signals, the second portion of the beverage, wherein the second set of signals comprise:

a second fluid signal, the second fluid signal causing the fluid feeder to discharge the second amount of the fluid into the mixing chamber;

a second ingredient signal, the second ingredient signal causing the ingredient feeder to discharge the second amount of the second target ingredient into the mixing chamber; and a second dispensing signal, the second dispensing signal causing the dispenser to allow at least some of a mixture of the fluid and the second target ingredient to be dispensed from the mixing chamber; and adding the second portion to the first portion, or a mixture comprising the first portion.

Example 21. The method of any one or more examples disclosed herein, wherein: the first set of signals further comprise a first mixing signal, the first mixing signal causing the mixer to mix the fluid and the first target ingredient in the mixing chamber.

Example 22. The method of any one or more examples disclosed herein, wherein: the second set of signals further comprise a second mixing signal, the second mixing signal causing the mixer to mix the fluid and the second target ingredient in the mixing chamber.

Example 23. The method of any one or more examples disclosed herein, wherein:

the first dispensing signal causes the dispenser to allow at least some of the mixture of the fluid and the first target ingredient to be dispensed from the mixing chamber at a first flow rate; and the second dispensing signal causes the dispenser to allow at least some of the mixture of the fluid and the second target ingredient to be dispensed from the mixing chamber at a second flow rate that is different from the first flow rate.

Example 24. The method of any one or more examples disclosed herein, further comprising generating, based on the obtained information, a third set of signals, wherein the process further comprises:

producing, based on the third set of signals, a third portion of the beverage before or after producing the second portion; and adding the third portion to the first portion, or a mixture comprising the first portion.

Example 25. The method of any one or more examples disclosed herein, wherein:

the third portion comprises a third amount of the fluid only; and the production of the third portion occurs between the production of the first portion and the production of the second portion.

Example 26. The method of any one or more examples disclosed herein, wherein at least one of the first set of signals or the second set of signals further comprise a heating signal, the heating signal causing a heater to heat at least some of the first amount of the fluid or the first amount of the first target ingredient or at least some of the second amount of the fluid or the second amount of the second target ingredient before or after being discharged into the mixing chamber.

Example 27. The method of any one or more examples disclosed herein, wherein at least one of the first set of signals or the second set of signals further comprise a pressurizing signal, the pressurizing signal causing a pressurized gas assembly to deliver pressurized gas:

for pressurizing the fluid before discharged into the mixing chamber; and/or for facilitating mixing of the fluid with the first or second target ingredient in the mixing chamber and/or for facilitating dispensing from the mixing chamber.

Example 28. A beverage system, comprising:

a first fluid feeder configured to discharge a first fluid;

a second fluid feeder configured to discharge a second fluid;

an ingredient feeder configured to discharge one or more ingredients;

a mixing chamber having a dispensing opening, the mixing chamber configured to receive the fluid and ingredients;

a dispenser configured to control dispensing from the mixing chamber via the dispensing opening; and a controller or control circuit programmed to perform operations comprising:

receiving from a user a selection for a beverage;

obtaining, based on the selection, information relating to a first portion and a second portion of the beverage, wherein:

the first portion comprises a first amount of the first fluid and a first amount of a first target ingredient; and the second portion comprises a second amount of the second fluid and a second amount of a second target ingredient;

generating, based on the obtained information, a first set of signals and a second set of signals for a process including:

producing, based on the first set of signals, the first portion of the beverage, wherein the first set of signals comprise:

a first fluid signal, the first fluid signal causing the first fluid feeder to discharge the first amount of the first fluid into the mixing chamber;

a first ingredient signal, the first ingredient signal causing the ingredient feeder to discharge the first amount of the first target ingredient into the mixing chamber; and a first dispensing signal, the first dispensing signal causing the dispenser to allow at least some of a mixture of the first fluid and the first target ingredient to be dispensed from the mixing chamber;

producing, based on the second set of signals, the second portion of the beverage, wherein the second set of signals comprise:

a second fluid signal, the second fluid signal causing the second fluid feeder to discharge the second amount of the second fluid into the mixing chamber;

a second ingredient signal, the second ingredient signal causing the ingredient feeder to discharge the second amount of the at second target ingredient into the mixing chamber; and a second dispensing signal, the second dispensing signal causing the dispenser to allow at least some of a mixture of the second fluid and the second target ingredient to be dispensed from the mixing chamber; and adding the second portion to the first portion, or a mixture comprising the first portion.

Example 29. The beverage system of any one or more examples disclosed herein, wherein the first fluid feeder and the second fluid feeder share a same fluid conduit through which the first fluid or the second fluid is discharged into the mixing chamber.

Example 30. The beverage system of any one or more examples disclosed herein, wherein:

the first fluid feeder comprises a fluid channel positioned around a rim of the mixing chamber through which the first fluid is discharged into the mixing chamber; and the second fluid feeder comprises a nozzle through which the second fluid is discharged into the mixing chamber.

Example 31. The beverage system of any one or more examples disclosed herein, wherein at least one of the first fluid or the second fluid comprises water or sparkling water.

Example 32. The beverage system of any one or more examples disclosed herein, further comprising a mixer configured to mix the fluid and the one or more ingredients in the mixing chamber.

Example 33. The beverage system of any one or more examples disclosed herein, wherein: the first set of signals further comprise a first mixing signal, the first mixing signal causing the mixer to mix the fluid and the first target ingredient in the mixing chamber.

Example 34. The beverage system of any one or more examples disclosed herein, wherein: the second set of signals further comprise a second mixing signal, the second mixing signal causing the mixer to mix the fluid and the second target ingredient in the mixing chamber.

Example 35. A method, comprising:

receiving from a user a selection for a beverage;

obtaining, based on the selection, information relating to a first portion and a second portion of the beverage, wherein:

the first portion comprises a first amount of a first fluid and a first amount of a first target ingredient, and the second portion comprises a second amount of a second fluid and a second amount of a second target ingredient;

generating, based on the obtained information, a first set of signals and a second set of signals for a process including:

producing, based on the first set of signals, the first portion of the beverage, wherein the first set of signals comprise:

a first fluid signal, the first fluid signal causing a first fluid feeder to discharge the first amount of the first fluid into a mixing chamber;

a first ingredient signal, the first ingredient signal causing an ingredient feeder to discharge the first amount of the first target ingredient into the mixing chamber;

and a first dispensing signal, the first dispensing signal causing a dispenser to allow at least some of a mixture of the first fluid and the first target ingredient to be dispensed from the mixing chamber;

producing, based on the second set of signals, the second portion of the beverage, wherein the second set of signals comprise:

a second fluid signal, the second fluid signal causing a second fluid feeder to discharge the second amount of the second fluid into the mixing chamber;

a second ingredient signal, the second ingredient signal causing the ingredient feeder to discharge the second amount of the second target ingredient into the mixing chamber; and a second dispensing signal, the second dispensing signal causing the dispenser to allow at least some of a mixture of the second fluid and the second target ingredient to be dispensed from the mixing chamber; and adding the second portion to the first portion, or a mixture comprising the first portion.

Example 36. One or more non-transitory computer-readable media storing computer-executable instructions that, when executed by one or more processors, cause a beverage system to perform any one or more operations disclosed herein.

What is claimed is:

1. A beverage system, comprising:

a fluid feeder configured to discharge a fluid;

an ingredient feeder configured to discharge one or more ingredients;

a mixing chamber having a dispensing opening, the mixing chamber configured to receive the fluid and ingredients;

a mixer configured to mix the fluid and the one or more ingredients in the mixing chamber;

a dispenser configured to control dispensing from the mixing chamber via the dispensing opening, wherein the dispenser comprises a plug, and the mixer is coupled to the plug such that the plug moves with the mixer when the mixer undergoes linear motion and remains fixed in place when the mixer undergoes rotational motion; and a controller or control circuit programmed to perform operations comprising:

receiving from a user a selection for a beverage;

obtaining, based on the selection, information relating to a first portion and a second portion of the beverage, wherein:

the first portion comprises a first amount of the fluid and a first amount of a first target ingredient; and the second portion comprises a second amount of the fluid and a second amount of a second target ingredient, the second target ingredient being different from the first target ingredient;

generating, based on the obtained information, a first set of signals and a second set of signals for a process including:

producing, based on the first set of signals, the first portion of the beverage, wherein the first set of signals comprise:

a first fluid signal, the first fluid signal causing the fluid feeder to discharge the first amount of the fluid into the mixing chamber;

a first ingredient signal, the first ingredient signal causing the ingredient feeder to discharge the first amount of the first target ingredient into the mixing chamber; and a first dispensing signal, the first dispensing signal causing the dispenser to allow at least some of a mixture of the fluid and the first target ingredient to be dispensed from the mixing chamber;

producing, based on the second set of signals, the second portion of the beverage, wherein the second set of signals comprise:

a second fluid signal, the second fluid signal causing the fluid feeder to discharge the second amount of the fluid into the mixing chamber;

a second ingredient signal, the second ingredient signal causing the ingredient feeder to discharge the second amount of the at second target ingredient into the mixing chamber; and a second dispensing signal, the second dispensing signal causing the dispenser to allow at least some of a mixture of the fluid and the second target ingredient to be dispensed from the mixing chamber; and adding the second portion to the first portion, or a mixture comprising the first portion.

2. The beverage system of claim 1, wherein:

the first portion has a first viscosity; and the second portion has a second viscosity that is different from the first viscosity.

3. The beverage system of claim 1, wherein:

at least one of the first portion or the second portion further comprises a third amount of a third target ingredient; and at least one of the first ingredient signal or the second ingredient signal further causes the ingredient feeder to discharge the third amount of the third target ingredient into the mixing chamber before or after the mixing based on the first or second mixing signal begins.

4. The beverage system of claim 1, wherein:

the mixture of the fluid and the first target ingredient is dispensed from the mixing chamber at a first flow rate; and the mixture of the fluid and the second target ingredient is dispensed from the mixing chamber at a second flow rate that is different from the first flow rate.

5. The beverage system of claim 1, wherein:

the controller or control circuit is programmed to perform the operations further comprising generating, based on the obtained information, a third set of signals; and the process further comprises:

producing, based on the third set of signals, a third portion of the beverage before or after producing the second portion; and adding the third portion to the first portion, or a mixture comprising the first portion.

6. The beverage system of claim 5, wherein:

the third portion comprises a third amount of the fluid only; and the production of the third portion occurs between the production of the first portion and the production of the second portion.

7. The beverage system of claim 5, wherein:

the fluid is a first fluid; and the fluid feeder is configured to discharge a second fluid; and the third portion comprises a third amount of the second fluid.

8. The beverage system of claim 1, wherein the fluid feeder is fluidly connected to a fluid supply source.

9. The beverage system of claim 1, wherein the fluid feeder comprises a controllable valve operably connected to the controller or control circuit to controllably discharge the fluid.

10. The beverage system of claim 1, wherein the fluid feeder comprises or is in fluid communication with a fluid conduit positioned around a rim of the mixing chamber, the fluid conduit having a plurality of apertures for discharging the fluid into the mixing chamber.

11. The beverage system of claim 1, wherein the mixer comprises a mechanical stirrer, a vibration stirrer, or an ultrasonic transducer.

12. The beverage system of claim 1, wherein the dispenser is configured to move along a direction to adjust how much of the dispensing opening of the mixing chamber is available for dispensing from the mixing chamber.

13. The beverage system of claim 12, further comprising at least one actuator configured to cause the dispenser to move along the direction between a first position and a second position, the dispensing opening of the mixing chamber being blocked by the dispenser at the first position, and the dispensing opening of the mixing chamber being fully open when the dispenser is at the second position.

* * * * *